(12) United States Patent
Park et al.

(10) Patent No.: US 12,022,401 B2
(45) Date of Patent: Jun. 25, 2024

(54) METHOD AND APPARATUS FOR CONTROLLING PUSCH TRANSMISSION OF A UE IN A WIRELESS COMMUNICATION SYSTEM

(71) Applicant: Samsung Electronics Co., Ltd., Suwon-si (KR)

(72) Inventors: Sungjin Park, Suwon-si (KR); Youngbum Kim, Suwon-si (KR); Hyunseok Ryu, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 17/449,243

(22) Filed: Sep. 28, 2021

(65) Prior Publication Data
US 2022/0104138 A1 Mar. 31, 2022

(30) Foreign Application Priority Data
Sep. 28, 2020 (KR) .................. 10-2020-0126362

(51) Int. Cl.
*H04W 72/00* (2023.01)
*H04L 5/00* (2006.01)
(Continued)

(52) U.S. Cl.
CPC ......... *H04W 52/146* (2013.01); *H04L 5/0048* (2013.01); *H04W 8/24* (2013.01); *H04W 72/0473* (2013.01)

(58) Field of Classification Search
CPC . H04W 52/146; H04W 8/24; H04W 72/0473; H04W 52/281; H04W 72/1268;
(Continued)

(56) References Cited

U.S. PATENT DOCUMENTS

| 11,206,617 B2 | 12/2021 | Lee et al. | |
| 2011/0275335 A1* | 11/2011 | Luo | H04W 52/367 455/127.1 |

(Continued)

FOREIGN PATENT DOCUMENTS

WO  2019151789 A1  8/2019

OTHER PUBLICATIONS

International Search Report and Written Opinion of the International Searching Authority in connection with International Application No. PCT/KR2021/013272 dated Jan. 3, 2022, 9 pages.
(Continued)

*Primary Examiner* — Stephen M D Agosta

(57) ABSTRACT

A method, performed by a user equipment (UE), of transmitting a physical uplink shared channel (PUSCH) includes: identifying whether a demodulation reference signal (DMRS) time domain bundling information is included in a radio resource control (RRC) message received from a base station; determining whether to transmit at least one PUSCH with a same transmission power for at least one transmission time domain window, based on a result of the identifying; in response to determining to transmit the at least one PUSCH with the same transmission power for the at least one transmission time domain window, determining a transmission power for the at least one PUSCH; and transmitting the at least one PUSCH with the determined transmission power.

12 Claims, 31 Drawing Sheets

(51) Int. Cl.
*H04W 8/24* (2009.01)
*H04W 52/14* (2009.01)
*H04W 72/044* (2023.01)

(58) Field of Classification Search
CPC .... H04W 72/21; H04W 72/23; H04L 5/0048; H04L 5/0094; H04L 5/0055; H04L 5/0057; H04L 5/0053; H04L 5/0051
See application file for complete search history.

(56) References Cited

U.S. PATENT DOCUMENTS

| | | | | |
|---|---|---|---|---|
| 2014/0098795 | A1* | 4/2014 | Takeda | H04L 5/0032 370/335 |
| 2014/0119304 | A1* | 5/2014 | Li | H04W 52/367 370/329 |
| 2014/0286255 | A1* | 9/2014 | Nam | H04L 27/2636 370/329 |
| 2016/0254892 | A1* | 9/2016 | Kim | H04W 52/34 370/280 |
| 2017/0195096 | A1* | 7/2017 | Yamamoto | H04L 5/0051 |
| 2018/0146438 | A1* | 5/2018 | Yi | H04W 52/24 |
| 2019/0098580 | A1* | 3/2019 | Babaei | H04W 72/56 |
| 2019/0104539 | A1 | 4/2019 | Park et al. | |
| 2019/0159181 | A1* | 5/2019 | Manolakos | H04W 72/23 |
| 2019/0222380 | A1* | 7/2019 | Manolakos | H04L 25/0224 |
| 2019/0313436 | A1* | 10/2019 | Lee | H04L 5/0051 |
| 2019/0319757 | A1 | 10/2019 | Manolakos et al. | |
| 2020/0221395 | A1* | 7/2020 | Lee | H04W 52/146 |
| 2020/0221429 | A1* | 7/2020 | Li | H04L 5/0053 |
| 2020/0389284 | A1* | 12/2020 | Manolakos | H04L 27/2613 |
| 2020/0403768 | A1* | 12/2020 | Manolakos | H04L 5/0051 |
| 2020/0412515 | A1* | 12/2020 | Xu | H04L 5/10 |
| 2021/0014095 | A1* | 1/2021 | Ly | H04W 72/23 |
| 2021/0029707 | A1* | 1/2021 | Xu | H04L 5/0048 |
| 2021/0051596 | A1* | 2/2021 | Lee | H04W 52/48 |
| 2021/0075571 | A1* | 3/2021 | Manolakos | H04W 72/23 |
| 2021/0226748 | A1* | 7/2021 | Frenne | H04W 72/23 |
| 2021/0282137 | A1* | 9/2021 | Wang | H04W 72/23 |
| 2021/0345319 | A1* | 11/2021 | Blankenship | H04W 72/21 |

OTHER PUBLICATIONS

Qualcomm Incorporated, "Potential coverage enhancement techniques for PUSCH", R1-2006977, 3GPP TSG-RAN WG1 Meeting #102, e-Meeting, Aug. 17-28, 2020, 10 pages.

* cited by examiner

Mini-Slot-based scheduling

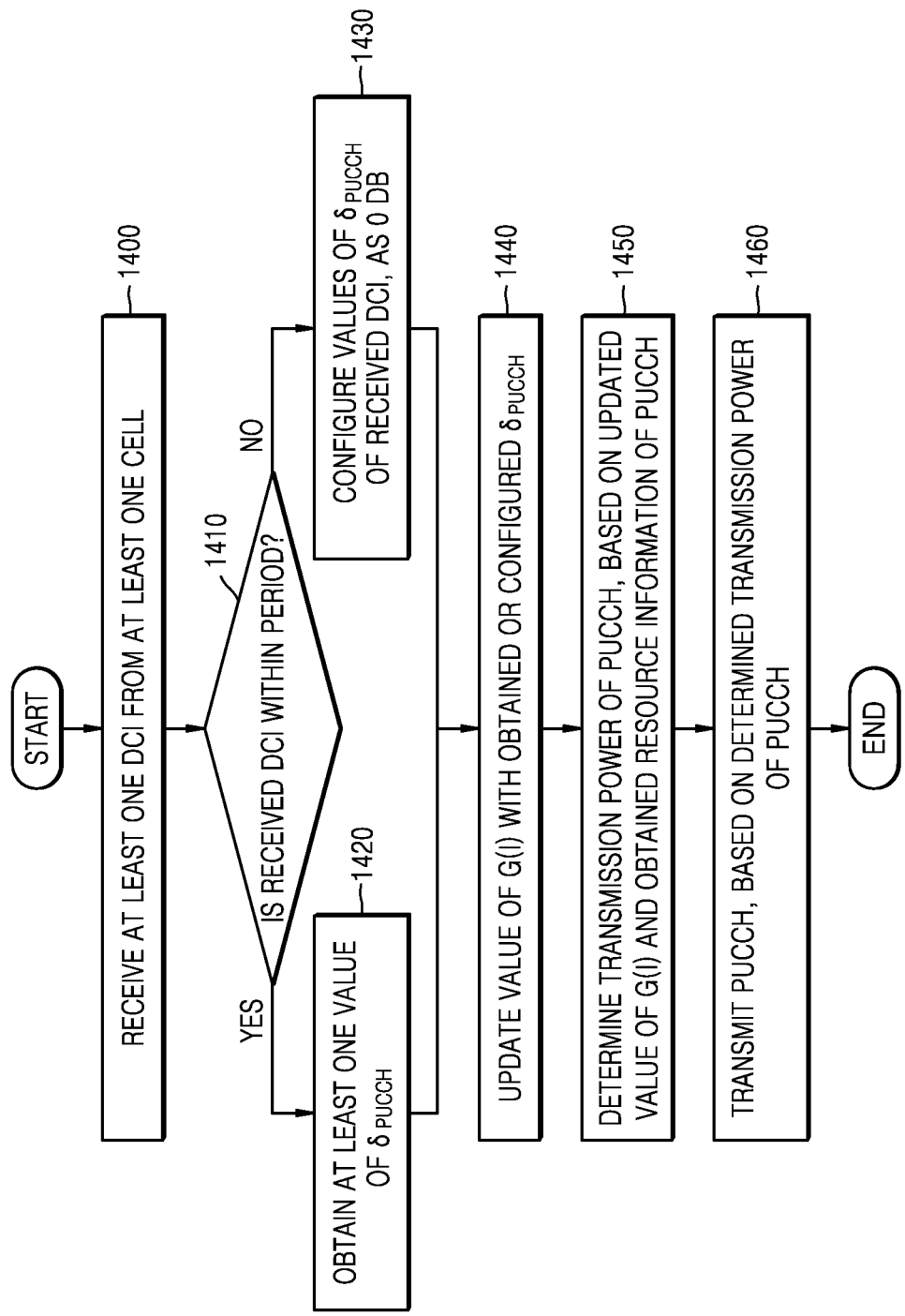

METHOD AND APPARATUS FOR CONTROLLING PUSCH TRANSMISSION OF A UE IN A WIRELESS COMMUNICATION SYSTEM

CROSS-REFERENCE TO RELATED APPLICATION

This application is based on and claims priority under 35 U.S.C. § 119 to Korean Patent Application No. 10-2020-0126362, filed on Sep. 28, 2020, in the Korean Intellectual Property Office, the disclosure of which is herein incorporated by reference in its entirety.

BACKGROUND

1. Field

The disclosure relates to a method of controlling power of a user equipment (UE) in a wireless communication system, and more particularly, to a method and apparatus for supporting control of uplink (UL) transmission power.

2. Description of the Related Art

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems.

To achieve high data rates, implementation of 5G communication systems in an ultra-high frequency or millimeter-wave (mmWave) band (e.g., a 60-gigahertz (GHz) band) is being considered. To reduce pathloss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of Everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication technologies such as sensor networks, M2M communication, MTC, and the like is being implemented by using techniques including beamforming, MIMO, array antennas, and the like. Application of cloud radio access network (Cloud-RAN) as the above-described big data processing technology may be an example of convergence of 5G communication technology and IoT technology.

As various services can be provided due to the aforementioned technical features and development of wireless communication systems, there is a demand for a method for seamlessly providing the services.

SUMMARY

An objective of the disclosure is to provide a method and an apparatus for performing uplink (UL) transmission power control by using a transmission power control parameter transmitted via a downlink (DL) control channel.

Additional aspects will be set forth in part in the description which follows and, in part, will be apparent from the description, or may be learned by practice of the presented embodiments of the disclosure.

According to an embodiment of the disclosure, a method, performed by a user equipment (UE), of transmitting a physical uplink shared channel (PUSCH) includes: identifying whether a demodulation reference signal (DMRS) time domain bundling information is included in a radio resource control (RRC) message received from a base station; determining whether to transmit at least one PUSCH with a same transmission power for at least one transmission time domain window, based on a result of the identifying; in response to determining to transmit the at least one PUSCH with the same transmission power for the at least one transmission time domain window, determining a transmission power for the at least one PUSCH; and transmitting the at least one PUSCH with the determined transmission power.

The RRC message may include information about the at least one transmission time domain window.

The information about the at least one transmission time domain window may be indicated by at least one unit of a slot or a symbol.

The at least one PUSCH may include at least one PUSCH repetition transmission configured by the base station.

The determining of the transmission power for the at least one PUSCH may include: determining at least one PUSCH belonging to a first transmission time domain window to have a first transmission power; and determining at least one PUSCH belonging to a second transmission time domain window to have a second transmission power, wherein the first transmission power is different from the second transmission power.

The determining of the transmission power for the at least one PUSCH may include: allocating the transmission power for the at least one PUSCH in priority over at least one of: single PUSCH or physical uplink control channel (PUCCH) transmission, PUSCH or PUCCH repetition transmission which is not DMRS time domain bundled, PUCCH or PUSCH transmission including channel state information (CSI) information, PUCCH transmission including hybrid automatic repeat and request (HARQ)-ACK, scheduling request (SR), or link recovery request (LRR) information, PUSCH transmission including HARQ-ACK information, PUSCH transmission without HARQ-ACK or CSI, PUSCH transmission for a Type-2 random access procedure, PUSCH transmission from a Pcell, sounding reference signal (SRS) transmission, or physical random access channel (PRACH) transmission from another serving cell other than the Pcell.

The method may further include: transmitting, to the base station, UE capability information about whether DMRS time domain bundling is supported.

According to an embodiment of the disclosure, a user equipment (UE) for transmitting a physical uplink shared channel (PUSCH) includes: a memory; a transceiver; and at least one processor coupled with the memory and the transceiver, and configured to: identify whether a demodulation reference signal (DMRS) time domain bundling information is included in a radio resource control (RRC) message received from a base station, determine whether to transmit at least one PUSCH with a same transmission power for at least one transmission time domain window, based on a result of the identifying, determine a transmission power for the at least one PUSCH, and transmit the at least one PUSCH with the determined transmission power.

The RRC message may include information about the at least one transmission time domain window.

The information about the at least one transmission time domain window may be indicated by at least one unit of a slot or a symbol.

The at least one PUSCH may include at least one PUSCH repetition transmission configured by the base station.

The at least one processor may be further configured to: determine at least one PUSCH belonging to a first transmission time domain window to have a first transmission power, and determine at least one PUSCH belonging to a second transmission time domain window to have a second transmission power, wherein the first transmission power is different from the second transmission power.

The at least one processor may be further configured to: allocate the transmission power for the at least one PUSCH in priority over at least one of: single PUSCH or physical uplink control channel (PUCCH) transmission, PUSCH or PUCCH repetition transmission which is are not DMRS time domain bundled, PUCCH or PUSCH transmission including channel state information (CSI) information, PUCCH transmission including hybrid automatic repeat and request (HARQ)-ACK, scheduling request (SR), or link recovery request (LRR) information, PUSCH transmission including HARQ-ACK information, PUSCH transmission without HARQ-ACK or CSI, PUSCH transmission for a Type-2 random access procedure, PUSCH transmission from a Pcell, sounding reference signal (SRS) transmission, or physical random access channel (PRACH) transmission from another serving cell other than the Pcell.

The at least one processor may be further configured to: transmit, to the base station, UE capability information on whether DMRS time domain bundling is supported.

According to an embodiment of the disclosure, a method, performed by a base station, of receiving a physical uplink shared channel (PUSCH) includes: transmitting, to a user equipment (UE), a radio resource control (RRC) message including a demodulation reference signal (DMRS) time domain bundling information; receiving at least one PUSCH transmitted by the UE with a transmission power determined based on the RRC message; and estimating a channel by bundling a DMRS of the at least one PUSCH.

The RRC message may include information about at least one transmission time domain window.

The information about the at least one transmission time domain window may be indicated by at least one unit of a slot or a symbol.

The at least one PUSCH may include at least one PUSCH repetition transmission configured by the base station.

The receiving of the at least one PUSCH transmitted by the UE with the transmission power determined based on the RRC message may include: receiving, from the UE, at least one PUSCH belonging to a first transmission time domain window with a first transmission power; and receiving, from the UE, at least one PUSCH belonging to a second transmission time domain window with a second transmission power, wherein the first transmission power is different from the second transmission power.

The method may further include: receiving, from the UE, UE capability information about whether DMRS time domain bundling is supported.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 illustrates a diagram of an example of a CA system where slot-based scheduling and mini-slot-based scheduling coexist according to an embodiment of the disclosure;

DETAILED DESCRIPTION

Figure 1:
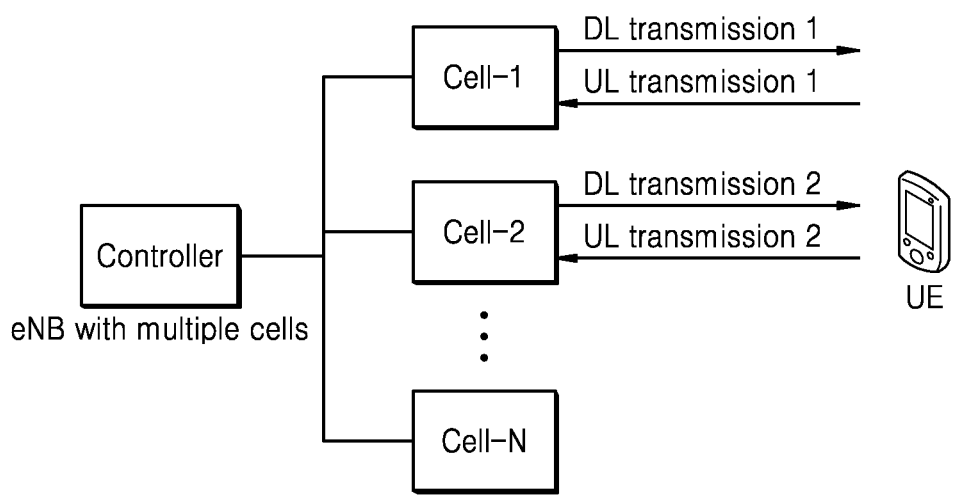
FIG. 1 illustrates a diagram of a carrier aggregation (CA) system according to an embodiment of the disclosure.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, operational principles of the disclosure will be described in detail with reference to accompanying drawings. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit" as used in the present embodiment refers to a software or hardware component, such as field-programmable gate array (FPGA) or application-specific integrated circuit (ASIC), which performs certain tasks. However, the term "~unit" does not mean to be limited to software or hardware. A "~unit" may be configured to be in an addressable storage medium or configured to operate one or more processors. Thus, a "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more central processing units (CPUs) in a device or a secure multimedia card. Also, a "~ unit" may include one or more processors in embodiments of the disclosure.

In the disclosure, a downlink (DL) refers to a wireless transmission path of a signal to be transmitted from a base station (BS) to a UE, and an uplink (UL) refers to a wireless transmission path of a signal to be transmitted from a UE to a BS. Although the following descriptions may be provided about long term evolution (LTE) or LTE-Advanced (LTE-A) systems as an example, embodiments of the disclosure are also applicable to other communication systems having similar technical backgrounds or channel structure. For example, embodiments of the disclosure may be applicable to a system including $5^{th}$ generation (5G) New Radio (NR) communication technology developed after LTE-A system, and hereinafter, 5G may indicate a concept including LTE, LTE-A, and other similar services according to the related art. The disclosure is applicable to other communication systems through modification at the discretion of one of ordinary skill in the art without greatly departing from the scope of the disclosure.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used.

For convenience of descriptions, the disclosure uses terms and names defined in the $3^{rd}$ Generation Partnership Project (3GPP) long term evolution (LTE) standards. However, the disclosure is not limited to these terms and names, and may be equally applied to communication systems conforming to other standards.

In the descriptions of the disclosure, well-known functions or configurations are not described in detail when it is deemed that they may unnecessarily obscure the essence of the disclosure. Hereinafter, embodiments of the disclosure will be described in detail with reference to accompanying drawings.

According to an embodiment of the disclosure, a carrier aggregation (CA) technology capable of increasing a data rate by grouping at least two frequency bands is well known. A UE in a system that supports CA may transmit or receive DL/UL data and control information via two or more carrier frequencies configuring a DL or a UL. A plurality of pieces of information may be included in a physical uplink shared channel (PUSCH), a physical uplink control channel (PUCCH), or a sounding reference signal (SRS) and transmitted via the UL.

According to an embodiment of the disclosure, when the UE performs transmission via the UL (transmission via the PUSCH, the PUCCH, or the SRS), the UE may perform transmission power control to decrease interference to an adjacent cell and to increase reception reliability of information to be transmitted via the UL. For UL transmission power control, the UE may configure a transmission power value by using parameters received from a BS and a DL path attenuation value measured by the UE. In this regard, some parameters from among the parameters transmitted from the BS may be received by the UE via radio resource control (RRC) signaling, and some parameters may be received by the UE via downlink control information (DCI) of a DL control channel. Also, a transmission power control parameter received by the UE from the DCI of the DL control channel may be transmitted from the BS by using UE-specific DCI transmitted only to a specific UE or may be transmitted from the BS by using group-common DCI transmitted only to UEs of a specific group.

According to an embodiment of the disclosure, the number of UL carrier frequencies may be a subset of the number of DL carrier frequencies. For example, when it is assumed that the number of DL carrier frequencies is N and the number of UL carrier frequencies is M, N≥M. Here, a carrier used in CA may be referred to as a cell.

According to an embodiment of the disclosure, in a CA environment, the UE may receive one or more DCIs from one or more cells. For example, in a CA environment of three cells, the UE may receive three DCIs from three cells. In this regard, the three DCIs may be configured as one of UE-specific DCI and group-common DCI (e.g., the three DCIs may be configured as three UE-specific DCIs or three group-common DCIs), or may be configured as a combination of UE-specific DCI and group-common DCIs (e.g., the three DCIs may be configured as a combination of one UE-specific DCI and two group-common DCIs).

According to an embodiment of the disclosure, a UL transmission power control method using a parameter received via DCI may include an accumulation method and a method of using an absolute value. The accumulation method may be a method of accumulating and using a transmission power control parameter value received by a UE via DCI. The method of using an absolute value may be a method by which the UE uses the received transmission power control parameter value without accumulation. The BS according to an embodiment of the disclosure may configure, via RRC signaling, which method from among the two transmission power control methods is to be used.

According to an embodiment of the disclosure, when the accumulation method is to be used, the UE may determine which DCI from among two or more DCIs received by the UE is to be used in performing accumulation.

FIG. 1 illustrates a diagram of a CA system according to an embodiment of the disclosure.

FIG. 1 illustrates an example where the number of UL carrier frequencies is equal to the number of DL carrier frequencies, but the disclosure is not limited thereto.

According to an embodiment of the disclosure, a UE may transmit/receive data and control information via DL/UL from some cells (referring to FIG. 1, from two cells) of a BS consisting of N cells. In this regard, Cell-1 and Cell-2 may transmit, to the UE, DL control information for DL data transmission. Also, Cell-1 and Cell-2 may transmit, to the UE, UL control information for UL data transmission.

Transmission power control with respect to a PUCCH in a legacy wireless communication system is as in [Equation 1] below.

specific value is transmitted from the BS to the UE via a system information block (SIB), and the UE-specific value is transmitted from the BS to the UE via dedicated RRC signaling.

$PL_c$: A pathloss value calculated by the UE. The UE calculates the pathloss value from reception power of a cell-specific reference signal (CRS) of a DL channel transmitted by the BS. In more detail, the BS transmits referenceSignalPower and a filtering coefficient to the UE via UE-specific cell-specific RRC signaling, and based on this, the UE calculates the pathloss value as below. $PL_c$=referenceSignalPower−higher layer filtered RSRP.

$\Delta_{F\_PUCCH}(F)$: A value that is transmitted to the UE via higher layer signaling (cell-specific signaling or UE-specific RRC signaling), that varies according to a format of a PUCCH, and that has a relative value with respect to PUCCH Format 1a (1-bit HARQ-ACK/NACK transmission). The value of $\Delta_{F\_PUCCH}(F)$ is configured as in [Table 1].

TABLE 1

$\Delta_{F\_PUCCH}(F)$ Values

| PUCCH Format | Parameters, $\Delta_{F\_PUCCH}(F)$ | Values [dB] |
|---|---|---|
| 1 | deltaF-PUCCH-Format1 | [−2, 0, 2] |
| 1b | deltaF-PUCCH-Format1b | [1, 3, 5] |
| 2 | deltaF-PUCCH-Format2 | [−2, 0, 1, 2] |
| 2a | deltaF-PUCCH-Format2a | [−2, 0, 2] |
| 2b | deltaF-PUCCH-Format2b | [−2, 0, 2] |

$\Delta_{TxD}(F')$ is a value that is transmitted to the UE via higher layer signaling (cell-specific signaling or UE-specific RRC signaling) when a PUCCH is transmitted via 2-antanna ports (i.e., a space frequency block code (SFBC)), and that varies according to a format of the PUCCH. When the SFBC is not used, $\Delta_{TxD}(F')=0$. The value of $\Delta_{TxD}(F')$ is configured as in [Table 2].

TABLE 2

$\Delta_{TxD}(F')$ Values

| PUCCH Format | Parameters, $\Delta_{F\_PUCCH}(F)$ | Values [dB] |
|---|---|---|
| 1 | deltaTxD-OffsetPUCCH-Format1 | [0, −2] |
| 1a/1b | deltaTxD-OffsetPUCCH-Format1a1b | [0, −2] |
| 2/2a/2b | deltaTxD-OffsetPUCCH-Format22a2b | [0, −2] |
| 3 | deltaTxD-OffsetPUCCH-Format3 | [0, −2] |

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array}\right\} \text{[dBm]}. \quad \text{[Equation 1]}$$

In [Equation 1], $P_{PUCCH}(i)$ indicates transmission power of a PUCCH in an i-th subframe of the UE, and each of parameters in [Equation 1] is as below.

$P_{0\_PUCCH}$: A parameter that consists of $P_{0\_NOMINAL\_PUCCH} + P_{0\_UE\_PUCCH}$, and is a value configured for the UE by the BS via RRC signaling. In particular, $P_{0\_NOMINAL\_PUCCH}$ is a cell-specific value consisting of 8-bit information and having a range of [−126, 24] dB. Also, $P_{0\_UE\_PUCCH}$ is a UE-specific value consisting of 4-bit information and having a range of [−8, 7] dB. The cell- $h(n_{CQI}, n_{HARQ}, n_{SR})$: Different values are used according to a format of a PUCCH, and in this regard, $n_{CQI}$ indicates the number of bits used in feedback of channel quality information (CQI), $n_{HARQ}$ indicates the number of bits used in Hybrid Automatic Repeat Request (HARQ)-ACK/NACK feedback, and $n_{SR}$ is 0 or 1 that is a bit used in feedback of a scheduling request. $h(n_{CQI}, n_{HARQ}, n_{SR})$ may have different values according to a format of the PUCCH.

g(i) is a parameter for performing closed-loop power control. The BS may correct PUCCH transmission power to be UE-specific. Unlike PUSCH transmission power control, in PUCCH transmission power control, only accumulation-based transmission power control is performed, and g(i) is given as in [Equation 2].

$$g(i)=g(i-1)+\Sigma_{m=0}^{M-1}\delta_{PUCCH}(i-k_m).$$ [Equation 2]

That is, g(i) in i-th subframe may be calculated by accumulating a value of g(i−1), which has been transmitted in DCI to the UE via a physical downlink control channel (PDCCH) in i−$k_m$th subframe, to a value of $\delta_{PUCCH}$ used in a previous subframe (i.e., i−1st subframe). The value of $\delta_{PUCCH}$ may vary according to a DCI format. For DCI formats 1A/1B/1D/1/2A/2B/2C/2/3, same values as accumulated $\delta_{PUSCH}$ of [Table 3] may be used. In a case of DCI format 3A, the value of $\delta_{PUCCH}$ may be equal to a value of $\delta_{PUSCH}$ used in [Table 4].

TABLE 3

Mapping of TPC Command Field in DCI format 0/3/4 to accumulated $\delta_{PUSCH}$ values.

| TPC Command Field in DCI format 0/3/4 | Accumulated $\delta_{PUSCH}$ [dB] |
|---|---|
| 0 | −1 |
| 1 | 0 |
| 2 | 1 |
| 3 | 3 |

TABLE 4

Mapping of TPC Command Field in DCI format 3A to accumulated $\delta_{PUSCH}$ values.

| TPC Command Field in DCI format 3 A | Accumulated $\delta_{PUSCH}$ [dB] |
|---|---|
| 0 | −1 |
| 1 | 1 |

In [Equation 2], a value of M and a value of $k_0$ may be differently used in a frequency division duplex (FDD) system and a time division duplex (TDD) system. In more detail, in the FDD system, M=1, $k_0$=4, and in the TDD system, M, $k_0$ may have different values as in [Table 5] according to DL/UL configuration.

TABLE 5

| | $\{k_0, k_1, \ldots, k_{M-1}\}$ for TDD | | | | | | | | |
|---|---|---|---|---|---|---|---|---|---|
| TDD DL/UL | Subframe number n | | | | | | | | |
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 8, 9, 7, 5, 4, 11, 6 | — | — | — | — | — | — | — |
| 6 | — | — | 7 | 7 | 5 | — | — | 7 | 7 | — |

Figure 2:
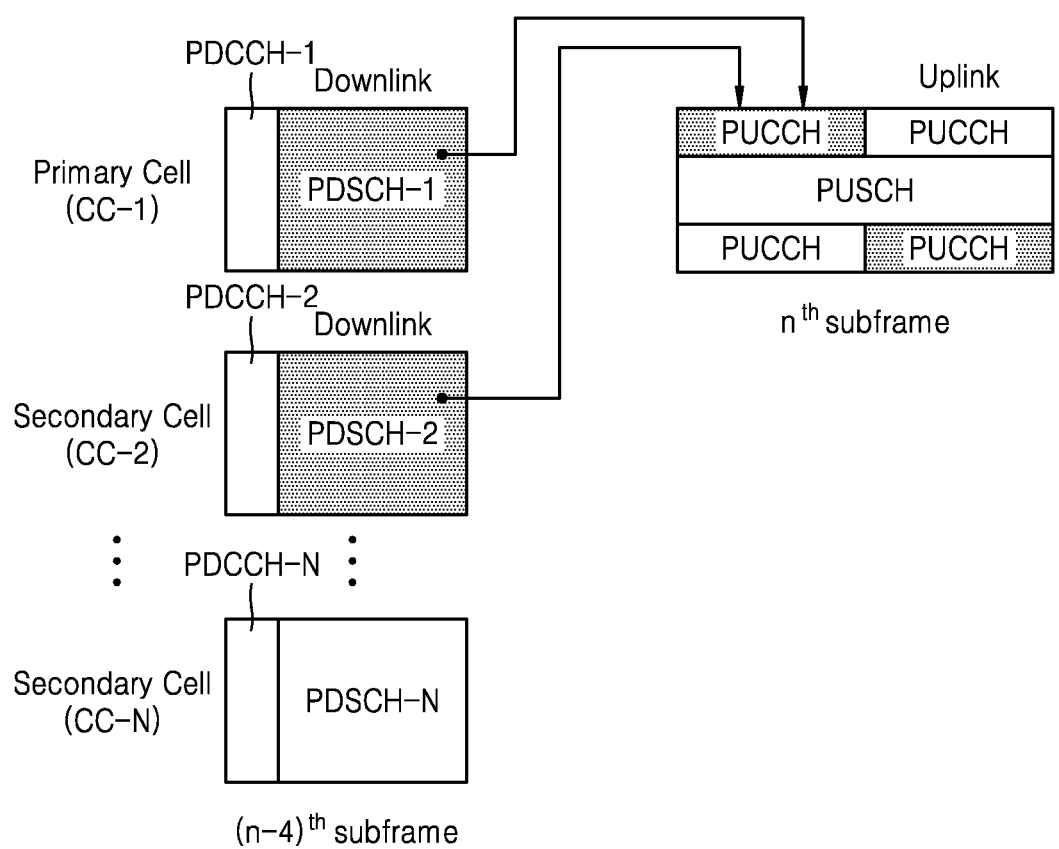
FIG. 2 illustrates a diagram for describing an example of transmission of downlink (DL) data and DL control information and transmission of uplink (UL) control information in a CA system according to an embodiment of the disclosure.

FIG. 2 illustrates a diagram for describing an example of transmission of DL data and DL control information and transmission of UL control information in a CA system according to an embodiment of the disclosure.

According to an embodiment of the disclosure, component carrier-1 (CC-1) may be referred to as a primary cell (PCell).

CC-2 to CC-N may be referred to as secondary cells (SCells). Here, CC-1 may transmit, to the UE, DL data and control information that are respectively PDCCH-1 and PDSCH-1.

CC-2 may also transmit, to the UE, DL data and control information that are respectively PDCCH-2 and PDSCH-2.

PDCCH-1 transmitted via PCell (CC-1) may include resource allocation information of PDSCH-1 transmitted via PCell, and a 2-bit $\delta_{PUCCH}$ value of [Table 3] which is a transmission power control parameter value of a PUCCH transmitted via PCell. PDCCH-2 transmitted via SCell (CC-2) may include resource allocation information of PDSCH-2 transmitted via CC-2, and resource allocation information of a PUCCH transmitted via PCell. Here, the resource allocation information of the PUCCH may reuse a transmission power control (TPC) command field. That is, PUCCHs transmitted via Scell do not have a particular field for separate PUCCH resource allocation information, and the UE may reinterpret, as PUCCH resource allocation information, a 2-bit TPC command field indicating a $\delta_{PUCCH}$ value by the BS.

Although not illustrated in FIG. 2, an embodiment of the disclosure may be applied to a case where three cells transmit a PDCCH. Therefore, embodiments of the disclosure may be applied, regardless of the number of cells. In a case where CC-2 and CC-3 respectively transmit PDCCH-2 and PDSCH-2 and PDCCH-3 and PDSCH-3, TPC command fields of PDCCH-2 and PDCCH-3 may include resource allocation information of a PUCCH transmitted via PCell. The TPC command fields of PDCCH-2 and PDCCH-3 may have a same value, and the UE may reinterpret all of the TPC command fields of PDCCH-2 and PDCCH-3 as the resource allocation information of the PUCCH transmitted via PCell.

Figure 3:
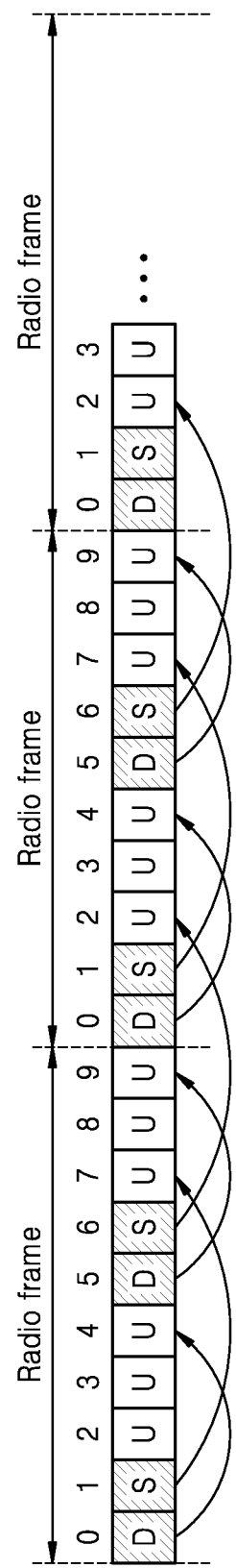
FIG. 3 illustrates a diagram for describing timing at which a user equipment (UE) applies a UL transmission power control parameter obtained via downlink control information (DCI) in a system according to an embodiment of the disclosure.

FIG. 3 illustrates a diagram for describing timing at which the UE applies a UL transmission power control parameter obtained via DCI according to an embodiment of the disclosure.

In the FDD system, HARQ ACK/NACK information about a physical downlink shared channel (PDSCH) received in an n−4th subframe via a DL is transmitted via a PUCCH of an nth subframe. Therefore, a value of $\delta_{PUCCH}$ the UE obtains from a TPC command field of UE-specific DCI (or a value of $\delta_{PUCCH}$ the UE obtains from group-common DCI) received in the n−4th subframe is used in transmission of the PUCCH of the nth subframe.

In the TDD system, rules as in [Table 5] may be applied. In more detail, in a system following TDD DL/UL configuration #0, configuration of DL and UL may be as in an example of FIG. 3. Here, D indicates a DL subframe (DL), U indicates a UL subframe (UL), and S indicates s special subframe where DL, UL, and a gap coexist.

Referring to [Table 5], a value of $\delta_{PUCCH}$ (the value of $\delta_{PUCCH}$ the UE obtains from the TPC command field of UE-specific DCI or the value of $\delta_{PUCCH}$ the UE obtains from group-common DCI) to be applied to subframe-2 corresponds to a value of $\delta_{PUCCH}$ transmitted in a previous sixth subframe before subframe-2. That is, the value of $\delta_{PUCCH}$ to be applied to subframe-2 may correspond to the value of $\delta_{PUCCH}$ transmitted in subframe no. 6.

A value of $\delta_{PUCCH}$ to be applied to subframe-4 may correspond to a value of $\delta_{PUCCH}$ transmitted in a previous fourth subframe before subframe-4. That is, the value of $\delta_{PUCCH}$ to be applied to subframe-4 may correspond to the value of $\delta_{PUCCH}$ transmitted in subframe no. 0.

A value of $\delta_{PUCCH}$ to be applied to subframe-7 may correspond to a value of $\delta_{PUCCH}$ transmitted in a previous sixth subframe before subframe-7. That is, the value of $\delta_{PUCCH}$ to be applied to subframe-7 may correspond to the value of $\delta_{PUCCH}$ transmitted in subframe no. 1.

Lastly, a value of $\delta_{PUCCH}$ to be applied to subframe-9 may correspond to a value of $\delta_{PUCCH}$ transmitted in a previous fourth subframe before subframe-9. That is, the value of $\delta_{PUCCH}$ to be applied to subframe-9 may correspond to the value of $\delta_{PUCCH}$ transmitted in subframe no. 5.

Figure 4:
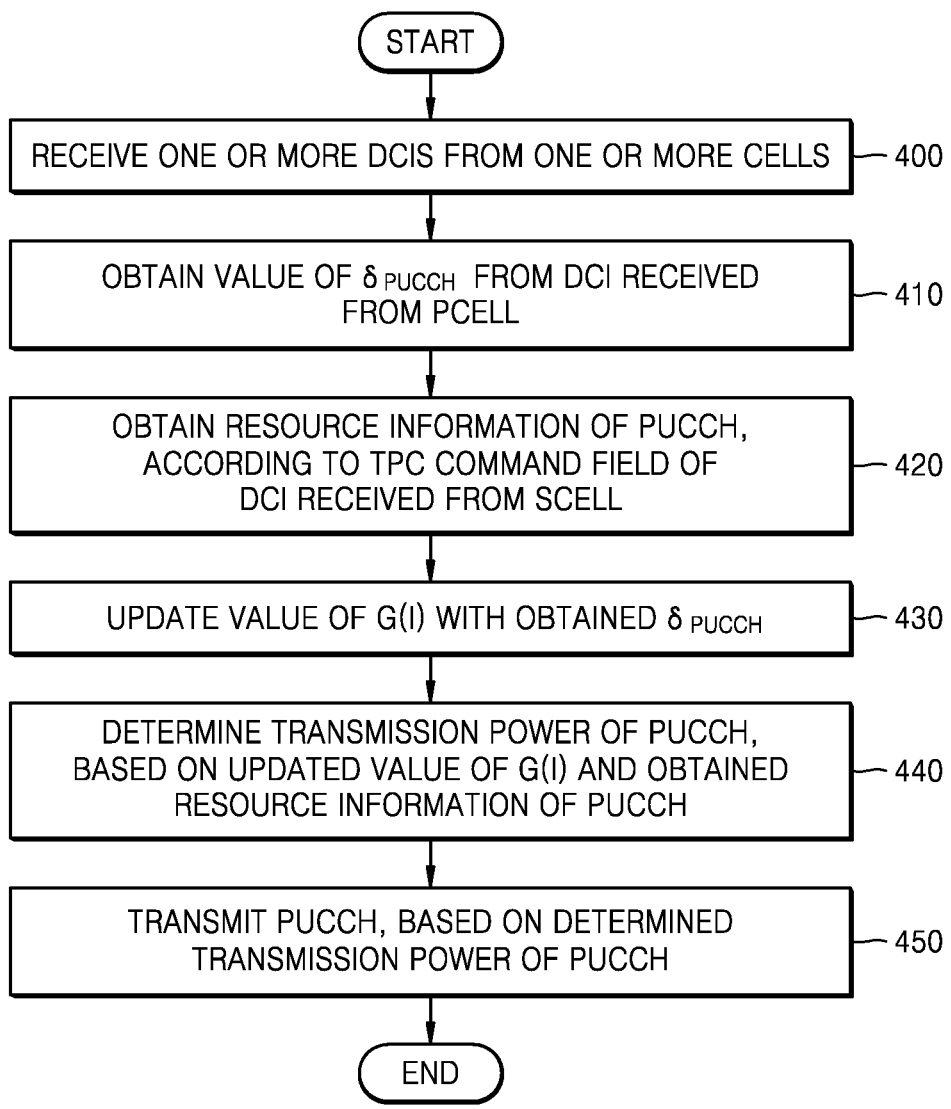
FIG. 4 illustrates a diagram for describing an example where a UL transmission power control parameter a UE obtains from DCI is applied in a system according to an embodiment of the disclosure.

FIG. 4 illustrates a diagram for describing an example where a UL transmission power control parameter a UE obtains from DCI is applied according to an embodiment of the disclosure.

In operation 400, the UE may receive one or more UE-specific DCIs or group-common DCIs from one or more cells. Here, UE-specific DCI indicates a DCI format with cyclic redundancy check (CRC) of DCI is scrambled by cell radio network temporary identifier (C-RNTI) or semi-persistent scheduling (SPS)-RNTI, and more particularly, may indicate DCI format of 1, 1A, 2, 2A, 2B, or 2C or DCI format of 0_0, 0_1, 1_0, or 1_1.

Group-common DCI indicates a DCI format with CRC of DCI is scrambled by TPC-PUCCH-RNTI (or TPC-PUSCH-RNTI, TPC-SRS-RNTI), and more particularly, may indicate DCI format of 3 or 3A or DCI format of 2_2 or 2_3.

The UE may receive, in a particular subframe (e.g., an n-th subframe), one or more DCIs, e.g., two or more UE-specific DCIs, two or more group-common DCIs, or two or more UE-specific DCIs and group-common DCIs from one or more cells.

In operation 410, upon reception of the DCIs, the UE may determine whether there is DCI received from PCell, and when there is the DCI received from the PCell, the UE may obtain a value of $\delta_{PUCCH}$ from the DCI. That is, the UE may obtain the value of $\delta_{PUCCH}$ from a TPC command field of UE-specific DCI or group-common DCI.

In operation 420, the UE may obtain, from a TPC command field of UE-specific DCI (or group-common DCI) received from SCell, resource information of a PUCCH to be transmitted to PCell. When the UE receives two or more UE-specific DCIs from two or more SCells, the UE may not expect different UE-specific DCIs to indicate two or more pieces of different PUCCH resource information. That is, a BS may transmit two or more pieces of same PUCCH resource information via different UE-specific DCIs. In another embodiment of the disclosure, operation 420 may be performed after operation 430.

After the UE respectively obtains the value of $\delta_{PUCCH}$ and the resource information of the PUCCH for PUCCH transmission from DCIs of the PCell and the SCell, the UE may configure a transmission power value of the PUCCH to be transmitted to the PCell.

In operation 430, the UE may update a value of g(i) with obtained $\delta_{PUCCH}$. In more detail, the UE may update the value of g(i) with the obtained $\delta_{PUCCH}$ by using [Equation 2].

In operation 440, the UE may determine transmission power of the PUCCH, based on the updated value of g(i) and the obtained resource information of the PUCCH. In more detail, the UE may configure a value of $P_{PUCCH}(i)$ by using [Equation 1].

In operation 450, the UE may transmit the PUCCH, based on the determined transmission power of the PUCCH. In more detail, in operation 440, the UE may transmit the PUCCH in an i-th subframe by using the configured $P_{PUCCH}(i)$.

Figure 5:
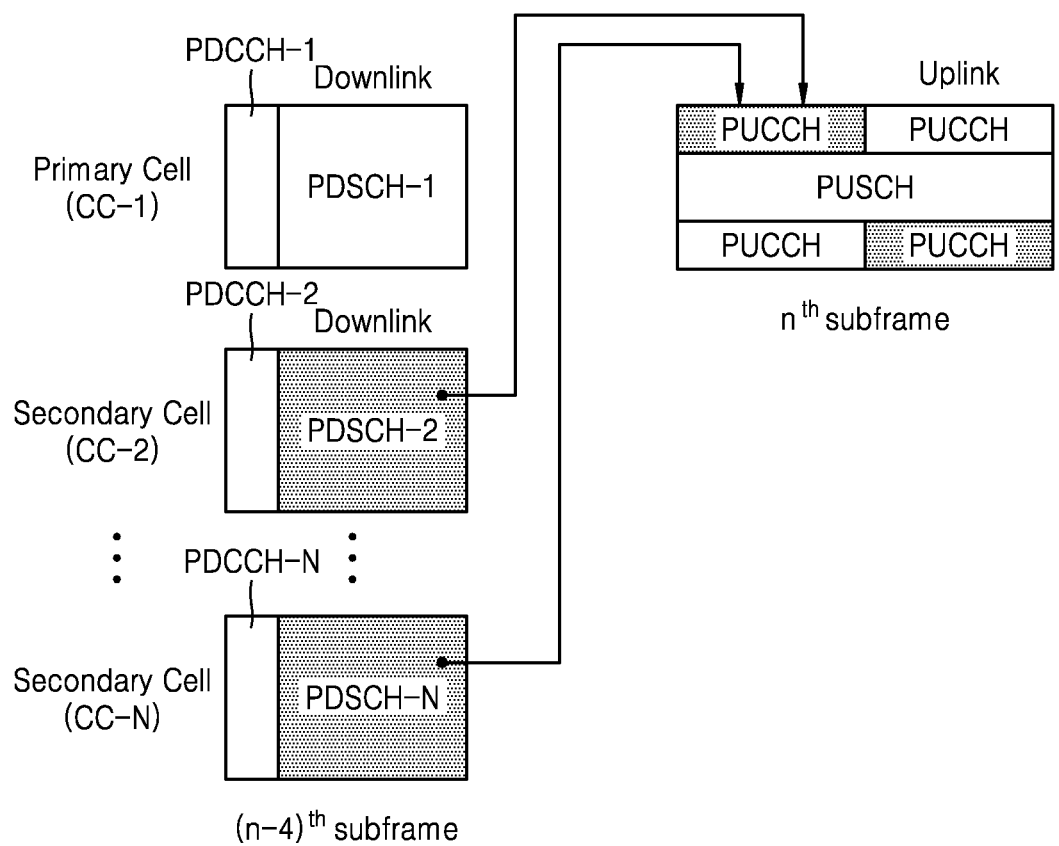
FIG. 5 illustrates a diagram for describing another example of transmission of DL data and DL control information and transmission of UL control information in a CA system according to an embodiment of the disclosure.

FIG. 5 illustrates a diagram for describing another example of transmission of DL data and DL control information and transmission of UL control information in a CA system according to an embodiment of the disclosure.

Unlike FIG. 2, in FIG. 5, CC-1 may not transmit DL data and control information to the UE, and CC-2 and CC-N may respectively transmit PDCCH-2 and PDSCH-2 and PDCCH-N and PDSCH-N to the UE.

According to descriptions of FIGS. 2 to 4, the UE may obtain information about a value of $\delta_{PUCCH}$ via a 2-bit TPC command field of PDCCH-1 transmitted from PCell (CC-1), and may obtain resource allocation information of a PUCCH to be transmitted to the PCell, via a 2-bit TPC command field of PDCCHs transmitted from SCells. Here, when two or more SCells transmit PDCCHs, 2-bit TPC command fields of the PDCCHs of the respective SCells may have a same value.

Referring to FIG. 5, because there are not PDCCH-1 and PDSCH-1 transmitted from the PCell, the UE may not be able to obtain, from DCI of PDCCH-1, a value of $\delta_{PUCCH}$ the UE can refer to transmit the PUCCH. Particular operations thereafter will now be described in detail with reference to FIG. 6.

Figure 6:
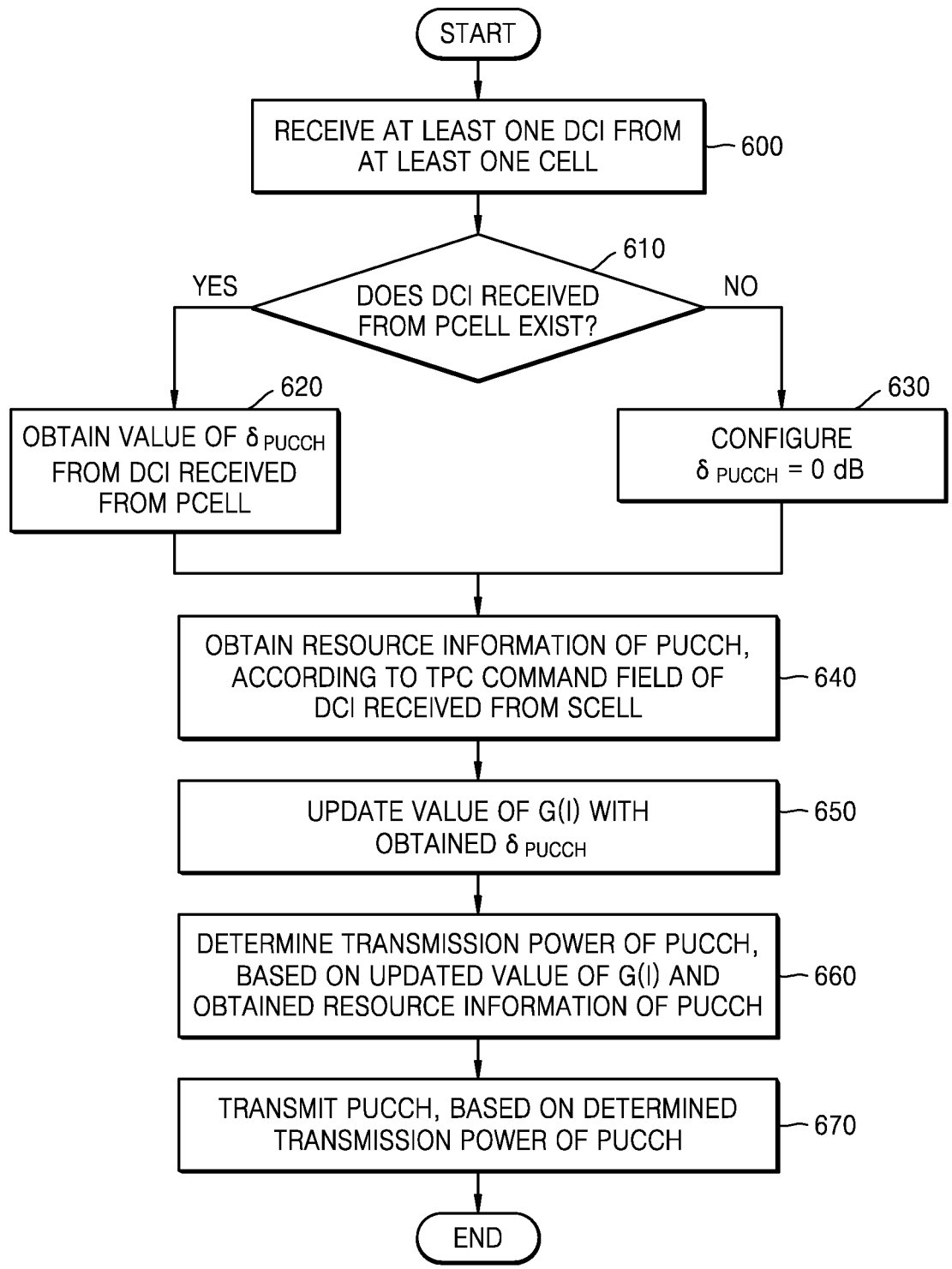
FIG. 6 illustrates a diagram of operations of a UE in a case where a scenario of FIG. 5 occurs.

FIG. 6 illustrates a diagram for describing an example of operations of a UE according to FIG. 5, according to an embodiment of the disclosure.

In operation 600, the UE may receive, in a (n–k)-th subframe, one or more DCIs from one or more cells. In an embodiment of the disclosure, the UE may transmit a PUCCH to PCell, in an n-th subframe. Here, a value of k is fixed as 4 in a case of the FDD system, and in a case of the TDD system, a value of k follows [Table 2] according to configuration of DL and UL (i.e., according to TDD DL/UL configuration).

In operation 610, the UE may determine whether DCI received in a (n–k)-th subframe from the PCell exists. In an embodiment of the disclosure, after the UE determines whether UE-specific DCI received from the PCell exists, the UE may determine whether group-common DCI received from the PCell exists.

In operation 620, when DCI received from the PCell exists, the UE may obtain a value of $\delta_{PUCCH}$ from the DCI received from the PCell. In more detail, the UE may obtain the value of $\delta_{PUCCH}$ from UE specific DCI received from the PCell. In another embodiment of the disclosure, when group-common DCI received from the PCell exists in the (n–k)-th subframe, the UE may obtain the value of $\delta_{PUCCH}$ from the group-common DCI.

In operation 630, when DCI received from the PCell does not exist, the UE may configure the value of $\delta_{PUCCH}$ as 0 dB. In an embodiment of the disclosure, when the group-common DCI received from the PCell does not exist in the (n−k)-th subframe, the UE may configure the value of $\delta_{PUCCH}$ as 0 dB.

In operation 640, the UE may obtain resource information of a PUCCH to be transmitted to the PCell, from a TPC command field of DCI received from SCell. In an embodiment of the disclosure, the UE may obtain the resource information of the PUCCH to be transmitted to the PCell, from a TPC command field of UE-specific DCI received from SCell. When the UE receives two or more UE-specific DCIs from two or more SCells, the UE may not expect different UE-specific DCIs to indicate two or more pieces of different PUCCH resource information. That is, a BS may transmit two or more pieces of same PUCCH resource information via different UE-specific DCIs. In another embodiment of the disclosure, operation 640 may be performed after operation 650.

In operation 650, the UE may update a value of g(i) with obtained $\delta_{PUCCH}$. In more detail, the UE may update (where, i=n) the value of g(i) with the obtained $\delta_{PUCCH}$ by using [Equation 2].

In operation 660, the UE may determine transmission power of the PUCCH, based on the updated value of g(i) and the obtained resource information of the PUCCH. In more detail, the UE may configure a value of $P_{PUCCH}(n)$ by using [Equation 1].

In operation 670, the UE may transmit the PUCCH, based on the determined transmission power of the PUCCH. In more detail, the UE may transmit the PUCCH in an n-th subframe by using $P_{PUCCH}(n)$ configured in operation 660.

Figure 7:
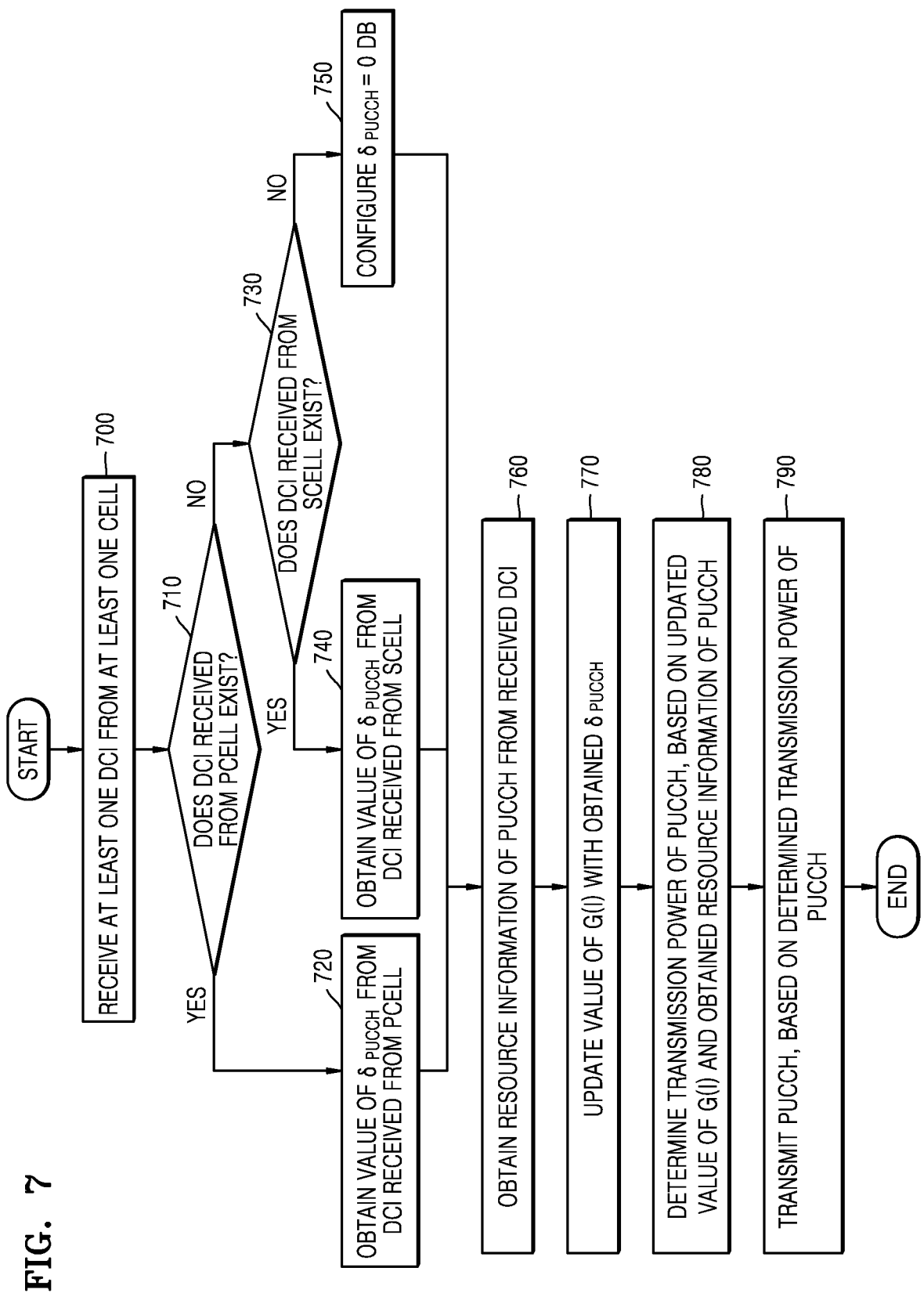
FIG. 7 illustrates a diagram of an example of transmission of DL data and DL control information and transmission of UL control information in a system to which CA is applied, according to an embodiment of the disclosure.

FIG. 7 illustrates a diagram for describing transmission of DL data and DL control information and transmission of UL control information in a system to which CA is applied, according to an embodiment of the disclosure.

As described with reference to FIGS. 2 to 6, according to whether a 2-bit TPC command field is transmitted from DCI of PCell or DCI of SCell, UE interpretation of a TPC command field may vary. That is, the UE may obtain a value of $\delta_{PUCCH}$ from a TPC command field of the DCI transmitted from the PCell, and may obtain resource information of a PUCCH from a TPC command field of DCIs transmitted from SCells. Such operation does not require an additional bit for indicating resource allocation information of the PUCCH, such that an overhead of the number of DCI bits may be decreased.

In a communication system according to an embodiment of the disclosure, the number of DCI bits may need to increase. Therefore, in a communication system according to an embodiment of the disclosure, a DCI bit for indicating, to the UE, a value of $\delta_{PUCCH}$ for transmission power control of the PUCCH, and a DCI bit for indicating, to the UE, the resource allocation information of the PUCCH may separately exist. In this situation, the UE may receive two or more DCIs from two or more cells, and it is required to define operations the UE has to perform at that time. For example, it is required to define whether UE conforms to a TPC command field of UE-specific DCI of the PCell or conforms to all of two or more TPC command fields transmitted from the PCell and SCell.

In operation 700, the UE may receive, in a (n−k)-th subframe, one or more DCIs from one or more cells. Then, the UE may transmit a PUCCH to the PCell, in an n-th subframe. In a communication system according to an embodiment of the disclosure, in order to support a service having various latencies, a BS may flexibly configure a value of k. Here, k may indicate a time difference between a time when DCI is received and a time when a PUCCH is transmitted. In more detail, a value of k in the FDD system may be 4, and a value of k in the TDD system may correspond to values defined in [Table 2], according to configuration of DL and UL. That is, a fixed value of k may be used.

According to an embodiment of the disclosure, a ratio and a pattern of DL and UL configuring a frame or a slot may vary and may be dynamically changed. Therefore, the BS may configure or indicate a value of k for the UE. For example, the BS may notify, via RRC signaling, the UE of a k value candidate consisting of two or more values of k, and may indicate, for the UE, one value of k from the k value candidate via DCI. Here, the BS may configure a value of k, by sufficiently considering a processing time capability of the UE. In more detail, the BS may obtain information about a processing time capability of each UE, in a procedure of negotiating a capability with each UE. For example, a UE-A can provide a fast processing time, and thus, can use a small value of k, but a UE-B cannot provide a fast processing time, and thus, may have to use a large value of k.

In operation 710, the UE may determine, by using the value of k, whether DCI received in the (n−k)-th subframe from the PCell exists. In an embodiment of the disclosure, the UE may determine whether UE-specific DCI or group-common DCI exists.

In operation 720, when the DCI received from the PCell exists, the UE may obtain a value of $\delta_{PUCCH}$ from a TPC command field of the DCI.

In operation 730, when DCI received from the PCell does not exist, the UE may determine whether DCI received from SCell exists.

In operation 740, when the DCI received from the SCell exists, the UE may obtain a value of $\delta_{PUCCH}$ from a TPC command field of the DCI. When the UE receives two or more DCIs from two or more SCells, the UE may obtain a value of $\delta_{PUCCH}$ from a TPC command field of UE-specific DCI received from SCell having a lowest cell index.

In operation 750, when there are not UE-specific DCIs received from PCell and SCell, the UE may configure the value of $\delta_{PUCCH}$ as 0 dB.

In operation 760, the UE may obtain resource information of PUCCH from DCI transmitted from one cell from among the PCell or the SCells. The BS may transmit the resource information of the PUCCH via the DCI of the PCell and the one or more SCells. Here, the BS may configure the resource information of the PUCCH, which is transmitted via the DCI, to be same in all cells and may transmit the resource information of the PUCCH to the UE. In another embodiment of the disclosure, operation 760 may be performed after operation 760.

In operation 770, the UE may update a value of g(i) with obtained $\delta_{PUCCH}$. In more detail, the UE may update (where, i=n) the value of g(i) with the obtained $\delta_{PUCCH}$ by using [Equation 2].

In operation 780, the UE may determine transmission power of the PUCCH, based on the updated value of g(i) and the obtained resource information of the PUCCH. In more detail, the UE may configure a value of $P_{PUCCH}(n)$ by using [Equation 1].

In operation 790, the UE may transmit the PUCCH, based on the determined transmission power of the PUCCH. In more detail, the UE may transmit the PUCCH in an n-th subframe by using $P_{PUCCH}(n)$ configured in operation 780.

Figure 8:
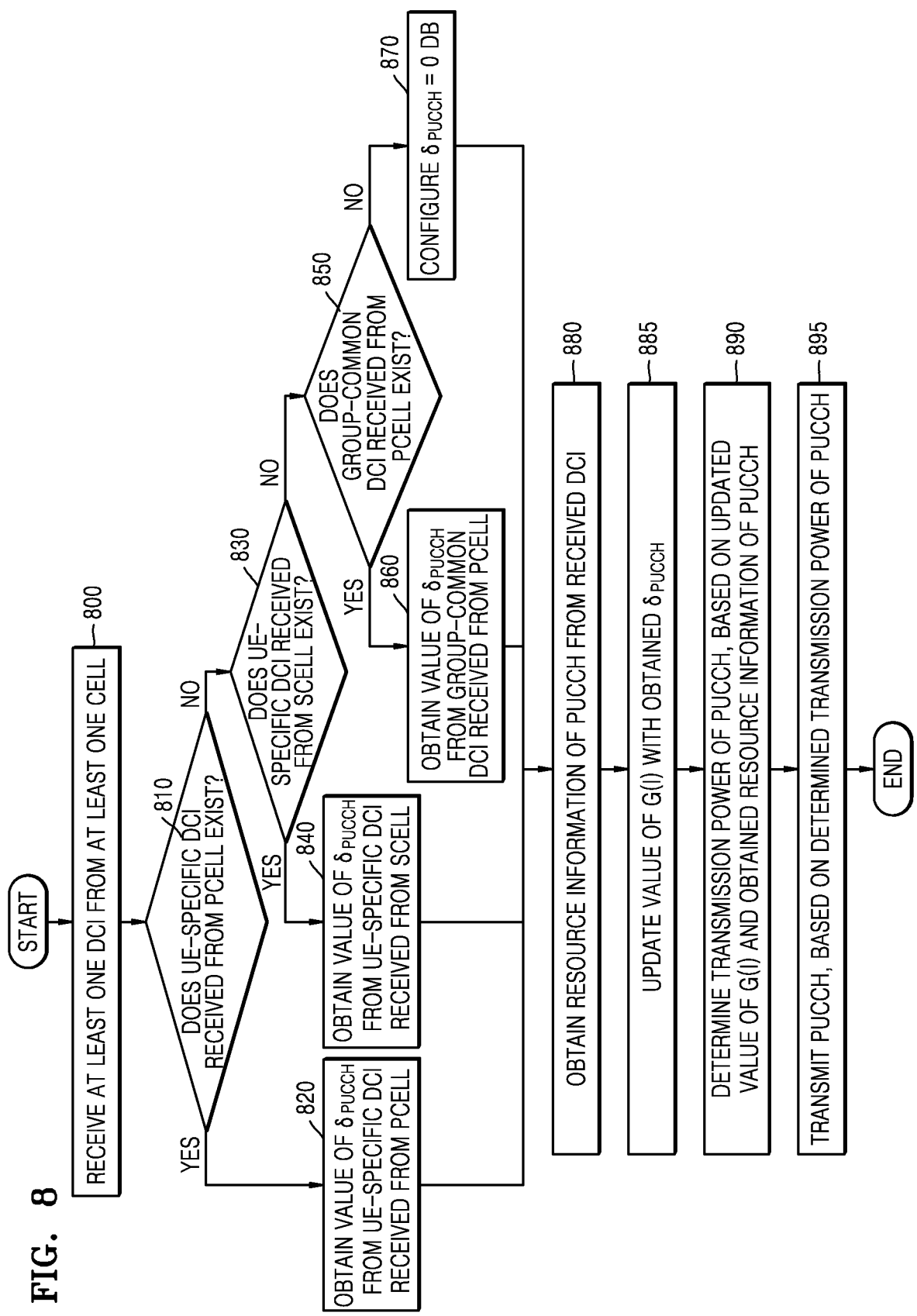
FIG. 8 illustrates a diagram of another example of transmission of DL data and DL control information and transmission of UL control information in a system to which CA is applied, according to an embodiment of the disclosure.

FIG. 8 illustrates a diagram for describing transmission of DL data and DL control information and transmission of UL control information in a system to which CA is applied, according to an embodiment of the disclosure. FIG. 8 is a diagram for particularly describing the embodiment of FIG. 7, for convenience of understanding.

In operation 800, the UE may receive, in a (n−k)-th subframe, one or more DCIs from one or more cells. Then, the UE may transmit a PUCCH to the PCell, in an n-th subframe.

In operation 810, the UE may determine, by using the value of k, whether UE-specific DCI received in the (n−k)-th subframe from the PCell exists.

In operation 820, when the UE-specific DCI received from the PCell exists, the UE may obtain a value of $\delta_{PUCCH}$ from a TPC command field of the UE-specific DCI.

In operation 830, when the UE-specific DCI received from the PCell does not exist, the UE may determine whether UE-specific DCI received from SCell exists.

In operation 840, when the UE-specific DCI received from the SCell exists, the UE may obtain a value of $\delta_{PUCCH}$ from a TPC command field of the DCI. When the UE receives two or more UE-specific DCIs from two or more SCells, the UE may obtain a value of $\delta_{PUCCH}$ from a TPC command field of UE-specific DCI received from SCell, according to a predefined rule between the BS and the UE. For example, the UE may obtain a value of $\delta_{PUCCH}$ from a TPC command field of UE-specific DCI received from SCell having a lowest cell index.

In operation 850, when there are not UE-specific DCIs received from PCell and SCell, the UE may determine whether there is group-common DCI received from the PCell.

In operation 860, when the group-common DCI received from the PCell exists, the UE may obtain a value of $\delta_{PUCCH}$ from the group-common DCI.

In operation 870, when UE-specific DCI received from the PCell or SCell does not exist and the group-common DCI received from the PCell does not exist, the UE may configure the value of $\delta_{PUCCH}$ as 0 dB.

In operation 880, the UE may obtain resource information of PUCCH from DCI transmitted from one cell from among the PCell or the SCells. In an embodiment of the disclosure, the BS may transmit resource information of PUCCH via UE-specific DCI (or, group-common DCI, same as below) of the PCell and the one or more SCells, and here, the BS may configure the resource information of the PUCCH, which is transmitted via the UE-specific DCI, to be same in all cells and may transmit the resource information of the PUCCH to the UE. In another embodiment of the disclosure, operation 880 may be performed after operation 885.

In operation 885, the UE may update a value of g(i) with obtained $\delta_{PUCCH}$. In more detail, the UE may update (where, i=n) the value of g(i) with the obtained $\delta_{PUCCH}$ by using [Equation 2]. The UE may update (where, i=n) the value of g(i) by using [Equation 2], based on the obtained $\delta_{PUCCH}$ (a case where UE-specific DCI received from PCell or SCell exists or a case where group-common DCI received from the PCell exists and UE-specific DCI received from the SCell does not exist), or the value of $\delta_{PUCCH}$ configured as 0 dB (a case where UE-specific DCI or group-common DCI received from the PCell does not exist and UE-specific DCI received from the SCell does not exist).

In operation 890, the UE may determine transmission power of the PUCCH, based on the updated value of g(i) and the obtained resource information of the PUCCH. In more detail, the UE may configure a value of $P_{PUCCH}(n)$ by using [Equation 1].

In operation 895, the UE may transmit the PUCCH, based on the determined transmission power of the PUCCH. In more detail, the UE may transmit the PUCCH in an n-th subframe by using $P_{PUCCH}(n)$ configured in operation 890.

Figure 9:
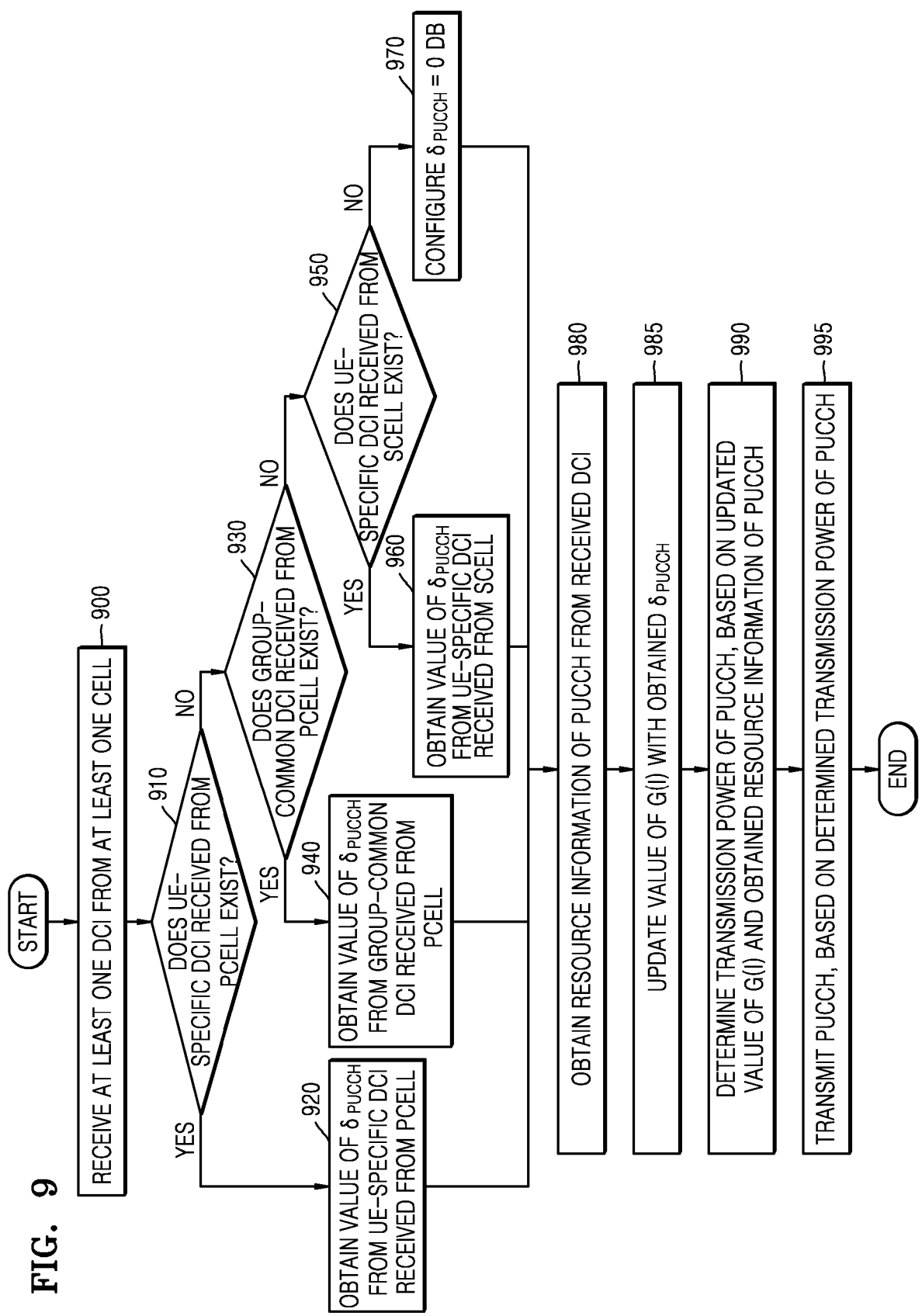
FIG. 9 illustrates a diagram of another example of transmission of DL data and DL control information and transmission of UL control information in a system to which CA is applied, according to an embodiment of the disclosure.

FIG. 9 illustrates a diagram for describing transmission of DL data and DL control information and transmission of UL control information in a system to which CA is applied, according to an embodiment of the disclosure. FIG. 9 is a diagram for particularly describing the embodiment of FIG. 7, for convenience of understanding.

In operation 900, the UE may receive, in a (n−k)-th subframe, one or more DCIs from one or more cells. Then, the UE may transmit a PUCCH to the PCell, in an n-th subframe.

In operation 910, the UE may determine, by using the value of k, whether UE-specific DCI received in the (n−k)-th subframe from the PCell exists.

In operation 920, when the UE-specific DCI received from the PCell exists, the UE may obtain a value of $\delta_{PUCCH}$ from a TPC command field of the UE-specific DCI.

In operation 930, when the UE-specific DCI received from the PCell does not exist, the UE may determine whether group-common DCI received from the PCell exists.

In operation 940, when the group-common DCI received from the PCell exists, the UE may obtain a value of $\delta_{PUCCH}$ from the group-common DCI. According to an embodiment of the disclosure, in a case where the UE-specific DCI received from the PCell does not exist, the UE may first determine whether group-common DCI transmitted from the PCell exists, and when the corresponding DCI exists, the UE may obtain a value of $\delta_{PUCCH}$ from the group-common DCI.

In operation 950, when UE-specific DCI nor group-common DCI transmitted from the PCell does not exist, the UE may determine whether UE-specific DCI received from SCell exists.

In operation 960, when the UE-specific DCI received from the SCell exists, the UE may obtain a value of $\delta_{PUCCH}$ from a TPC command field of the DCI. When the UE receives two or more UE-specific DCIs from two or more SCells, the UE may obtain a value of $\delta_{PUCCH}$ from a TPC command field of UE-specific DCI received from SCell, according to a predefined rule between the BS and the UE. For example, the UE may obtain a value of $\delta_{PUCCH}$ from a TPC command field of UE-specific DCI received from SCell having a lowest cell index.

In operation 970, when UE-specific DCI or group-common DCI received from the PCell does not exist, and UE-specific DCIs received from SCells do not exist, the UE may configure the value of $\delta_{PUCCH}$ as 0 dB.

In operation 980, the UE may obtain resource information of PUCCH from DCI transmitted from one cell from among the PCell or the SCells. In an embodiment of the disclosure, the BS may transmit resource information of PUCCH via UE-specific DCI (or, group-common DCI, same as below) of the PCell and the one or more SCells, and here, the BS may configure the resource information of the PUCCH, which is transmitted via the UE-specific DCI, to be same in all cells and may transmit the resource information of the PUCCH to the UE. In another embodiment of the disclosure, operation 980 may be performed after operation 985.

As another example of PUCCH resource information transmission by the BS, the BS may transmit PUCCH resource information to the UE, according to a predefined rule between the BS and the UE. That is, the BS may not equally configure and transmit PUCCH resource information via UE-specific DCI transmitted from one cell from among the PCell or the SCells. According to an embodiment of the disclosure, the UE and the BS may predefine to transmit PUCCH resource information via UE-specific DCI transmitted from the PCell. In this case, the UE may obtain the PUCCH resource information via the UE-specific DCI transmitted from the PCell, and may ignore PUCCH resource information included in UE-specific DCI transmitted from SCell or SCells, regardless of configuration by the BS. As another example, the BS may configure a field of PUCCH resource information with a particular value, the PUCCH resource information being included in UE-specific DCI transmitted from SCell or SCells. For example, the BS may configure all bits of the field as "0" or "1." Upon reception of this, the UE may ignore the field about the PUCCH resource information. Although an example is provided in which the field about the PUCCH resource information included in the UE-specific DCI transmitted from SCell or SCells is configured with the particular value, in general, the BS may transmit PUCCH resource information valid only for UE-specific DCI transmitted from a particular cell predefined with the UE, and may transmit PUCCH resource information invalid for UE-specific DCI transmitted from other cells. In this regard, the invalid PUCCH resource information may be regarded as a field about PUCCH resource information configured with a particular value.

As another example of PUCCH resource information transmission by the BS, the BS may inform the UE of PUCCH resource information via UE-specific DCIs transmitted from PCell and SCell having a lowest cell index. The UE not having received the UE-specific DCI from the PCell may obtain the PUCCH resource information via reception of the UE-specific DCI transmitted from the SCell having a lowest cell index.

The UE may obtain the PUCCH resource information from the UE-specific DCIs transmitted from the PCell and the SCell having a lowest cell index, and may ignore PUCCH resource information included in UE-specific DCI transmitted from SCell or SCells, regardless of configuration by the BS. Alternatively, the BS may configure a field of PUCCH resource information with a particular value, the PUCCH resource information being included in UE-specific DCI transmitted from SCell or SCells. For example, the BS may configure all bits of the field as "0" or "1."

As another example, the BS may inform the UE of PUCCH resource information via UE-specific DCI transmitted from particular SCell. For example, the BS may inform the UE of PUCCH resource information via UE-specific DCI transmitted from SCell having a lowest cell index. The UE may ignore PUCCH resource information included in UE-specific DCI transmitted from the PCell and UE-specific DCI transmitted from SCell or SCells, regardless of configuration by the BS.

Alternatively, the BS may configure a field of PUCCH resource information with a particular value, the PUCCH resource information being included in UE-specific DCIs excluding UE-specific DCI to be referred to by the UE to obtain PUCCH resource information. For example, the BS may configure all bits of the field as "0" or "1."

As another example, the BS may inform the UE of PUCCH resource information via UE-specific DCI transmitted from particular SCell. For example, the BS may inform the UE of PUCCH resource information via UE-specific DCI transmitted from SCell having a lowest cell index. The UE may ignore PUCCH resource information included in UE-specific DCI transmitted from the PCell and UE-specific DCI transmitted from SCell or SCells, regardless of configuration by the BS.

Alternatively, the BS may configure a field of PUCCH resource information with a particular value, the PUCCH resource information being included in UE-specific DCIs excluding UE-specific DCI to be referred to by the UE to obtain PUCCH resource information. For example, the BS may configure all bits of the field as "0" or "1."

As another example, the BS may inform the UE of a cell index to be referred to by the UE to obtain PUCCH resource information, via RRC signaling or a medium access control element (MAC CE).

When obtaining the index, the UE may obtain PUCCH resource information from UE-specific DCI transmitted from a cell having the cell index. The UE may ignore PUCCH resource information transmitted from UE-specific DCIs transmitted from a cell or cells not having an index indicated by the BS.

In operation 985, the UE may update a value of g(i) with obtained $\delta_{PUCCH}$. In more detail, the UE may update (where, i=n) the value of g(i) with the obtained $\delta_{PUCCH}$ by using [Equation 2]. The UE may update (where, i=n) the value of g(i) by using [Equation 2], based on the obtained $\delta_{PUCCH}$ (a case where UE-specific DCI received from PCell or SCell exists or a case where group-common DCI received from the PCell exists and UE-specific DCI received from the SCell does not exist), or the value of $\delta_{PUCCH}$ configured as 0 dB (a case where UE-specific DCI or group-common DCI received from the PCell does not exist and UE-specific DCI received from the SCell does not exist).

In operation 990, the UE may determine transmission power of the PUCCH, based on the updated value of g(i) and the obtained resource information of the PUCCH. In more detail, the UE may configure a value of $P_{PUCCH}(n)$ by using [Equation 1].

In operation 995, the UE may transmit the PUCCH, based on the determined transmission power of the PUCCH. In more detail, the UE may transmit the PUCCH in an n-th subframe by using $P_{PUCCH}(n)$ configured in operation 990.

Figure 10:
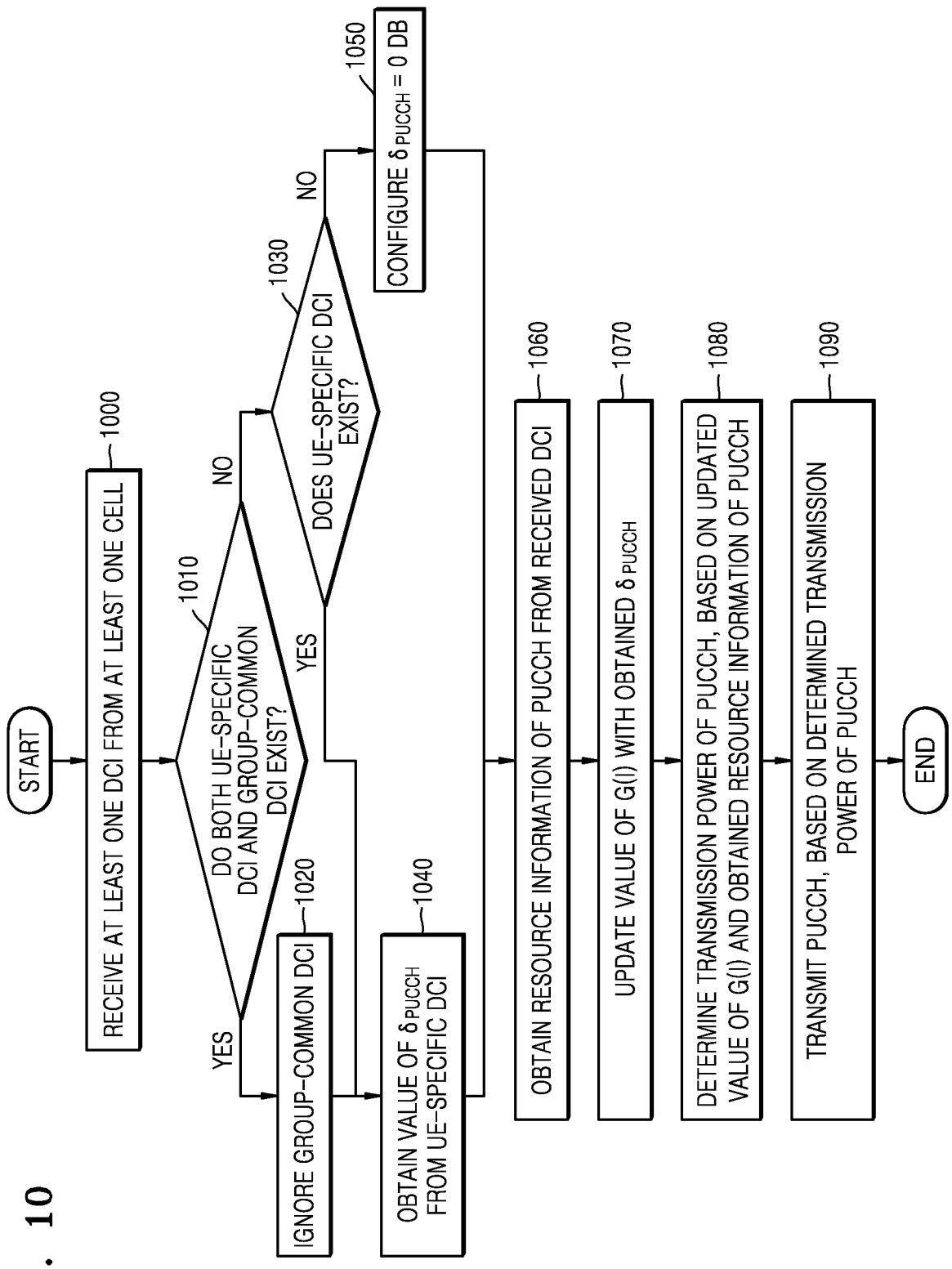
FIG. 10 illustrates a diagram of another example of transmission of DL data and DL control information and transmission of UL control information in a system to which CA is applied, according to an embodiment of the disclosure.

FIG. 10 illustrates a diagram for describing transmission of DL data and DL control information and transmission of UL control information in a system to which CA is applied, according to an embodiment of the disclosure.

In operation 1000, the UE may receive, in a (n−k)-th subframe, one or more DCIs from one or more cells. Then, the UE may transmit a PUCCH to the PCell, in an n-th subframe.

In operation 1010, the UE may determine whether both UE-specific DCI and group-common DCI exist.

In operation 1020, when both the UE-specific DCI and the group-common DCI exist, the UE may ignore the group-common DCI.

In operation 1030, when both the UE-specific DCI and the group-common DCI do not exist, the UE may determine whether UE-specific DCI exists.

In operation 1040, when both the UE-specific DCI and the group-common DCI exist or only the UE-specific DCI exists, the UE may obtain a value of $\delta_{PUCCH}$ from the UE-specific DCI. The according to an embodiment of the disclosure may obtain values of $\delta_{PUCCH}$ from all UE-specific DCIs received from the PCell and one or more SCells. That is, the UE may accumulate and use all values of $\delta_{PUCCH}$ included in the UE-specific DCIs. Values of $\delta_{PUCCH}$ included in group-common DCIs may not be accumulated.

In operation 1050, when the UE-specific DCI does not exist, the UE may configure the value of $\delta_{PUCCH}$ as 0 dB.

In operation 1060, the UE may obtain resource information of PUCCH from DCI As described above, the UE may obtain resource information of PUCCH by using various methods. In another embodiment of the disclosure, operation 1060 may be performed after operation 1070.

In operation 1070, the UE may update a value of g(i) with obtained $\delta_{PUCCH}$. In more detail, the UE may update (where, i=n) the value of g(i) with the obtained $\delta_{PUCCH}$ by using [Equation 2]. Because the UE can obtain values of $\delta_{PUCCH}$ from all UE-specific DCIs received from the PCell and one or more SCells, the UE may accumulate and use all values of $\delta_{PUCCH}$ included in the UE-specific DCIs. Values of $\delta_{PUCCH}$ included in group-common DCIs may not be accumulated.

In operation 1080, the UE may determine transmission power of the PUCCH, based on the updated value of g(i) and the obtained resource information of the PUCCH. In more detail, the UE may configure a value of $P_{PUCCH}(n)$ by using [Equation 1].

In operation 1090, the UE may transmit the PUCCH, based on the determined transmission power of the PUCCH. In more detail, the UE may transmit the PUCCH in an n-th subframe by using $P_{PUCCH}(n)$ configured in operation 1080.

Figure 11:
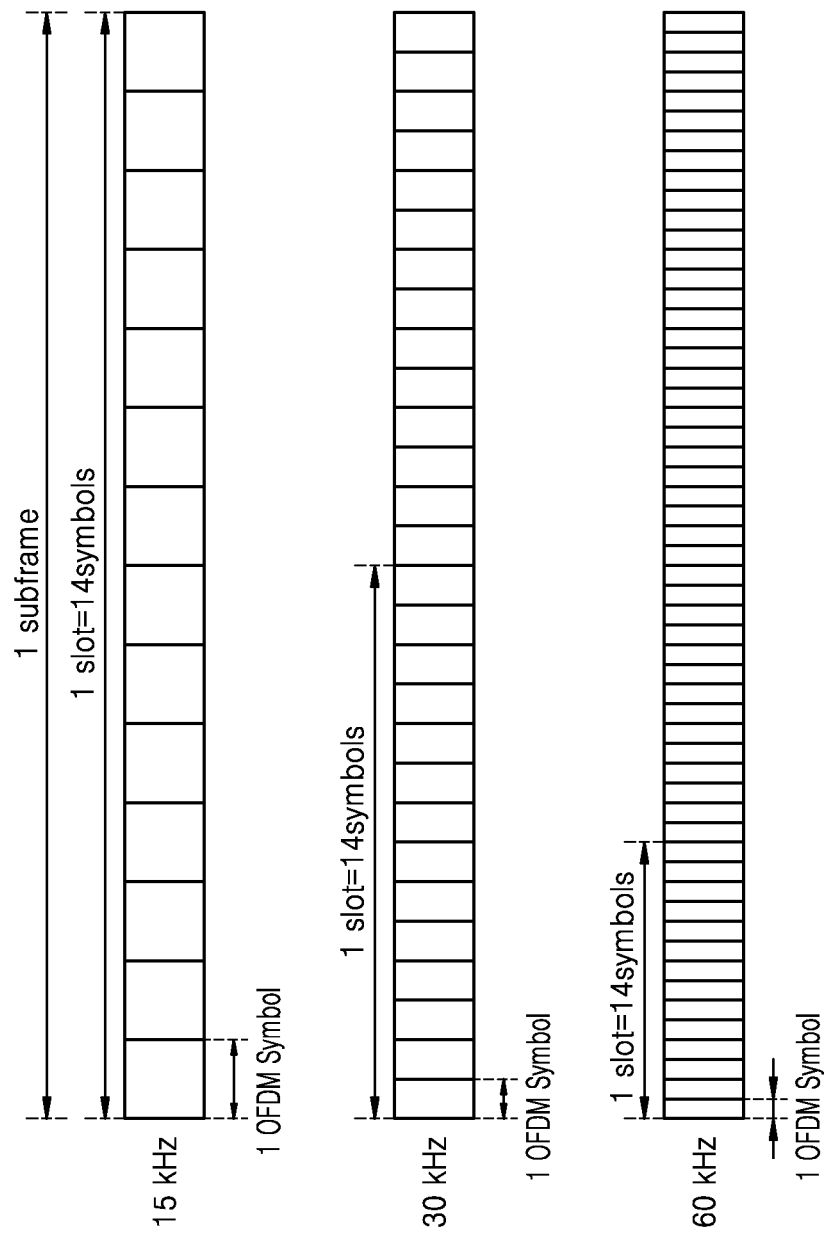
FIG. 11 illustrates a diagram of a subframe and a slot according to an embodiment of the disclosure.

FIG. 11 illustrates a diagram for describing a subframe and a slot according to an embodiment of the disclosure.

One subframe may have a length of 1 ms on a time axis, and one slot may consist of 14 symbols. When subcarrier spacing of 15 kHz is used, one slot consisting of 14 symbols has a length of 1 ms, and thus, one slot and one subframe may be same.

When subcarrier spacing of 30 kHz is used, one slot consisting of 14 symbols has a length of 0.5 ms, and thus, one subframe may consist of two slots. Also, when subcarrier spacing of 60 kHz is used, one slot consisting of 14 symbols has a length of 0.25 ms, and thus, one subframe may consist of four slots. Therefore, when subcarrier spacing $\Delta f$ is N times with respect to 15 kHz, the number of slots consisting of one subframe may be increased by N times.

Therefore, such rules may be applied to a case where subcarrier spacings not shown in FIG. 11 are used. For example, in a case where subcarrier spacing of 120 kHz is used, $\Delta f$ is 8 times with respect to 15 kHz, and thus, the number of slots consisting of one subframe may be 8.

Figure 12A:
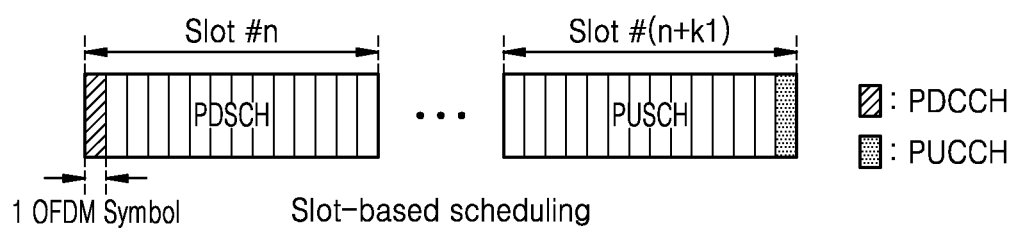
FIGS. 12A and 12B illustrate diagrams for describing slot-based scheduling and mini-slot-based scheduling according to an embodiment of the disclosure.

FIG. 12A illustrates a diagram for describing slot-based scheduling according to an embodiment of the disclosure.

An n-th DL slot may consist of PDCCH and PDSCH, and a (n+k1)-th UL slot may consist of PUSCH and PUCCH. Here, for convenience of descriptions, PDCCH of an n-th slot consists of one symbol, but the PDCCH may consist of two symbols or three symbols. Also, although it is illustrated that a position of a symbol on which the PDCCH is to be transmitted is a first symbol, the disclosure is not limited thereto. That is, a position of a symbol on which the PDCCH is to be transmitted may be a second symbol or after the second symbol. Also, although it is illustrated that PUCCH is to be transmitted on a last symbol in a (n+k1)-th slot, the PUCCH may be transmitted on a random position from among 14 symbols constituting the (n+k1)-th slot. Also, although it is illustrated that the PUCCH consists of one symbol, the number of symbols constituting the PUCCH may be equal to or greater than 2 and equal to or less than 14.

Figure 12B:
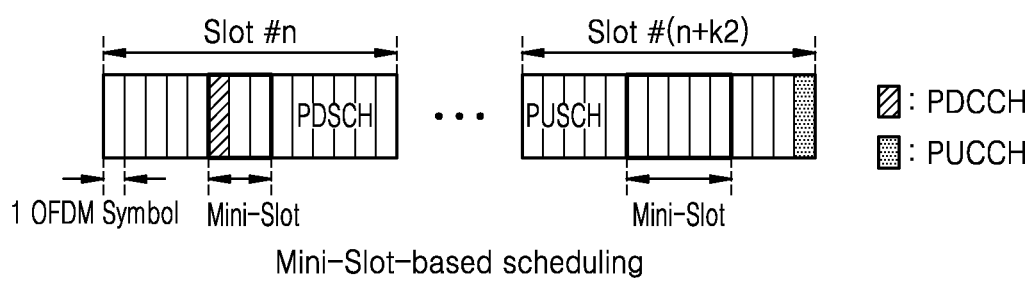

FIG. 12B illustrates a diagram for describing mini-slot-based scheduling according to an embodiment of the disclosure.

A DL mini-slot may consist of PDCCH and PDSCH in an n-th DL slot. Here, although it is illustrated that a mini-slot consists of one PDCCH symbol and two PDSCHs, the disclosure is not limited thereto. That is, a case being smaller than the number of PDSCH symbols used in DL slot-based scheduling may be referred to as the DL mini-slot.

A (n+k2)-th UL slot may consist of PUSCH and PUCCH. Here, for convenience of descriptions, it is illustrated that a UL mini-slot in the (n+k2)-th UL slot consists of 5 symbols, but the disclosure is limited thereto. That is, a case being smaller than the number of PUSCH symbols used in UL slot-based scheduling may be referred to as the UL mini-slot. Also, although it is illustrated that PUCCH is to be transmitted on a last symbol in a (n+k2)-th slot, the PUCCH may be transmitted on a random position from among 14 symbols constituting a (n+k2)-th UL slot. Also, although it is illustrated that the PUCCH consists of one symbol, the number of symbols constituting the PUCCH may be equal to or greater than 2 and equal to or less than 14.

Figure 13:
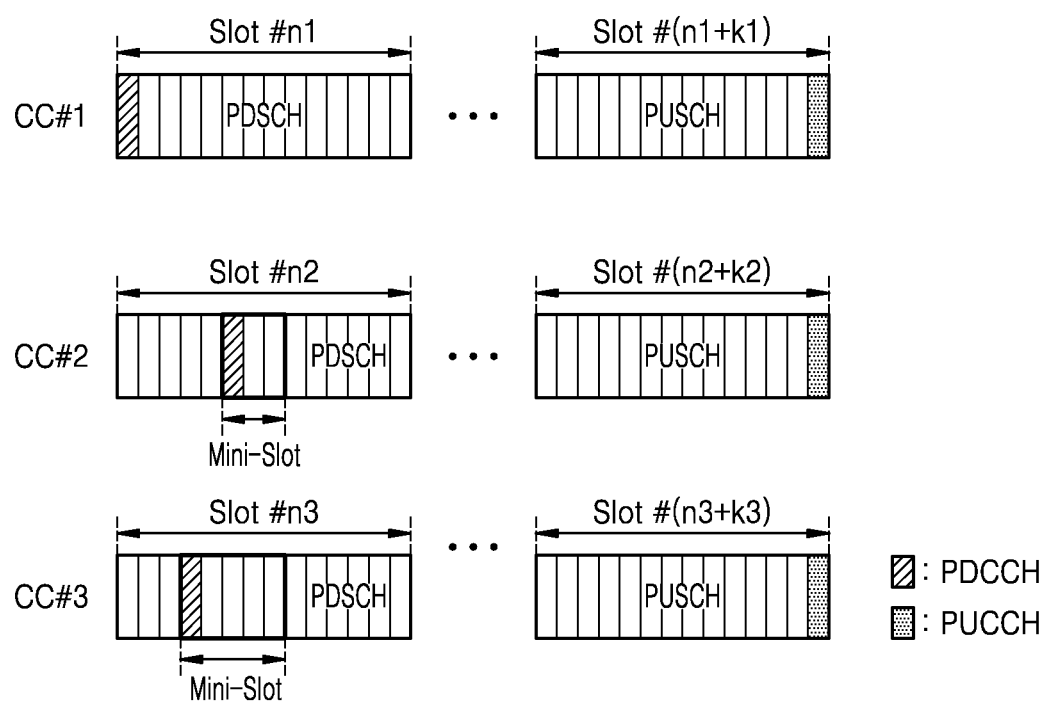
FIG. 13 illustrates a diagram for describing a case where slot-based scheduling and mini-slot-based scheduling coexist in a system to which CA is applied, according to an embodiment of the disclosure.

FIG. 13 illustrates a diagram for describing a case where slot-based scheduling and mini-slot-based scheduling coexist in a system to which CA is applied, according to an embodiment of the disclosure.

It is assumed that a BS transmits PDCCH and PDSCH in an n1-th slot via slot-based scheduling on carrier no. 1 (CC #1), and CC #1 is PCell. Also, it is assumed that the BS transmits PDCCH and PDSCH in a mini-slot consisting of 3 symbols within an n2-th slot via mini-slot-based scheduling on carrier no. 2 (CC #2). Also, it is assumed that the BS transmits PDCCH and PDSCH in a mini-slot consisting of 5 symbols within an n3-th slot via mini-slot-based scheduling on carrier no. 3 (CC #3). Lastly, it is assumed that a PUCCH is transmitted only via CC #1 that is PCell.

Here, n1, n2, n3 may be different from each other, but it is possible that n1+k1=n2+k2=n3+k3. This may mean that HARQ-ACK/NACK information about a PDSCH which consists of a slot or a mini-slot and which is transmitted in a DL of each CC may be transmitted via a PUCCH of a same time.

Also, although it is illustrated in FIG. 13 that the PUCCH is transmitted via all cells, this is merely an example of a case where a UE that does not support CA accesses a particular cell, in view of a system. That is, a UE-2 that accesses CC #2 and does not have a CA support capability may receive PDCCH and PDSCH on a DL carrier of CC #2 and may transmit PUCCH on a UL carrier of CC #2.

Also, a UE-3 that accesses CC #3 and does not have a CA support capability may receive PDCCH and PDSCH on a DL carrier of CC #3 and may transmit PUCCH on a UL carrier of CC #2. Unlike this, a UE-1 having a CA support capability may receive PDCCH and PDSCH on DL carriers of CC #1, CC #2, and CC #3 and may transmit PUCCH on a UL carrier of CC #1. In this regard, it is assumed that CC #1 is PCell. FIG. 13 illustrates three CCs, but the disclosure may be applied to a CA scenario of at least four CCs.

Under the aforementioned assumption, a UE (e.g., the UE-1) having a CA support capability may obtain timing information of a PUCCH (i.e., k1 value) which indicates that the PUCCH is to be transmitted in a (n1+k1)-th slot, resource information of the PUCCH transmitted in the (n1+k1)-th slot, and a value of $\delta_{PUCCH}$ for configuring a transmission power value of the PUCCH, from a DCI field of a PDCCH transmitted in an n1-th slot of CC #1.

The UE-2 may obtain timing information of a PUCCH (i.e., k2 value) which indicates that the PUCCH is to be transmitted in a (n2+k2)-th slot, resource information of the PUCCH transmitted in the (n2+k2)-th slot, and a value of $\delta_{PUCCH}$ for configuring a transmission power value of the PUCCH, from a DCI field of a PDCCH transmitted in a mini-slot within an n2-th slot of CC #2.

Equally, the UE-3 may obtain timing information of a PUCCH (i.e., k3 value) which indicates that the PUCCH is to be transmitted in a (n3+k3)-th slot, resource information of the PUCCH transmitted in the (n3+k3)-th slot, and a value of $\delta_{PUCCH}$ for configuring a transmission power value of the PUCCH, from a DCI field of a PDCCH transmitted in a mini-slot within an n3-th slot of CC #3.

FIG. 14 illustrates a diagram for describing transmission of DL data and DL control information and transmission of UL control information in a CA environment where slot-based scheduling and mini-slot-based scheduling coexist, according to an embodiment of the disclosure.

In operation 1400, a UE may receive one or more DCIs from one or more cells. Here, DCI may be UE-specific DCI or group-common DCI. As illustrated in FIG. 13, the UE may receive, on each CC, PDSCH and PDCCH including control information about the PDSCH which are transmitted via slot-based or mini-slot-based scheduling in an n1-th slot of CC #1, an n2-th slot of CC #2, and an n3-th slot of CC #3. In this regard, the PDCCH received on each CC is PDCCH about slot-based or mini-slot-based scheduling, and thus, DCI may be regarded as UE-specific DCI. Although not illustrated in FIG. 13, in addition to the UE-specific DCI, the UE may receive group-common DCI on each CC. Therefore, the UE may require a method of updating g(i) defined in [Equation 2] for configuring a transmission power value of PUCCH transmitted at a time of n1+k1=n2+k2=n3+k3 illustrated in FIG. 13. That is, when the UE receives two or more UE-specific DCIs or group-common DCIs, the UE may need consideration for an accumulation method with respect to values of $\delta_{PUCCH}$.

In operation 1410, the UE may determine whether the received DCI is within a period. That is, because there is a need for consideration for an accumulation method with respect to values of $\delta_{PUCCH}$, in order to support this, a BS and the UE may predetermine a predefined period (or window).

In operation 1420, when the received DCI is within the period, the UE may obtain at least one value of $\delta_{PUCCH}$. In more detail, the UE may obtain at least one value of $\delta_{PUCCH}$ from the received DCI.

In operation 1430, when the received DCI is not within the period, the UE may configure all values of $\delta_{PUCCH}$ of the received DCI, as 0 dB.

In operation 1440, the UE may update a value of g(i) with obtained or configured $\delta_{PUCCH}$. In more detail, the UE may update (where, i=n) the value of g(i) with the obtained $\delta_{PUCCH}$ by using [Equation 2].

In operation 1450, the UE may determine transmission power of the PUCCH, based on the updated value of g(i). In more detail, the UE may configure a value of $P_{PUCCH}(n)$ by using [Equation 1].

In operation 1460, the UE may transmit the PUCCH, based on the determined transmission power of the PUCCH. In more detail, the UE may transmit the PUCCH in an n-th subframe by using $P_{PUCCH}(n)$ configured in operation 1450.

Figure 15A:
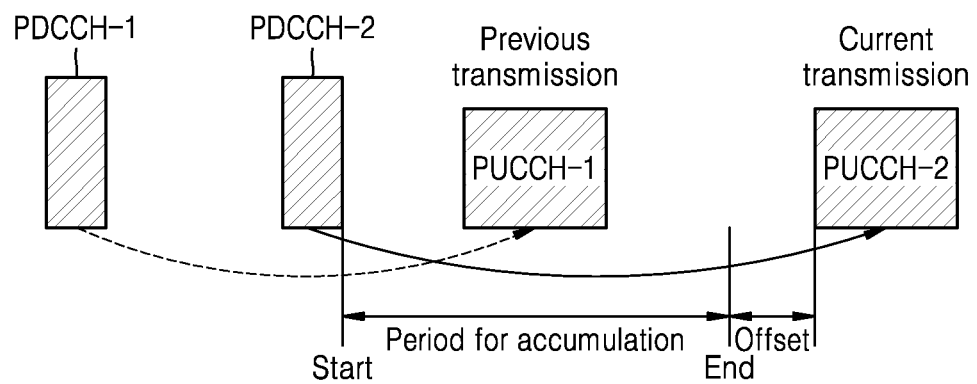
FIG. 15A illustrates a diagram for describing a start point and an end point of accumulation of a value of $\delta_{PUCCH}$ according to an embodiment of the disclosure.
Figure 15B:
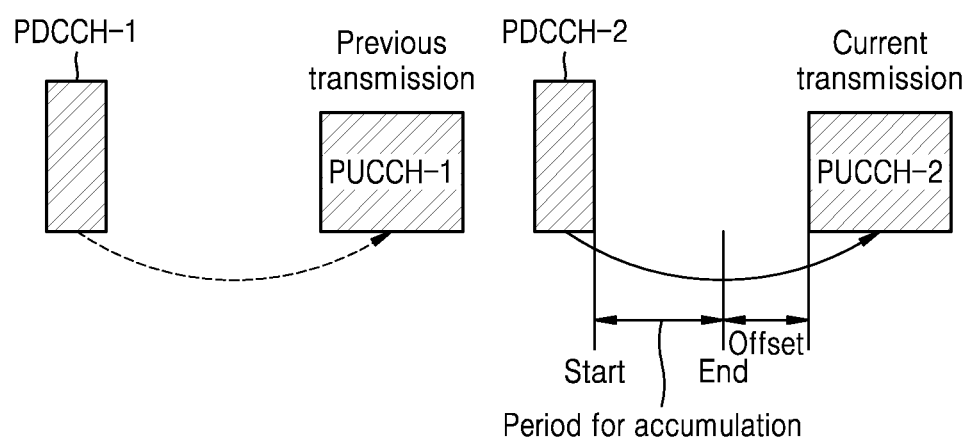
FIG. 15B illustrates a diagram for describing a start point and an end point of accumulation of a value of $\delta_{PUCCH}$ according to an embodiment of the disclosure.

FIGS. 15A and 15B are diagrams for describing a start point and an end point of accumulation of a value of $\delta_{PUCCH}$ according to an embodiment of the disclosure.

FIG. 15A illustrates a diagram for describing a start point and an end point of accumulation of a value of $\delta_{PUCCH}$ according to an embodiment of the disclosure. FIG. 15B illustrates an example of a case where PDCCH-2 is received after PUCCH-1 is transmitted.

A UE according to an embodiment of the disclosure may regard a time when reception of UE-specific DCI including information about current PUCCH transmission is ended, as a time to start accumulation of a value of $\delta_{PUCCH}$, and may obtain values of $\delta_{PUCCH}$ from all DCIs (one or more UE-specific DCIs and group-common DCIs transmitted from one or more cells) received within a predefined period starting from a point when the UE-specific DCI is received, and may accumulate all the obtained values of $\delta_{PUCCH}$.

PDCCH-2 indicates UE-specific DCI including information about PUCCH-2 to be currently transmitted by the UE, and PDCCH-1 indicates UE-specific DCI including information about PUCCH-1 transmitted immediately before the PUCCH-2 to be currently transmitted. Here, a BS and the UE may predefine that UE-specific DCI indicating a start of accumulation of a value of $\delta_{PUCCH}$ (i.e., the UE-specific DCI including the information about transmission of the PUCCH-2 to be currently transmitted) may be transmitted only from PCell.

The BS and the UE may predefine that, when the UE-specific DCI transmitted from the PCell does not exist, UE-specific DCI transmitted from particular SCell indicates a start of accumulation of a value of $\delta_{PUCCH}$. Here, the BS and the UE may predefine that the particular SCell is a cell having a lowest cell index (or a cell having a highest cell index) from among SCells. As another example, the BS may configure the UE with a cell index indicating a start of accumulation of a value of $\delta_{PUCCH}$. Upon reception of this, the UE may start accumulation of a value of $\delta_{PUCCH}$ at a point when reception of UE-specific DCI transmitted from a cell having the cell index is ended.

The accumulation of a value of $\delta_{PUCCH}$ may be ended before transmission of PUCCH (PUCCH-2) to be currently transmitted. That is, the UE may start the accumulation of a value of $\delta_{PUCCH}$ at a point when reception of the PDCCH-2 is ended and then may end the accumulation of a value of $\delta_{PUCCH}$ at a point when transmission of the PUCCH-2 is started. However, in this case, a time period in which the UE can update a value of g(i) of [Equation 2] by using accumulated values of $\delta_{PUCCH}$ and can configure transmission power for transmission of the PUCCH may be insufficient. Here, the accumulation of a value of $\delta_{PUCCH}$ may be ended before transmission of the PUCCH (PUCCH-2) to be currently transmitted is started. This is marked as an offset in FIGS. 15A and 15B.

Such offset information has to be determined, in consideration of a processing time capability of the UE, and may be a predefined value. Alternatively, the BS may configure the UE with the offset information via RRC signaling. Alternatively, based on a value configured by the BS, the UE may calculate the offset information.

Figure 16A:
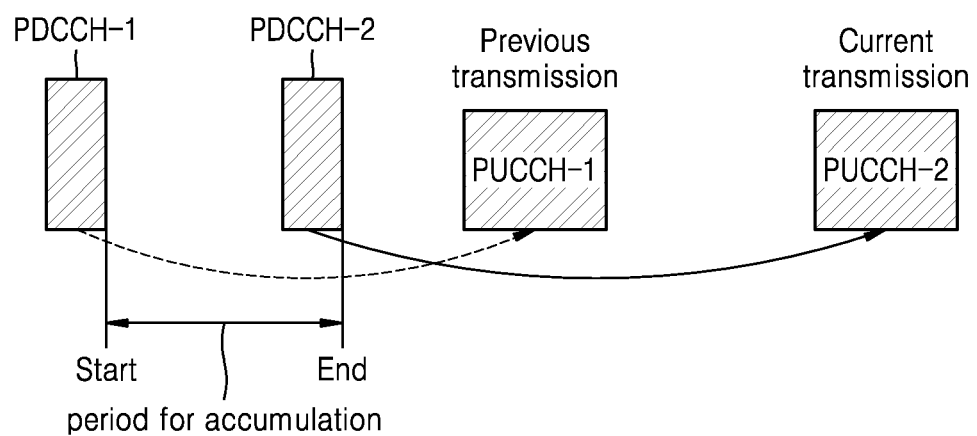
FIG. 16A illustrates a diagram for describing a start point and an end point of accumulation of a value of $\delta_{PUCCH}$ according to an embodiment of the disclosure.
Figure 16B:
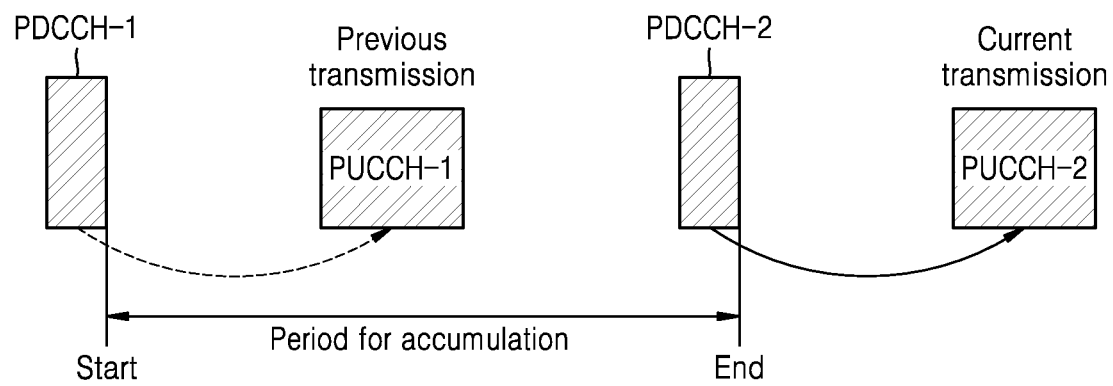
FIG. 16B illustrates a diagram for describing a start point and an end point of accumulation of a value of $\delta_{PUCCH}$ according to an embodiment of the disclosure.

FIGS. 16A and 16B illustrate diagrams for describing a start point and an end point of accumulation of a value of $\delta_{PUCCH}$ according to an embodiment of the disclosure.

FIG. 16A illustrates an example of a case where PDCCH-2 is received before PUCCH-1 is transmitted, and FIG. 16B illustrates an example of a case where PDCCH-2 is received after PUCCH-1 is transmitted.

As another example of a start of accumulation of a value of $\delta_{PUCCH}$, as illustrated in FIGS. 16A and 16B, accumulation of a value of $\delta_{PUCCH}$ may be started based on pre-transmitted PUCCH (PUCCH-1), not in a way accumulation of a value of $\delta_{PUCCH}$ is started based on UE-specific DCI including information about current transmission of PUCCH (PUCCH-2) as described above with reference to FIGS. 15A and 15B. In more detail, PUCCH to be transmitted in a (n1+k1)-th slot of FIG. 13 is defined as "currently transmitted PUCCH (PUCCH-2 of FIG. 16A)," and PUCCH transmitted immediately before the currently transmitted PUCCH is defined as 'immediately-before transmitted PUCCH (PUCCH-1 of FIG. 16A)."

In this regard, a start of accumulation of a value of $\delta_{PUCCH}$ used in configuring a transmission power value of the currently transmitted PUCCH may be determined based on a transmission time of the immediately-before transmitted PUCCH (PUCCH-1). That is, the UE may start accumulation of a value of $\delta_{PUCCH}$, based on a transmission start point of the immediately-before transmitted PUCCH (PUCCH-1) (or a transmission end point of PUCCH-1).

For example, in a case where the transmission time of the immediately-before transmitted PUCCH-1 is a p-th symbol of a j-th slot and the PUCCH-1 consists of L symbols, the UE may start the accumulation of a value of $\delta_{PUCCH}$ on a symbol after the p-th symbol of the j-th slot (based on the transmission start point of the PUCCH-1). Alternatively, the UE may start the accumulation of a value of $\delta_{PUCCH}$ on a symbol after a (p+L)-th symbol of the j-th slot (based on the transmission end point of the PUCCH-1).

Equally, as illustrated in FIGS. 16A and 16B, an end of the accumulation of a value of $\delta_{PUCCH}$ may be performed at a point when reception of the PDCCH-2 including information about the currently transmitted PUCCH-2 is ended. Although not illustrated in FIGS. 16A and 16B, the accumulation of a value of $\delta_{PUCCH}$ may be ended at a point when reception of the PDCCH-2 is started.

Here, the BS and the UE may predefine that UE-specific DCI indicating the end of the accumulation of a value of $\delta_{PUCCH}$ (i.e., PDCCH-2 that includes UE-specific DCI including information about transmission of the PUCCH-2 to be currently transmitted) may be transmitted only from PCell. The BS and the UE may predefine that, when the UE-specific DCI transmitted from the PCell does not exist, UE-specific DCI transmitted from particular SCell indicates the end of the accumulation of a value of $\delta_{PUCCH}$. For example, the BS and the UE may predefine that the particular SCell is a cell having a lowest cell index (or a cell having a highest cell index) from among SCells.

In another embodiment of the disclosure, the BS may configure the UE with a cell index indicating the end of the accumulation of a value of $\delta_{PUCCH}$. Upon reception of this, the UE may accumulate a value of $\delta_{PUCCH}$ up to a point when reception of UE-specific DCI transmitted from a cell having the cell index is ended.

In another embodiment of the disclosure, the BS and the UE may predefine that the UE-specific DCI indicating the end of the accumulation of a value of $\delta_{PUCCH}$ may be transmitted from a same cell having a cell index from which the aforementioned UE-specific DCI indicating the start of the accumulation of a value of $\delta_{PUCCH}$ is transmitted.

In another embodiment of the disclosure, the UE may start accumulation of a value of $\delta_{PUCCH}$ by a particular offset from the transmission start point of the immediately-before transmitted PUCCH (PUCCH-1) (or the transmission end point of PUCCH-1). This will be described in detail with reference to FIG. 17A.

The end of the accumulation of a value of $\delta_{PUCCH}$ may be performed up to a start of transmission of the currently transmitted PUCCH (PUCCH-2) or may be performed up to an offset with respect to the transmission of the currently transmitted PUCCH (PUCCH-2).

Figure 17A:
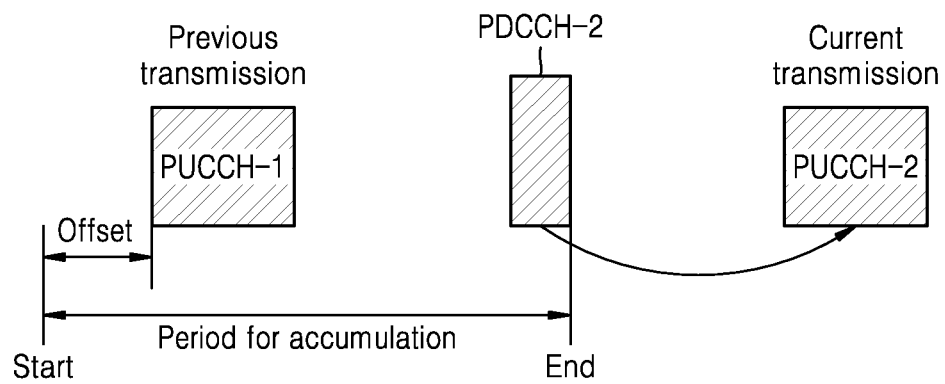
FIG. 17A illustrates a diagram for describing a start point and an end point of accumulation of a value of $\delta_{PUCCH}$ according to an embodiment of the disclosure.
Figure 17B:
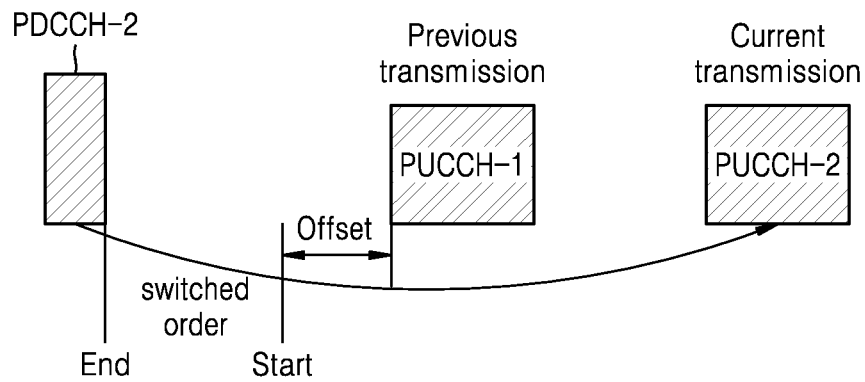
FIG. 17B illustrates a diagram for describing a start point and an end point of accumulation of a value of $\delta_{PUCCH}$ according to an embodiment of the disclosure.

FIGS. 17A and 17B illustrate diagrams for describing a start point and end point of accumulation of a value of $\delta_{PUCCH}$ according to an embodiment of the disclosure.

FIG. 17A illustrates an example of a case where PDCCH-2 is received after PUCCH-1 is transmitted, and FIG. 17B illustrates an example of a case where PDCCH-2 is received before PUCCH-1 is transmitted.

In another embodiment of the disclosure, an end of accumulation of a value of $\delta_{PUCCH}$ may be performed at a point when reception of the PDCCH-2 including information about PUCCH-2 to be currently transmitted is ended, as illustrated in FIGS. 16A to 17B. Also, although not illustrated in FIGS. 16A to 17B, accumulation of a value of $\delta_{PUCCH}$ may be ended at a point when reception of the PDCCH-2 is started.

In FIG. 17A, it is assumed that a transmission time of immediately-before transmitted PUCCH (PUCCH-1) is a p-th symbol of a j-th slot and the PUCCH-1 consists of L symbols. Also, it is assumed that an offset value is K symbols.

In this case, a UE may start accumulation of a value of $\delta_{PUCCH}$ before (or after) K symbols starting from the p-th symbol of the j-th slot (based on a transmission start point of the immediately-before transmitted PUCCH-1). In another embodiment of the disclosure, the UE may start accumulation of a value of $\delta_{PUCCH}$ before (or after) K symbols starting from a (p+L)-th symbol of the j-th slot (based on a transmission end point of the immediately-before transmitted PUCCH-1).

The offset value may be a predefined value, or the BS may configure the UE with the offset value via RRC signaling. Alternatively, based on a value configured by the BS, the UE may calculate the offset value.

According to an embodiment of the disclosure, the offset value is a symbol, but embodiments of the disclosure may be applied to a case where the offset value is a slot or a subframe. Also, in FIG. 17A, equally, the UE may start accumulation of a value of $\delta_{PUCCH}$ by a particular offset.

However, when the accumulation of a value of $\delta_{PUCCH}$ is started and ended by using a method described above, i.e., when reception of PDCCH-2 is performed before transmission of PUCCH-1, as illustrated in FIG. 17B, the UE may not be able to perform the accumulation of a values of $\delta_{PUCCH}$. In this case, the UE may not accumulate a value of $\delta_{PUCCH}$. That is, the value of $\delta_{PUCCH}$ may be configured as 0.

In another embodiment of the disclosure, with respect to accumulation of a value of $\delta_{PUCCH}$, the UE may not use a start point of accumulation of a value of $\delta_{PUCCH}$ and an end point of accumulation of a value of $\delta_{PUCCH}$ but may use the start point of accumulation of a value of $\delta_{PUCCH}$ and a period in which accumulation of a value of $\delta_{PUCCH}$ is to be performed. In this case, it may be required to provide configuration as to how long the UE has to perform accumulation of a value of $\delta_{PUCCH}$. As an example, therefor, the BS may configure, via RRC signaling, a period, i.e., a value of a window in which accumulation is to be performed. Upon reception of this, the UE may accumulate values of $\delta_{PUCCH}$ obtained from one or more DCIs received from one or more cells, during a window configured via RRC by the BS, the window starting from a point when reception of UE-specific DCI indicating a start of accumulation of values of $\delta_{PUCCH}$ is completed.

When there is no DCI received during a predefined window or a window period configured by the BS, the UE may configure the values of $\delta_{PUCCH}$ as 0 dB. By using an accumulated value of $\delta_{PUCCH}$ or a value of $\delta_{PUCCH}$ configured as 0 dB, the UE may update a value of g(i) by using [Equation 2] (where, i=n1+k1=n2+k2=n3+k3). The UE may configure a transmission power value of the PUCCH to be transmitted to PCell, based on the updated value of g(i) and PUCCH resource information obtained from UE-specific DCI. Then, the UE may transmit the PUCCH in a (n1+k1)-th UL slot, based on the configured transmission power value of the PUCCH.

With reference to FIG. 17B, descriptions of the start point and end point of accumulation of a value of $\delta_{PUCCH}$ for transmission of the PUCCH are provided, but the descriptions may be equally applied to a start point and end point of accumulation of values of $\delta_{PUCCH}$ for transmission of PUSCH. For example, PUCCH-1 of FIG. 17B may be regarded as PUSCH-1, and PUCCH-2 may be regarded as PUSCH-2. PDCCH-2 may be regarded as UE-specific DCI including resource allocation information or the like about transmission of the PUSCH-2. In this regard, the PUSCH-1 may not be PUSCH (grant-based PUSCH) being allocated a resource via UE-specific DCI but may be grant-free PUSCH configured via RRC. In this case, the PDCCH-2 may be received before the PUSCH-1 is transmitted, and as described with reference to FIG. 17B, $\delta_{PUCCH}$ accumulation may be performed, transmission power of PUSCH may be configured, and then the PUSCH may be transmitted.

Figure 18:
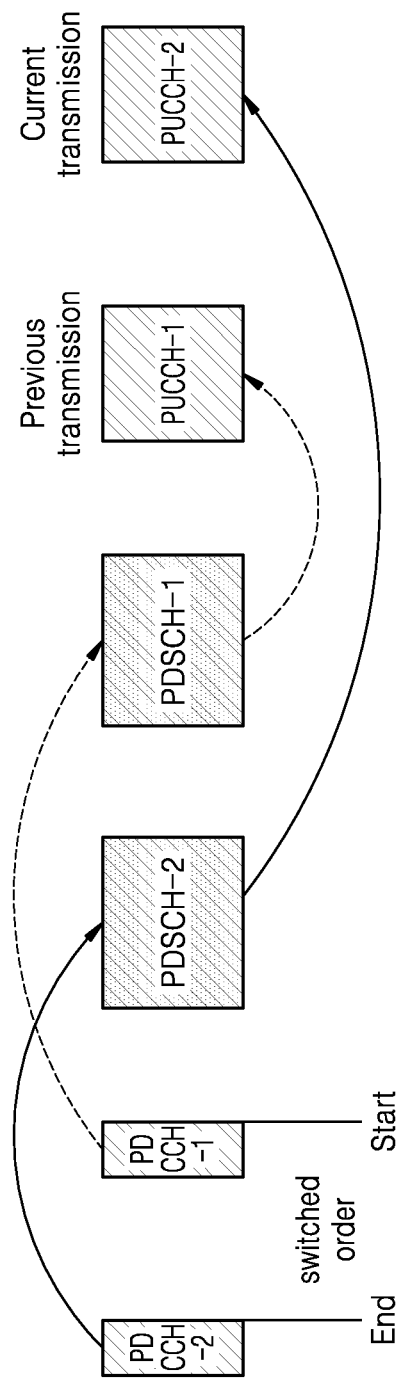
FIG. 18 illustrates a diagram for describing a start point and an end point of accumulation of a value of $\delta_{PUCCH}$ according to an embodiment of the disclosure.

FIG. 18 illustrates a diagram for describing a start point and end point of accumulation of a value of $\delta_{PUCCH}$ according to an embodiment of the disclosure.

As illustrated in FIG. 18, an order of the start point and the end point may be switched. In this case, as illustrated in FIG. 18, PDCCH-1 may include resource allocation of PDSCH-1 and transmission information of PUCCH-1, and PDCCH-2 may include resource allocation of PDSCH-2 and transmission information of PUCCH-2. As described with reference to FIGS. 12A, 12B, and 13, PDSCH-1/PDSCH-2/PUCCH-1/PUCCH-2 may consist of different number of symbols, and different scheduling schemes of mini-slot-based scheduling or slot-based scheduling may be used.

Therefore, as illustrated in FIG. 18, after the UE receives PDCCH (PDCCH-2) including information about PUCCH (PUCCH-2) to be currently transmitted, the UE may receive PDCCH (PDCCH-1) including information about pre-transmitted PUCCH (PUCCH-1).

Here, as described with reference to FIG. 16, when the start point of accumulation of a value of $\delta_{PUCCH}$ and the end point of accumulation of a value of $\delta_{PUCCH}$ are used, an order of the start point and the end point may be switched. In this case, the UE may not perform accumulation of a value of $\delta_{PUCCH}$. That is, the value of $\delta_{PUCCH}$ may be configured as 0.

In another embodiment of the disclosure, a start point and an end point of accumulation of a value of $\delta_{PUCCH}$ may be equal to each other. In this case, the UE may accumulate values of $\delta_{PUCCH}$ obtained from one or more DCIs received at the start point of accumulation of a value of $\delta_{PUCCH}$ (or the end point of accumulation of a value of $\delta_{PUCCH}$), by using the method described above.

In afore-described embodiments where the start point of accumulation of a value of $\delta_{PUCCH}$ and an accumulation window period are used, there may be a case where the accumulation window period is 0 (i.e., only the start point of accumulation of a value of $\delta_{PUCCH}$ is received). In this case, the UE may accumulate values of $\delta_{PUCCH}$ obtained from one or more DCIs received only at the start point of accumulation of a value of $\delta_{PUCCH}$, by using the method described above. That is, the case where the accumulation window period is 0 may be processed as a case where a start point and an end point of accumulation of a value of $\delta_{PUCCH}$ are equal to each other. In another embodiment of the disclosure, when the accumulation window period is 0, the UE may not perform accumulation of a value of $\delta_{PUCCH}$ (i.e., the value of $\delta_{PUCCH}$ may be configured as 0).

With reference to FIG. 14, a method of accumulating values of $\delta_{PUCCH}$, when the UE receives two or more DCIs from one or more cells in a CA environment, has been described, but the disclosure is not limited to the environment and may be applied to a case where two or more DCIs are received from one cell.

When the UE receives one DCI or two or more DCIs from one cell or two or more cells in a system to which CA is applied, by using a UL transmission power control method according to the disclosure, the UE may assure UL performance by accumulating values of transmission power control parameters obtained from the DCIs and may minimize interference to an adjacent cell.

With reference to FIGS. 15A to 18, an accumulation method for determining PUSCH or PUCCH transmission power is described. According to another embodiment of the disclosure, PUSCH or PUCCH transmission power may be determined according to UplinkPower control of 3GPP TS 38.213 section 7.

Figure 19:
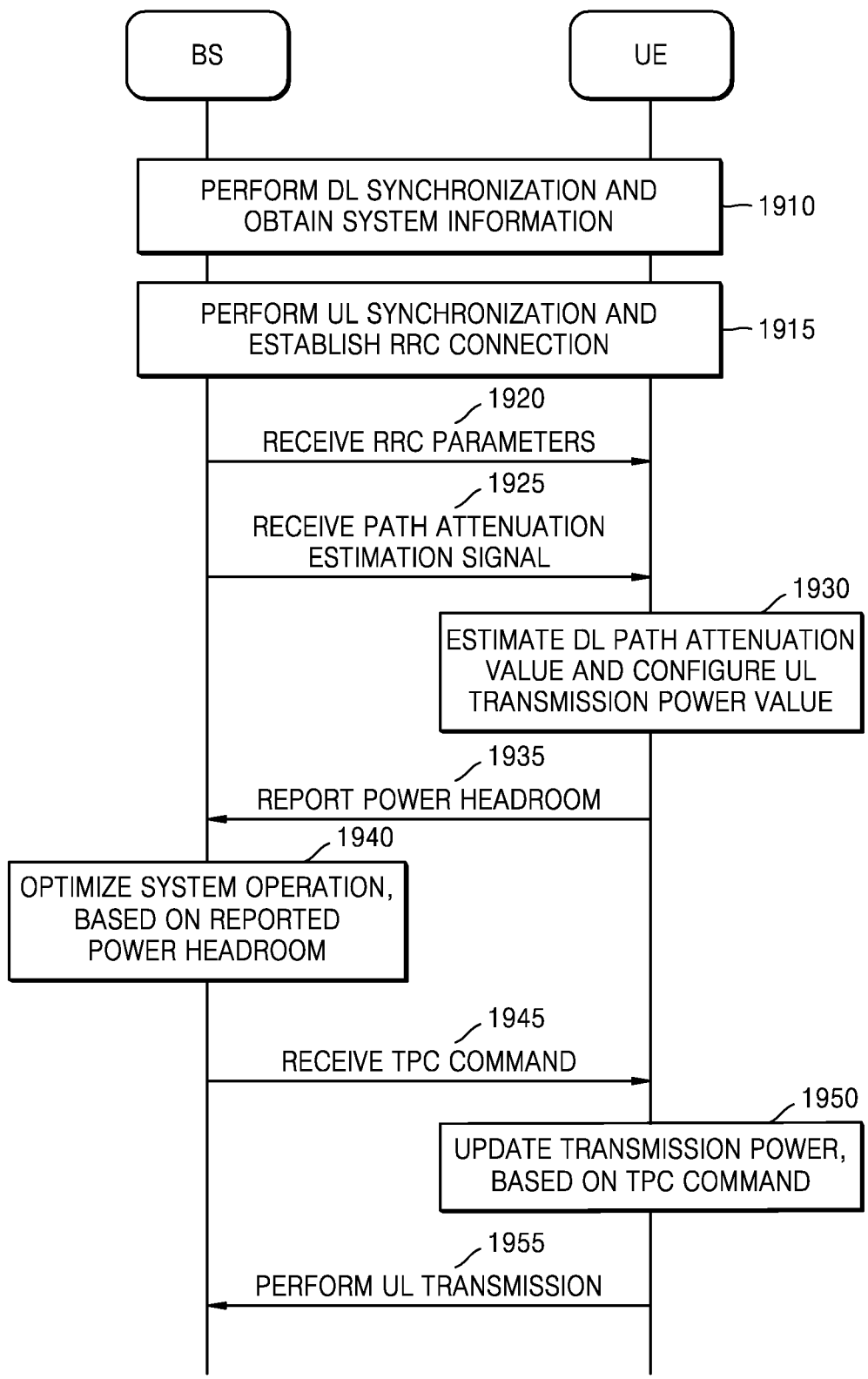
FIG. 19 illustrates a procedure in which a base station (BS) controls transmission power of a UE in a cellular system according to some embodiments of the disclosure.

FIG. 19 illustrates a procedure in which a BS controls transmission power of a UE in a cellular system according to an embodiment of the disclosure.

In operation 1910, the UE within coverage of the BS may perform DL synchronization with the BS and may obtain system information. According to some embodiments of the disclosure, the DL synchronization may be performed via primary synchronization signal/secondary synchronization signal (PSS/SSS) received from the BS. The UE that performed the DL synchronization may receive a master information block (MIB) and a system information block (SIB) and obtain the system information from the BS.

In operation 1915, the UE may perform UL synchronization with the BS via a random access procedure and may establish RRC connection. In the random access procedure, the UE may transmit a random access preamble and message3 (msg3) to the BS via a UL. Here, when the random access preamble and the msg3 are transmitted, UL transmission power control may be performed. In detail, the UE may receive parameters for the UL transmission power control from the BS via the obtained system information, e.g., the SIB, or may perform the UL transmission power control by using a predefined parameter. In another embodiment of the disclosure, the UE may measure reference signal received power (RSRP) from a path attenuation estimation signal transmitted from the BS, and may estimate a DL path attenuation value by using [Equation 3]. Then, based on the estimated DL path attenuation value, the UE may configure a UL transmission power value for transmitting the random access preamble and the msg3.

$$\text{DL path attenuation=transmission power of BS signal−RSRP measured by UE.} \quad \text{[Equation 3]}$$

In [Equation 3], the transmission power of the BS signal indicates transmission power of a DL path attenuation estimation signal transmitted by the BS. The DL path attenuation estimation signal transmitted by the BS may be a CRS or a synchronization signal block (SSB). When a path attenuation estimation signal is a CRS, the transmission power of the BS signal may indicate transmission power of the CRS, and may be transmitted to the UE via a referenceSignalPower parameter of the system information. When the path attenuation estimation signal is an SSB, the transmission power of the BS signal may indicate transmission power of a secondary synchronization signal (SSS) and a demodulation reference signal (DMRS) that is transmitted via a physical broadcast channel (PBCH), and may be transmitted to the UE via an ss-PBCH-BlockPower parameter.

In operation 1920, the UE may receive, from the BS, RRC parameters for UL transmission power control via UE-specific RRC signaling or common RRC signaling. The received transmission power control parameters may be different from each other according to types of a UL channel and types of a signal. That is, transmission power control parameters to be applied to transmission of PUCCH, PUSCH, and SRS may be different from each other. Also, as described above, a transmission power control parameter the UE received from the BS via a SIB before RRC connection establishment or transmission power control parameters the UE used as a predefined value before the RRC connection establishment may be included in the RRC parameters that are transmitted from the BS after the RRC connection establishment. The UE may use a RRC parameter value so as to control UL transmission power, the RRC parameter value being received from the BS after the RRC connection establishment.

In operation 1925, the UE may receive, from the BS, a path attenuation estimation signal. In detail, after the RRC connection establishment with the UE, the BS may configure a channel state information-reference signal (CSI-RS) as a path attenuation estimation signal for the UE. In this case, the BS may transmit, to the UE, information about transmission power of the CSI-RS via a powerControlOffsetSS parameter of UE dedicated RRC information. Here, powerControlOffsetSS may indicate a transmission power offset between the SSB and the CSI-RS.

In operation 1930, the UE may estimate a DL path attenuation value, and may configure a UL transmission power value. In more detail, the UE may measure a DL RSRP by using the CSI-RS, and may estimate the DL path attenuation value by using [Equation 1] by using the information about transmission power of the CSI-RS received from the BS. Then, based on the estimated DL path attenuation value, the UE may configure the UL transmission power value for transmission of PUCCH, PUSCH, and SRS.

In operation 1935, the UE may perform power headroom reporting (PHR) on the BS. A power headroom may indicate a difference between current transmission power of the UE and maximum output power of the UE.

In operation 1940, the UE may optimize system operation, based on the reported power headroom. For example, when a value of a power headroom a particular UE reports to the BS is a positive value, the BS may allocate more resource blocks (RBs) to the particular UE, thereby increasing system yield.

In operation 1945, the UE may receive, from the BS, a transmission power control command (TPC). When a value of a power headroom a particular UE reports to the BS is a negative value, the BS may allocate fewer resources to the particular UE or may decrease transmission power of the particular UE via a TPC. By doing so, the BS may increase system yield or may decrease unnecessary power consumption by the UE.

In operation 1950, the UE may update transmission power, based on a TPC command. Here, the TPC command may be transmitted to the UE via UE-specific DCI or group common DCI. Therefore, the BS may dynamically control transmission power of the UE via the TPC command.

In operation 1955, the UE may perform UL transmission, based on the updated transmission power.

In another embodiment of the disclosure, PUCCH may be replaced by PUSCH in descriptions provided with reference to FIGS. 1 to 19.

In the 5G communication system, PUSCH transmission power may be determined by using [Equation 4].

$$P_{PUSCH}(i, j, q_d, l) = \min\left\{ \begin{array}{l} P_{CMAX,f,c}(i), \\ P_{0_{PUSCH},b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\} \text{ [dBm]}. \quad \text{[Equation 4]}$$

In [Equation 4], $P_{CMAX,f,c}(i)$ indicates maximum transmission power configured for the UE with respect to carrier f of a serving cell c in PUSCH transmission occasion i. $P_{0_{PUSCH},b,f,c}(j)$ is a configured reference transmission power configuration value according to an active UL bandwidth part (BWP) of carrier f of the serving cell c, and has different values according to various transmission types j. In a case where PUSCH transmission corresponds to message3 PUSCH for a random access, PUSCH is a configured grant PUSCH, or how PUSCH is scheduled, $M_{RB,b,f,c}^{PUSCH}(i)$ may have various values. $M_{RB,b,f,c}^{PUSCH}(i)$ indicates a size of a frequency to which PUSCH is allocated. $\alpha_{b,f,c}(j)$ indicates a compensation rate level value with respect to a pathloss of UL BWP b of carrier f of the serving cell c, may be configured by an upper signal, and may have different values according to j. $PL_{b,f,c}(q_d)$ is a DL pathloss estimation value of UL BWP b of carrier f of the serving cell c, and uses a value measured via a reference signal in an active DL BWP. The reference signal may be a SS/PBCH block or a CSI-RS. As described with [Equation 3], a DL pathloss may be calculated. In another embodiment of the disclosure, $PL_{b,f,c}(q_d)$ is a DL path attenuation value and indicates path attenuation calculated by the UE using [Equation 3]. According to configuration by an upper signal, the UE calculates path attenuation based on a reference signal resource associated with a SS/PBCH block or a CSI-RS. The reference signal resource may be selected from various reference signal resource sets by an upper signal or an L1 signal, and the UE calculates the path attenuation based on the reference signal resource. $\Delta_{TF,b,f,c}(i)$ is a value determined by a modulation and coding scheme (MCS) value of PUSCH in PUSCH transmission occasion i of UL BWP b of carrier f of the serving cell c. $f_{b,f,c}(i, l)$ is a power adjustment adaptive value and the UE may dynamically adjust a power value, in response to a TPC command.

The TPC command is divided into an accumulated mode and an absolute mode, and one of the two modes is determined by an upper signal. In the accumulated mode, a currently-determined power adjustment adaptive value is accumulated to a value indicated by the TPC command, may be increased or decreased, in response to the TPC command, and has a relation of $f_{b,f,c}(i, l) = f_{b,f,c}(i-i_0, l) + \Sigma \delta_{PUSCH,b,f,c}$. $\delta_{PUSCH,b,f,c}$ is the value indicated by the TPC command. In the absolute mode, regardless of the currently-determined power adjustment adaptive value, a value is determined by the TPC command and has a relation of $f_{b,f,c}(i, l) = \delta_{PUSCH,b,f,c}$. [Table 6] below shows values that are indicatable by the TPC command.

TABLE 6

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 0 | −1 | −4 |
| 1 | 0 | −1 |
| 2 | 1 | 1 |
| 3 | 3 | 4 |

[Equation 4-1] below is an equation for determining PUCCH transmission power.

$$P_{PUCCH,b,f,c}(i, q_u, q_d, l) = \min\left\{\begin{array}{l} P_{CMAX,f,c}(i), \\ P_{0_{PUCCH},b,f,c}(q_u) + 10 \log_{10}\left(2^\mu \cdot M_{RB,b,f,c}^{PUCCH}(i)\right) + PL_{b,f,c}(q_d) \cdot + \Delta_{F_{PUCCH}}(i) + \Delta_{TF,b,f,c}(i) + f_{b,f,c}(i, l) \end{array}\right\} \quad \text{[Equation 4-1]}$$

[dBm].

In [Equation 4-1], $P_{0_{PUCCH},b,f,c}(q_u)$ is a configured reference transmission power configuration value, has different values according to various transmission types $q_u$, and its value may be changed by RRC or an upper signal such as a MAC CE. When the value is changed by the MAC CE, when a slot in which HARQ-ACK with respect to PDSCH on which the MAC CE is received is k, the UE may determine that the value is to be applied from a slot of k+$k_{offset}$. $k_{offset}$ has different values according to subcarrier spacings, and may have, for example, 3 ms. $M_{RB,b,f,c}^{PUCCH}(i)$ is a frequency resource set size to which PUCCH is allocated. $PL_{b,f,c}(q_d)$ is a path attenuation estimation value of the UE, and as described with [Equation 4], the UE calculates a value based on a particular reference signal from among various CSI-RSs or SS/PBCH, according to configuration by an upper signal and various transmission types j. A same $q_d$ is applied to PUCCHs that are repetitively transmitted. A same $q_u$ is applied to the PUCCHs that are repetitively transmitted.

Figure 20:
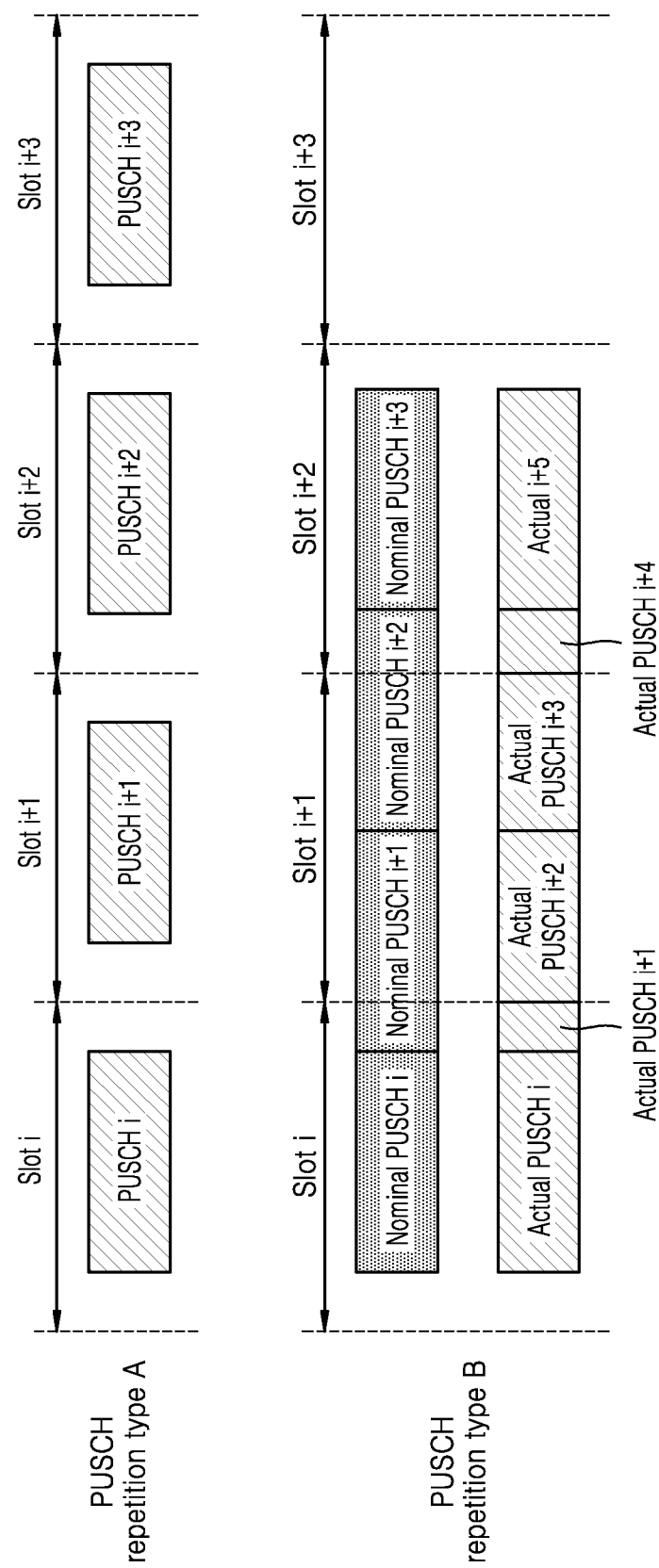
FIG. 20 illustrates a diagram for a physical uplink shared channel (PUSCH) repetition transmission method according to an embodiment of the disclosure.

FIG. 20 illustrates a diagram illustrating a PUSCH repetition transmission method according to an embodiment of the disclosure. In more detail, FIG. 20 illustrates a situation where PUSCH is scheduled with DCI information transmitted via PDCCH. The PUSCH is repetitively transmitted four times, and PUSCH repetition transmission may be performed in a unit of a slot and repeated with a same start point and length. The number of times the PUSCH repetition transmission is performed may be determined by an upper signal or an L1 signal. In another embodiment of the disclosure, PUSCH may be repetitively and periodically received and transmitted without PDCCH. Here, the number of times of repetition transmission may be determined by an L1 signal or an upper signal for activating a corresponding configured grant (CG) PUSCH.

The PUSCH repetition transmission by the UE is a method for enlarging coverage of the BS or increasing data reception reliability of the BS. The 5G NR supports two types of data repetition transmission which are PUSCH repetition type A and PUSCH repetition type B.

PUSCH repetition type A indicates PUSCH repetition transmission in a unit of a slot and is characterized in that start symbols and lengths of PUSCHs that are repetitively transmitted over several slots are all equal. PUSCH repetition type B indicates PUSCH repetition transmission in a unit of a non-slot and is characterized in that start symbols or lengths of PUSCHs that are repetitively transmitted over one or more slots are equal to or different from each other.

In general, transmission power of the UE is lower than transmission power of the BS, and thus, UL coverage may be smaller than DL coverage. In order to solve the problem, a repetition transmission scheme in terms of time may be considered. When repetition transmission is performed, a receiver can receive more energy, and thus, demodulation/decoding performance may be further enhanced. When repetition transmission is performed, a receiver can receive more energy, and thus, demodulation/decoding performance may be further enhanced.

Hereinafter, a method of allocating a time domain resource to a data channel in the 5G communication system will now be described.

The BS may configure the UE with Table of time domain resource allocation information with respect to a DL data channel (PDSCH) and a UL data channel (PUSCH), via higher layer signaling (e.g., RRC signaling).

The BS may configure Table composed of entries of maximum maxNrofDL-Allocations=16 for PDSCH, and may configure Table composed of entries of maximum maxNrofUL-Allocations=16 for PUSCH. The time domain resource allocation information may include, for example, PDCCH-to-PDSCH slot timing (corresponding to a time interval in a unit of slot between a point when PDCCH is received and a point when PDSCH scheduled by the received PDCCH is transmitted, and marked as K0), PDCCH-to-PUSCH slot timing (corresponding to a time interval in a unit of slot between a point when PDCCH is received and a point when PUSCH scheduled by the received PDCCH is transmitted, and marked as K2), information about a position and length of a start symbol on which PDSCH or PUSCH is scheduled in a slot, a mapping type of PDSCH or PUSCH, or the like. For example, a plurality of pieces of information such as at least one of [Table 7] to [Table 9] may be notified to the UE.

TABLE 7

PDSCH-TimeDomainResourceAllocationList information element

```
PDSCH-TimeDomainResourceAllocationList ::=  SEQUENCE (SIZE(1..maxNrofDL-
Allocations)) OF PDSCH-TimeDomainResourceAllocation
PDSCH-TimeDomainResourceAllocation ::=  SEQUENCE {
    k0                              INTEGER(0..32)
OPTIONAL,   -- Need S
        (PDCCH-to-PDSCH timing, unit of slot)
    mappingType                     ENUMERATED {typeA, typeB},
        (PDSCH mapping type)
```

TABLE 7-continued

PDSCH-TimeDomainResourceAllocationList information element

```
    startSymbolAndLength        INTEGER (0..127)
    (start symbol and length of PDSCH)
}
```

TABLE 8

PUSCH-TimeDomainResourceAllocation information element

```
PUSCH-TimeDomainResourceAllocationList ::=   SEQUENCE (SIZE(1..maxNrofUL-
Allocations)) OF PUSCH-TimeDomainResourceAllocation
PUSCH-TimeDomainResourceAllocation ::=   SEQUENCE {
    k2                          INTEGER(0..32)
OPTIONAL,   -- Need S
    (PDCCH-to-PUSCH timing, unit of slot)
    mappingType                 ENUMERATED {typeA, typeB},
    (PUSCH mapping type)
    startSymbolAndLength        INTEGER (0..127)
    (start symbol and length of PUSCH)
}
```

TABLE 9

PUSCH-TimeDomainResourceAllocationNew information element

```
    PUSCH-TimeDomainResourceAllocationListNew-r16 ::=   SEQUENCE
(SIZE(1..maxNrofUL-Allocations-r16)) OF PUSCH-TimeDomainResourceAllocationNew-
r16
    PUSCH-TimeDomainResourceAllocationNew-r16 ::=   SEQUENCE {
        k2-r16                      INTEGER (0..32)
OPTIONAL,   -- Need S
    (PDCCH-to-PUSCH timing, unit of slot)
        mappingType-r16             ENUMERATED {typeA,
typeB}    OPTIONAL,   -- Cond RepTypeA
    (PUSCH mapping type, limited to repetition transmission type A)
        startSymbolAndLength-r16    INTEGER (0..127)
OPTIONAL,   -- Cond RepTypeA
    (start symbol and length of PUSCH, limited to repetition transmission type A)
        startSymbol-r16             INTEGER (0..13)
OPTIONAL,   -- Cond RepTypeB
    (start symbol of PUSCH, limited to repetition transmission type B)
        length-r16                  INTEGER (1..14)
OPTIONAL,   -- Cond RepTypeB
    (length of PUSCH, limited to repetition transmission type B)
        numberOfRepetitions-r16  ENUMERATED {n1, n2, n4,
n7, n12, n16},
    (the number of times of repetition transmission of PUSCH)
        ...
    }
}
```

The BS may notify the UE of one of the entries of Table of time domain resource allocation information via L1 signaling, e.g., DCI (e.g., the BS may notify the UE by using a "time domain resource allocation" field in the DCI). The UE may obtain time domain resource allocation information about PDSCH or PUSCH, based on the DCI received from the BS. A bit size of the DCI field is determined based on the number of entries configured in [Table 7] to [Table 9]. For example, when a total of 4 entries are configured for whole PUSCH scheduling, by an upper signal, the "time domain resource allocation" field in the DCI may be determined as 2 bits.

Hereinafter, UL PUSCH repetition transmission in the 5G system will now be described in detail.

The 5G communication system supports two types that are PUSCH repetition transmission type A and PUSCH repetition transmission type B, as a repetition transmission method of a UL data channel. The PUSCH repetition transmission type A and the PUSCH repetition transmission type B may be configured by an upper signal according to each scheduling DCI format.

1. PUSCH Repetition Transmission Type A

As described above, as a time domain resource allocation method in one slot, a start symbol and length of a UL data channel may be determined, and the BS may notify the UE of the number of times of repetition transmission via higher layer signaling (e.g., RRC signaling) or L1 signaling (e.g., DCI).

Based on the number of times of repetition transmission received from the BS, the UE repetitively transmits a UL data channel in consecutive slots, the UL data channel having a start symbol and length same as the determined start symbol and length of the UL data channel. That is, PUSCH having a same start symbol and same symbol length in a unit of slot is repetitively transmitted by the number of times of repetition transmission of slot which is provided by an upper signal or an L1 signal. A slot (Ks) transmitted or received on first repetitively-transmitted PUSCH is determined by $$K_s = \left\lfloor n \cdot \frac{2^{\mu_{PUSCH}}}{2^{\mu_{PDCCH}}} \right\rfloor + K_2.$$

n indicates a slot in which scheduling DCI is transmitted or received, and K2 indicates an offset value between the scheduling DCI and PUSCH based on a subcarrier spacing in which the PUSCH is transmitted or received. $\mu_{PUSCH}$, $\mu_{PDCCH}$ indicate subcarrier spacing values of PUSCH and PDCCH, and indicate subcarrier spacings of $15 \cdot 2^\mu$ kHz.

In this regard, when at least one symbol among UL data channel symbols the BS indicated for the UE by a first signal is configured as a DL according to information indicated by a second signal, the UE may skip transmission of a UL data channel. That is, although the at least one symbol is included in the number of times of UL data channel repetition transmission, the UL data channel is not transmitted. For example, in a situation where four times of UL data repetition transmission is indicated by the first signal, when at least one symbol of a second UL data repetition transmission resource is indicated as a DL symbol by the second signal, the UE may perform first, third, and fourth UL data repetition transmissions, except for second UL data repetition transmission.

When the number of times of repetition transmission is K, in the PUSCH repetition transmission type A, same symbol allocation is applied to K consecutive slots, and PUSCH has a single transmission layer. The UE has to repetitively transmit a same transport block (TB) for K consecutive slots to which same symbols are applied to each slot. The same symbol allocation means that a start symbol and length of each slot to which PUSCH is applied are same. A redundancy version (RV) value with respect to nth repetition transmission may be used in [Table 10] below. [Table 10] may be applied to both the repetition transmission type A and the repetition transmission type B.

TABLE 10

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

[Table 11] indicates a range of valid start symbol (S) and length (L) for PUSCH resource allocation. PUSCH mapping type includes type A and type B, wherein the type A indicates that a DMRS position of PUSCH is always fixed at a particular symbol in a slot, e.g., fixed at a third or fourth symbol, and the type B indicates that a position of PUSCH is fixed at a first symbol of allocated PUSCH. The PUSCH mapping type A is applicable only to the PUSCH repetition type A, and the PUSCH mapping type B is applicable to both the PUSCH repetition type A and the PUSCH repetition type B.

TABLE 11

| PUSCH mapping type | Normal cyclic prefix | | | Extended cyclic prefix | | |
|---|---|---|---|---|---|---|
| | S | L | S + L | S | L | S + L |
| Type A (repetition Type A only) | 0 | {4, ..., 14} | {4, ..., 14} | 0 | {4, ..., 12} | {4, ..., 12} |
| Type B | {0, ..., 13} | {1, ..., 14} | {1, ..., 14} for repetition Type A, {1, ..., 27} for repetition Type B | {0, ..., 11} | {1, ..., 12} | {1, ..., 12} for repetition Type A, {1, ..., 23} for repetition Type B |

In the PUSCH repetition type A, the number of times of repetition, a K value, is determined as below. When Numberofrepetitions exists in Table of resource allocation, the K value is Numberofrepetitions, and when Numberofrepetitions does not exist in Table, if pusch-AggregationFactor is configured by an upper signal, the K value is pusch-AggregationFactor. When both Numberofrepetitions and pusch-AggregationFactor are not configured, the K value is 1.

2. PUSCH Repetition Transmission Type B

As described above, as the time domain resource allocation method in one slot, a start symbol and length of a UL data channel may be determined, and the BS may notify the UE of the number of times of repetition transmission (numberofrepetitions) via higher layer signaling (e.g., RRC signaling) or L1 signaling (e.g., DCI).

A nominal repetition of the UL data channel is determined as below, based on the determined start symbol and length of the UL data channel. A slot in which an nth nominal repetition is started is given by $$K_s + \left\lfloor \frac{S+n \cdot L}{N_{symb}^{slot}} \right\rfloor,$$

and a symbol starting in the slot is given by $\mathrm{mod}(S+n \cdot L, N_{symb}^{slot})$. A slot in which the nth nominal repetition is ended is given by $$K_s + \left\lfloor \frac{S+(n+1) \cdot L - 1}{N_{symb}^{slot}} \right\rfloor,$$

and a symbol ending in the slot is given by $\mathrm{mod}(S+(n+1) \cdot L - 1, N_{symb}^{slot})$. Here, n=0, . . . , numberofrepetitions−1, where S indicates a start symbol of a determined UL data channel, and L indicates a symbol length of the determined UL data channel. $K_s$ indicates a slot in which PUSCH transmission starts, and $N_{symb}^{slot}$ indicates the number of symbols per slot.

The UE determines an invalid symbol for the PUSCH repetition transmission type B. A symbol configured as a DL by tdd-UL-DL-ConfigurationCommon or tdd-UL-DL-ConfigurationDedicated is considered as the invalid symbol for the PUSCH repetition transmission type B. Also, in an unpaired spectrum, a symbol indicated by ssb-PositionsInBurst in SIB1 or in ServingCellConfigCommon of a SS/PBCH block, the ssb-PositionsInBurst being information indicating a position for transmitting or receiving PSS/SSS/PBCH, is considered as an invalid symbol. Also, in the unpaired spectrum, a symbol indicated as a PDCCH region for receiving SIB1 indicated by MIB for a control resource set (CORESET) for Type0-PDCCH CSS is considered as an invalid symbol. In the unpaired spectrum, when a numberInvalidSymbolsForDL-UL-Switching upper signal is configured, symbols indicated by the number-InvalidSymbolsForDL-UL-Switching upper signal after a last symbol in a set of all consecutive symbols composed of DL symbols indicated by tdd-UL-DL-ConfigurationCommon or tdd-UL-DL-ConfigurationDedicated indicating TDD configuration information are considered as invalid symbols. Here, a reference subcarrier spacing of a symbol indicated by the numberInvalidSymbolsForDL-UL-Switching upper signal follows a referenceSubcarrierSpacing upper signal in tdd-UL-DL-ConfigurationCommon. Also, an invalid symbol may be configured by a higher layer parameter (e.g., InvalidSymbolPattern). The higher layer parameter (e.g., InvalidSymbolPattern) may provide a symbol level bitmap extending over one slot or two slots, thereby configuring the invalid symbol. When the bitmap indicates 1, it indicates the invalid symbol. In addition, a period and pattern of the bitmap may be configured by a higher layer parameter (e.g., periodicityAndPattern). When the higher layer parameter (e.g., InvalidSymbolPattern) is configured, and InvalidSymbolPatternIndicator-ForDCIFormat0_1 parameter or InvalidSymbolPatternIndicator-ForDCIFormat0_2 parameter indicates 1, the UE applies an invalid symbol pattern, and when 0 is indicated, the UE does not apply the invalid symbol pattern. When the higher layer parameter (e.g., InvalidSymbolPattern) is configured, and InvalidSymbolPatternIndicator-ForDCIFormat0_1 parameter or InvalidSymbolPatternIndicator-ForDCIFormat0_2 parameter is not configured, the UE applies the invalid symbol pattern. Also, in a case where the UE has a half-duplex constraint and cannot simultaneously perform transmission and reception with respect to multiple cells, when the UE is not configured with monitoring of DCI format 2_0, symbols on which the UE is supposed to receive SS/PBCH from a particular cell are considered as invalid symbols with respect to all cells including the particular cell, and similarly, a symbol indicated as a DL by a UE-common or UE-specific upper signal such as tdd-UL-DL-ConfigurationCommon or tdd-UL-DL-ConfigurationDedicated with respect to a particular reference cell, and symbols configured by an upper signal for reception of PDCCH, PDSCH, or CSI-RS are considered as invalid symbols with respect to other cells.

After an invalid symbol is determined in each nominal repetition, the UE may consider remaining symbols as valid symbols. If one or more valid symbols are included in each nominal repetition, nominal repetition may include one or more actual repetitions. Here, each actual repetition may include a set of consecutive valid symbols being usable in one slot for the PUSCH repetition transmission type B. Except for a case of L=1, an actual repetition composed of one symbol is skipped, and the UE does not transmit an actual PUSCH.

As described above, in FIG. 20, in the PUSCH repetition transmission type B, a nominal repetition is basically scheduled by an upper signal and an L1 signal and then a slot boundary or whether an invalid symbol exists is determined, such that an actual repetition the UE has to finally perform transmission is determined. In FIG. 20, Numberofrepetitions is considered as 4. Regardless of the slot boundary or an invalid symbol, in a nominal repetition, subsequently after a first PUSCH is scheduled, PUSCHs are repetitively scheduled. The UE determines an actual repetition resource of actual transmission, based on scheduling information of the PUSCH repetition transmission type B, and when all symbols are valid symbols, the UE may repetitively transmit a PUSCH consisting of 6 actual PUSCH repetitions (i, i+1, i+2, i+3, i+4, i+5) over slots i, i+1, and i+2 with respect to slot boundaries of FIG. 20. When PUSCH repetition transmission type B scheduling, the UE determines a transport block size (TBS) based on an L value indicated by scheduling DCI. The L value may be equal to or greater than each of PUSCH transmission lengths actually transmitted by the UE. In FIG. 20, when some symbols are invalid symbols, the UE may transmit a PUSCH in an actual repetition divided into two or more PUSCHs with respect to the invalid symbols.

Figure 21:
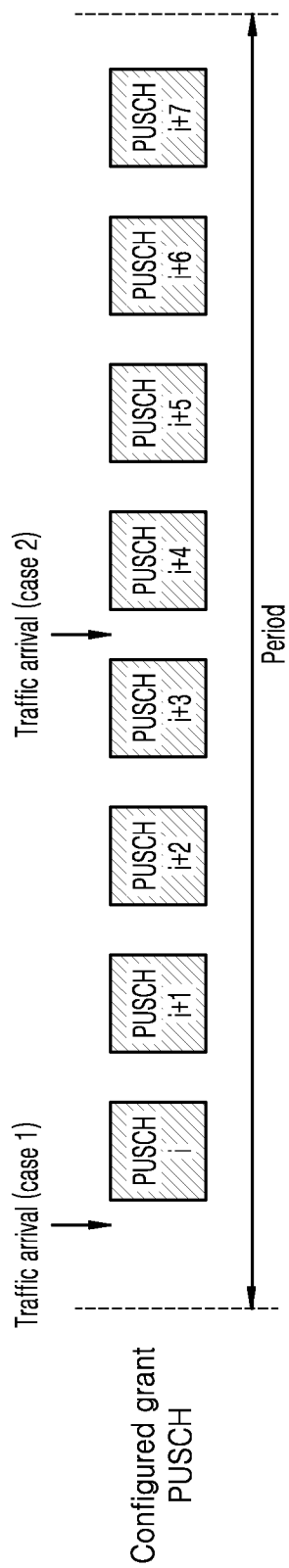
FIG. 21 illustrates a diagram for a PUSCH transmission method of a UE according to an embodiment of the disclosure.

FIG. 21 illustrates a PUSCH transmission method of a UE according to an embodiment of the disclosure.

A configured grant PUSCH is a resource set on which, when data to be transmitted to a BS from the UE occurs, the data can be transmitted without separate scheduling DCI. In the configured grant PUSCH, time and frequency resources and transmission information for PUSCH transmission (MCS, RV, etc.) are notified to the UE in advance with a periodicity by an upper signal or an L1 signal. repK-RV from among configured grant PUSCH upper signal configuration parameters indicates an RV value determined according to each resource when configured grant PUSCH-based repetition transmission is performed. repK-RV is composed of {0, 2, 3, 1}, {0, 3, 0, 3}, {0, 0, 0, 0}. [Table 10] is related to a case where PUSCH repetition transmission is scheduled by DCI, and is not applied to the configured grant PUSCH. When repK-RV upper signal is not configured, the UE considers all RV values as 0. When repK-RV upper signal is configured, for a configured RV pattern, a {mod (n−1,4)+1}-th RV value is applied to an nth configured grant PUSCH among K repetitions. When Configuredgrantconfig-StartingfromRV0 upper signal is configured as "off," initial transmission of a corresponding transmission block may be available only in a first resource among resources that are repetitively transmitted K times. Otherwise, initial transmission of a corresponding transmission block may vary according to a repK-RV pattern configured by an upper signal. For example, when repK-RV={0, 2, 3, 1}, initial transmission is available only in first transmission among k repetitions, when repK-RV={0, 3, 0, 3}, first transmission is available in an occasion related to RV=0 among k repetitions, and repK-RV={0, 0, 0, 0}, first transmission is available in all transmission occasions among k repetitions except for transmission periods thereafter in which K is equal to or greater than 8.

FIG. 21 illustrates configured grant PUSCH repetition transmission configured as K=8. K=8 cannot be configured to be greater than P value that is another higher layer configuration. In a case where repK-RV is configured as {0, 3, 0, 3} or {0, 0, 0, 0}, as in Case 1, when traffic occurs before PUSCH i, the UE may start transmission in PUSCH i and may perform a total of 8 repetition transmissions. As in Case 2, when traffic occurs before PUSCH i+4 in the middle of P, the UE may start transmission in PUSCH i+4 and may perform a total of 4 repetition transmissions. If repK-RV is configured as {0, 2, 3, 1} or Configuredgrantconfig-StartingfromRV0 upper signal is configured as "off." when traffic occurs in the middle as in Case 2, the UE cannot perform data transmission in PUSCH i+4, and after the period, the UE may perform configured grant PUSCH repetition transmission starting from PUSCH i in a next period.

Hereinafter, technologies and method for increasing coverage via PUSCH or PUCCH repetition transmission will now be described.

A BS coverage increasing technology is a technology capable of providing a data transmission and reception service to UEs in large range with fewer BSs, and in terms of a BS operator, the BS coverage increasing technology requires less costs and thus may be preferred. The BS coverage increasing technology includes repetition transmission or a UE power increasing technology, and regarding the UE power increasing technology, a maximum power value of a UE cannot be increased due to a limit in implementation and regulations. Therefore, PUSCH or PUCCH repetition transmission by a UE may be considered to increase BS coverage.

A bundling (DMRS time domain bundling) technology between DMRSs of PUSCH and PUCCH that are repetitively transmitted, in terms of a time domain, may be useful to increase coverage. A DMRS is a reference signal for measuring a channel for data demodulation/decoding, and when DMRSs that are transmitted or received over different times or frequencies are bundled (or interpolation/linear interpolation), more accurate channel estimation is available such that demodulation/decoding probability of a receiver may be increased. Therefore, a method by which the BS estimates a channel by bundling DMRSs with each of PUSCH and PUCCH being repetitively transmitted and then transmits data may increase BS coverage. In this regard, when transmission power of PUSCH and PUCCH being repetitively transmitted varies, DMRSs are also transmitted with different power to the BS, such that it may be difficult for the BS to estimate an accurate channel by appropriately compensating for the difference. Therefore, when the BS (or a receiver) performs DMRS time domain bundling, the UE (or a transmitter) has to assure same transmission power for PUSCHs or PUCCHs that are repetitively transmitted. To do so, according to an embodiment of the disclosure, a method, performed by a user equipment (UE), of transmitting a physical uplink shared channel (PUSCH) includes: identifying whether a demodulation reference signal (DMRS) time domain bundling information is included in a radio resource control (RRC) message received from a base station; determining whether to transmit at least one PUSCH with a same transmission power for at least one transmission time domain window, based on a result of the identifying; in response to determining to transmit the at least one PUSCH with the same transmission power for the at least one transmission time domain window, determining a transmission power for the at least one PUSCH; and transmitting the at least one PUSCH with the determined transmission power.

In an embodiment of the disclosure, the RRC message may include information about the at least one transmission time domain window.

In an embodiment of the disclosure, the information about the at least one transmission time domain window may be indicated by at least one unit of a slot or a symbol.

In an embodiment of the disclosure, the at least one PUSCH may include at least one PUSCH repetition transmission configured by the base station.

In an embodiment of the disclosure, the determining of the transmission power for the at least one PUSCH may include: determining at least one PUSCH belonging to a first transmission time domain window to have a first transmission power; and determining at least one PUSCH belonging to a second transmission time domain window to have a second transmission power, wherein the first transmission power is different from the second transmission power.

In an embodiment of the disclosure, the determining of the transmission power for the at least one PUSCH may include: allocating the transmission power for the at least one PUSCH in priority over at least one of: single PUSCH or physical uplink control channel (PUCCH) transmission, PUSCH or PUCCH repetition transmission which is not DMRS time domain bundled, PUCCH or PUSCH transmission including channel state information (CSI) information, PUCCH transmission including hybrid automatic repeat and request (HARQ)-ACK, scheduling request (SR), or link recovery request (LRR) information, PUSCH transmission including HARQ-ACK information, PUSCH transmission without HARQ-ACK or CSI, PUSCH transmission for a Type-2 random access procedure, PUSCH transmission from a Pcell, sounding reference signal (SRS) transmission, or physical random access channel (PRACH) transmission from another serving cell other than the Pcell.

In an embodiment of the disclosure, the method may further include: transmitting, to the base station, UE capability information about whether DMRS time domain bundling is supported.

To implement above embodiments, at least one of methods below or a combination of some methods may be available. Hereinafter, PUSCHs (or PUCCHs) may be periodic resources that are scheduled by DCI or are configured in advance by an upper signal without DCI.

Method 1: Regard all PUSCH that are Repetitively Transmitted, as One PUSCH Occasion i As described with reference to [Equation 4], determination of PUSCH transmission power is performed for each of PUSCH transmission occasions. In a case of the PUSCH repetition transmission type A described with reference to FIG. 20, transmission power is determined for each of PUSCHs that are repetitively transmitted, and in a case of the PUSCH repetition transmission type B, transmission power is determined in a unit of a nominal PUSCH repetition. According to Method 1, when an upper signal associated with DMRS time domain bundling is configured or DMRS time domain bundling is indicated by an L1 signal, the UE regards all PUSCH repetition transmissions transmitted or received according to the PUSCH repetition transmission type A or B, as one occasion, i.e., one PUSCH transmission occasion. Therefore, transmission powers of PUSCHs that are repetitively transmitted are fixed as a same value. As an example of the PUSCH repetition transmission type A in FIG. 20, in a situation of repetition transmission of PUSCH i, PUSCH i+1, PUSCH i+2, and PUSCH i+3, when an upper signal associated with DMRS time domain bundling is configured or DMRS time domain bundling is indicated by an L1 signal, the UE regards PUSCH i, PUSCH i+1, PUSCH i+2, and PUSCH i+3 that are repetitively transmitted as one PUSCH transmission occasion, and thus, determines transmission power according to [Equation 4] or [Equation 4-1]. When the PUSCH i, the PUSCH i+1, the PUSCH i+2, and the PUSCH i+3 are not regarded as one PUSCH transmission occasion, the UE determines transmission power of each of PUSCH i, PUSCH i+1, PUSCH i+2, and PUSCH i+3 according to [Equation 4] or [Equation 4-1]. In conclusion, an occasion with which transmission power is determined in view of the UE may be, by an upper signal or an L1 signal, an individual PUSCH period or a period of all PUSCHs that are repetitively transmitted.

Method 2: The UE Equally Applies Transmission Power of a PUSCH to all PUSCHs to be Transmitted Thereafter, the PUSCH being Determined in a First Transmission Period from among PUSCHs that are repetitively transmitted.

When an upper signal indicating DMRS time domain bundling is not configured or DMRS time domain bundling indication by an L1 signal does not exist, different transmission powers may be determined for respective PUSCH transmission occasions (or time point) that are repetitively transmitted, but when an upper signal indicating DMRS time domain bundling is configured or DMRS time domain bundling is indicated by an L1 signal, in repetition transmission, the UE may equally apply transmission power of first-transmitted PUSCH to PUSCHs to be transmitted thereafter. As an example of the PUSCH repetition transmission type A in FIG. 20, transmission power determined in PUSCH i is equally applied to PUSCH i+1, PUSCH i+2, and PUSCH i+3. That is, when determining transmission powers of PUSCH i+1, PUSCH i+2, and PUSCH i+3, $PL_{b,f,c}(q_d)$ and $f_{b,f,c}$ of [Equation 4] are applied as a same value as PUSCH i. In other words, when $f_{b,f,c}$ is an accumulation mode or an absolute mode, $f_{b,f,c}$ that is a power adjustment adaptive value is not changed by an additional TPC command, and the UE may ignore a TPC command when determining transmission power of PUSCH i+1, PUSCH i+2, and PUSCH i+3. However, the ignored TPC command is effectively applied to another PUSCH transmission power immediately after repetition transmission. This will now be described in detail with reference to FIG. 22.

Figure 22:
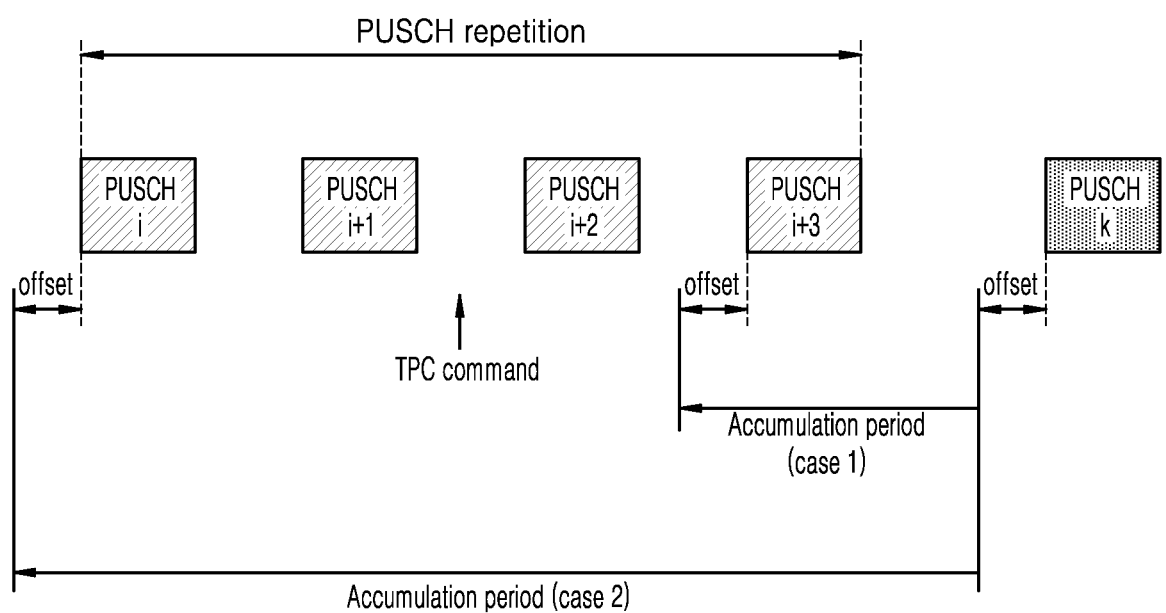
FIG. 22 illustrates a diagram for describing a method of assuring same transmission power of PUSCHs being repetitively transmitted by a UE or a transmitter.

FIG. 22 illustrates a diagram for describing a method of assuring same transmission power of PUSCHs being repetitively transmitted by a UE or a transmitter. In a case where another PUSCH k is configured to be transmitted or received in advance, when PUSCHs i, i+1, i+2, and i+3 are configured to be repetitively transmitted, a TPC accumulation period considered to determine transmission power of configured grant PUSCH k may vary according to whether DMRS time domain bundling exists.

In detail, when DMRS time domain bundling is not performed on PUSCHs i, i+1, i+2, and i+3, transmission power is determined for each of PUSCHs i, i+1, i+2, and i+3, and thus, a TPC accumulation period with respect to PUSCH k may be same as Case 1. Therefore, as a TPC command transmitted or received between PUSCH i+1 and PUSCH i+2 is not included in a TPC accumulation period of Case 1, the UE may not consider the TPC command.

On the other hand, when the UE performs DMRS time domain bundling according to Method 2, transmission power of PUSCHs i+1, i+2, and i+3 is equal to transmission power of PUSCH i, and thus, a TPC command transmitted or received between PUSCH i+1 and PUSCH i+2 is not considered for transmission power of PUSCH i+2 and i+3 but may be considered for transmission power of PUSCH k. Therefore, a TPC accumulation period with respect to PUSCH k may be same as in Case 2. PUSCH k may be a scheduled PUSCH, and an offset value of the PUSCH k may be a last symbol of PDCCH to which DCI for scheduling the PUSCH k belongs. The offset value is a PUSCH preparation time and may have different time lengths according to subcarrier spacings or UE processing capabilities.

In [Equation 4], $P_{O\_PUSCH,b,f,c}(j)$ $M_{RB,b,f,c}^{PUSCH}(i)$, $\Delta_{TF,b,f,c}(i)$ have constant values with respect to PUSCHs that are always repetitively transmitted without separate assumption (e.g., configuration by an upper signal or indication by an L1 signal). In an embodiment of the disclosure, according to Method 2, a first transmission period among PUSCHs being repetitively transmitted may be a first PUSCH resource among PUSCHs that are actually transmitted. In another embodiment of the disclosure, a first PUSCH resource among PUSCHs may be a first PUSCH resource among the PUSCHs including a PUSCH whose transmission is canceled by DCI such as a slot format indicator (SFI) or uplink cancellation indication (UL CI).

In more detail, as an example of FIG. 20, when transmission of PUSCH i is canceled by UL CI or SFI in the PUSCH repetition transmission type A or type B, the UE may not actually transmit PUSCH i, or may transmit only a front part of PUSCH i and then may cancel transmission. In this situation, there is a need for the UE to determine a reference PUSCH transmission occasion for DMRS time domain bundling during repetition transmission of PUSCH i, PUSCH i+1, PUSCH i+2, and PUSCH i+3.

A first transmission period among PUSCHs that are repetitively transmitted may indicate a first PUSCH resource among PUSCHs that are actually transmitted. Therefore, in a situation above, an entirety of PUSCH i is not transmitted, and thus, PUSCH i is not considered to have been actually transmitted, and PUSCH i+1 may be considered as a first PUSCH among the PUSCHs that are repetitively transmitted. Therefore, transmission power of PUSCH i+2 and PUSCH i+3 may correspond to PUSCH i+1.

In another embodiment of the disclosure, a first PUSCH resource among PUSCHs including a PUSCH whose transmission is canceled by DCI such as a SFI or UL CI may be, for example, PUSCH i. That is, even when actual transmission of an entirety or some symbols of PUSCH i is canceled, transmission power of PUSCH i+1, i+2, and i+3 may correspond to PUSCH i.

Method 3: Configure a Reference Transmission Period for DMRS Time Domain Bundling in a Situation where Configured Grant PUSCH is Repetitively Transmitted or Received.

As described with reference to FIG. 21, there may be various PUSCH transmission points where the UE can start configured grant PUSCH, according to pre-configured RV patterns. For example, when the RV patterns are all configured as 0, the UE may perform PUSCH repetition transmission starting in PUSCH i or PUSCH i+4, according to occurrence of traffic to be transmitted via UL. When the BS performs DMRS time domain bundling via the PUSCH repetition transmission, the UE may have to maintain same transmission power, regardless of a time when the UE receives PUSCH. When PUSCH is indicated by scheduling DCI, transmission power determined in first PUSCH is maintained as transmission power of PUSCHs to be repetitively transmitted thereafter.

When the PUSCH is not indicated by the scheduling DCI, i.e., when the PUSCH is configured grant (CG) PUSCH, a first PUSCH transmission time may vary according to an occurrence time of traffic in the UE and configuration of the RV patterns. Therefore, the UE may set a time to determine transmission power of configured grant PUSCH repetition, as a time to start actual repetition transmission, or may determine transmission power in a first configured grant PUSCH resource in a pre-configured configured grant period, without consideration of the time to start the actual repetition transmission.

According to further descriptions with reference to FIG. 21 with respect to a case where the UE sets the time to determine the transmission power of the configured grant PUSCH repetition, as the time to start the actual repetition transmission, the UE may start repetition transmission of configured grant PUSCH in PUSCH i or PUSCH i+4, according to whether traffic occurs. Here, it means that the transmission power is determined based on PUSCH i or PUSCH i+4. For example, when a TPC command is transmitted or received between PUSCH i+1 and PUSCH i+2, the UE may determine transmission power in PUSCH i+4 by referring to the TPC command, and may not refer to the TPC command in PUSCH i.

According to further descriptions of, with reference to FIG. 21, determination of the transmission power in the first configured grant PUSCH resource in the pre-configured configured grant period, without consideration of the time to start the actual repetition transmission, the UE does not consider the time to start the actual repetition transmission, i.e., the start of the repetition transmission of the configured grant PUSCH in PUSCH i or PUSCH i+4 according to the occurrence time of traffic but may use the transmission power determined in PUSCH i that is a first transmission occasion in a period of the configured grant PUSCH. Therefore, in a case where the TPC command is transmitted or received between PUSCH i+1 and PUSCH i+2, even when the UE starts repetition transmission in configured grant PUSCH i+4, as the transmission power is based on PUSCH i, the UE may ignore the TPC command.

Method 1 to Method 3 by which the UE fixes same transmission power for PUSCH (or PUCCH) repetition transmissions, for DMRS time domain bundling, are described above in detail.

However, when the number of PUSCHs (or PUCCHs) being repetitively transmitted is large, such as 100 or 1000 in number, or when a time interval between the PUSCHs (or the PUCCHs) being repetitively transmitted is large, there may be a probability that channel estimation accuracy via DMRS time domain bundling is not further enhanced for the BS. Also, this case may cause a delay in a decoding time for the BS to decode data.

The BS may divide the PUSCHs (or the PUCCHs) being repetitively transmitted into subsets and may perform DMRS time domain bundling. Therefore, the UE does not determine same transmission power for all the PUSCHs (or the PUCCHs) being repetitively transmitted, according to afore-described Methods 1 to 3, but may determine same transmission power only for some PUSCHs (or PUCCHs) being repetitively transmitted. In detail, in a case where PUSCH is repetitively transmitted 100 times (PUSCH 1, PUSCH 2, . . . , PUSCH 100) and a DMRS time domain bundling unit is 10 PUSCHs (or PUCCHs) (B=10), the UE may set PUSCH 1 to PUSCH 10 to have same transmission power, PUSCH 11 to PUSCH 20 to have same transmission power, . . . PUSCH 91 to PUSCH 100 to have same transmission power. B is a transmission power determination unit of PUSCH for DMRS time domain bundling, and may be determined by an upper signal, an L1 signal, or a combination thereof. That is, a value of B may be determined by an upper signal such as SIB, RRC, or MAC CE, or may be determined by an L1 signal such as a DCI field. In another embodiment of the disclosure, the value of B may vary according to the number of PUSCH repetition transmissions. For example, the value of B may vary according to the number of PUSCH repetition transmissions in a manner that, when the number of PUSCH repetition transmissions is between 1 and 10, B=1, and when the number of PUSCH repetition transmissions is between 11 and 20, B=2. According to Method 1, PUSCH 1 to PUSCH 10 may be one PUSCH transmission power determination unit, and according to Method 2, transmission power of PUSCH 1 to PUSCH 10 may be determined as that of PUSCH 1. This may be represented as [Equation 4-2]. [Equation 4-2] indicates that a PUSCH transmission power determination unit for DMRS time domain bundling is determined B PUSCHs.

$$P_{PUSCH}(i, j, q_d, l) = P_{PUSCH}\left(\left\lfloor \frac{i}{B} \right\rfloor \cdot B, j, q_d, l\right). \quad \text{[Equation 4-2]}$$

For PUSCH transmission occasion i,

In the example described above in detail, a subgroup is generated based on PUSCH transmission occasion. However, regardless of the PUSCH transmission occasion, a subgroup may be generated in a unit of time. For example, in a case where PUSCH is repetitively transmitted 100 times (PUSCH 1, PUSCH 2, . . . , PUSCH 100), when PUSCHs 1 to 4 are included in a first transmission time domain window T1, the corresponding PUSCHs may have same transmission power, and when PUSCHs 5 and 6 are included in a second transmission time domain window T2, the corresponding PUSCHs may have same transmission power. In generalization, PUSCH i to PUSCH k are included in an nth transmission time domain window Tn. By using a method described above, transmission time domain windows may respectively have different PUSCH transmissions. A transmission time domain window Tn may be determined by an upper signal or an L1 signal, as a value of B, and may have one particular value or may be a set of various values. A unit of a transmission time domain window may be the number of all slots, the number of slots in a UL, the number of slots, or an absolute time unit such as ms.

In order to support DMRS time domain bundling, a separate UE capability may exist. Legacy DMRS or PUSCH/PUCCH repetition transmission UE capability may include information about DMRS time domain bundling, as an additional element. Also, a UE-common or UE-specific upper signal for DMRS time domain bundling may exist, and legacy upper signal configuration information (e.g., an upper signal related to DMRS or PUSCH/PUCCH transmission) may include DMRS bundling information. Also, an example of an L1 signal for DMRS time domain bundling may include a DCI field or RNTI. In detail, a 1 bit of the DCI field for indicating DMRS time domain bundling is 0, the DCI field may indicate that DMRS time domain bundling is "off," and when the 1 bit is 1, the DCI field may indicate that DMRS time domain bundling is "on." The DCI field may be configured by an upper signal, or in response to DCI size alignment, the DCI field may be additionally generated without separate configuration by an upper signal. The fact that transmission power is determined based on a particular transmission occasion may mean that transmission power parameters considered in the particular transmission occasion are equally used. In detail, it may mean that all parameters of [Equation 4] are equally used.

In another embodiment of the disclosure, when DMRS time domain bundling is notified by an upper signal or an L1 signal, the UE may determine transmission power for PUSCH k or PUCCH k being repetitively transmitted, by using [Equation 5] below. k refers to kth PUSCH or PUCCH repetition transmission occasion, and in a case of a total of N repetition transmissions, k={0, 1, 2, . . . , N−1} and $i_k$ is $i_0 < i_1 < \ldots < i_{N-1}$.

PUSCH $i_0$ or PUCCH $i_0$ may be the start of PUSCH (or PUCCH) that is first repetitively transmitted, or may be the start of PUSCH (or PUCCH) positioned at the foremost in a repetition transmission period, which is configured by an upper signal, in configured grant PUSCH (or PUCCH) repetition transmission.

When DMRS time domain bundling is notified by an upper signal or an L1 signal, the UE may assume that all references signals for calculating a path attenuation with respect to PUSCH k or PUCCH k being repetitively transmitted are same. In another embodiment of the disclosure, when DMRS time domain bundling is not notified to the UE by an upper signal nor an L1 signal, the UE may independently determine transmission power according to [Equation 4] with respect to PUSCH k or PUCCH k being repetitively transmitted, and determined transmission power values for respective PUSCHs or PUCCHs may be different or same.

$$P_{PUSCH}(i_k,j,q_d,l) = P_{PUSCH}(i_0,j,q_d,l)[dBm]. \quad \text{[Equation 5]}$$

In addition to [Equation 5], the UE may assume that j, $q_d$, or l values used to determine transmission power in $i_0$ occasion are equally used in $i_k$ occasion. The use of same j may mean that determination of $P_{O_{PUSCH},b,f,c}(j)$ and $\alpha_{b,f,c}(j)$ values in $i_0$ occasion in [Equation 4] is applied to $i_k$ occasion. The use of same $q_d$ may mean that determination of $PL_{b,f,c}(q_d)$ in $i_0$ occasion in [Equation 4] is applied to $i_k$ occasion. The use of same l may mean that determination of $f_{b,f,c}(i, l)$ in $i_0$ occasion in [Equation 4] is applied to $i_k$ occasion. In another embodiment of the disclosure, when the UE repetitively transmits PUSCH (or PUCCH) for DMRS time domain bundling, the UE may not consider that beam-related information or transmission power determination-related information is to be changed. When the beam-related information or the transmission power determination-related information changes transmission power of PUSCH or PUCCH being repetitively transmitted, the UE may follow transmission power of PUSCH or PUCCH which is first transmitted from among PUSCH or PUCCH being repetitively transmitted.

For example, the beam-related information may indicate particular information indicated by an SRS resource indication (SRI) field for determining $P_{O_{PUSCH},b,f,c}(j)$, $\alpha_{b,f,c}(j)$, or $PL_{b,f,c}(q_d)$ in [Equation 4].

For example, the transmission power determination-related information may be a TPC command for determining $f_{b,f,c}(i, l)$ in [Equation 4].

When DMRS time domain bundling is notified by an upper signal or an L1 signal, and PUSCH being repetitively transmitted performs frequency hopping, the BS may perform DMRS time domain bundling on each of PUSCHs transmitted with respect to each of hops from the UE. This will be described in detail with reference to FIG. 25.

Figure 23:
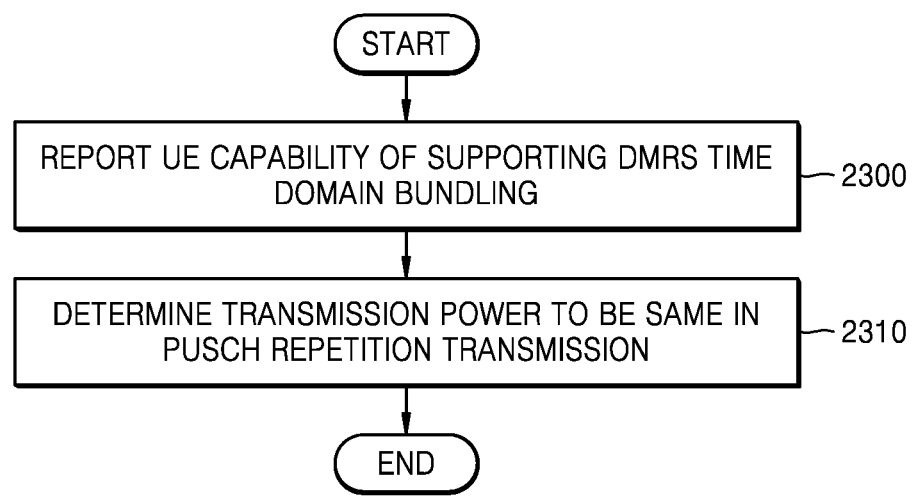
FIG. 23 illustrates a flowchart of operations of a UE that supports demodulation reference signal (DMRS) time domain bundling.

FIG. 23 illustrates a flowchart of operations of a UE that supports DMRS time domain bundling.

In operation 2300, the UE may determine to perform DMRS time domain bundling. In more detail, the UE may report, to a BS, a UE capability of supporting the DMRS time domain bundling. Only for the UE that reported the capability, the BS may notify the UE of an upper signal or an L1 signal for indicating the DMRS time domain bundling. The UE may determine to perform the DMRS time domain bundling by the upper signal or the L1 signal notified by the BS to indicate the DMRS time domain bundling. In another embodiment of the disclosure, regardless of the report of the UE capability, the BS may notify the UE of the upper signal or the L1 signal for indicating the DMRS time domain bundling.

The upper signal may be in the form of information of SIB, RRC, or MAC CE. In a case of RRC, a separate independent RRC parameter exists or is associated with an existing RRC parameter, such that whether to activate DMRS time domain bundling may be determined. For example, when a repetition transmission mode is configured, DMRS time domain bundling information may be notified along with whether to activate the DMRS time domain bundling. The L1 signal may be in the form of a DCI format, field information in a DCI, RNTI scrambled with CRC, UE PDCCH search information (a search space set or CORESET), or the like. For example, a time resource allocation field of a DCI field may include a start point of a corresponding PUSCH, DMRS mapping information, information such as the number of repetition transmissions, or information indicating existence or non-existence of DMRS time domain bundling.

[Table 12] shows an example of a time resource allocation field. [Table 12] may include a slot offset according to a particular index value, a starting and length indication value (SLIV) indicating a start point and length, S and L information, a PUSCH mapping type, the number of repetition transmissions, or information indicating existence or non-existence of DMRS time domain bundling.

TABLE 12

| Index | Slot Offset (K₂) | SLIV (or S, L information) | PUSCH mapping type | The number of repetition transmissions | Existence or non-existence of DMRS time domain bundling |
|---|---|---|---|---|---|
| 1 | 1 | 3 | Mapping type B | 3 | ○ |
| 2 | 1 | 5 | Mapping type B | 3 | X |
| 3 | 1 | 10 | Mapping type B | 1 | X |
| 4 | ... | ... | ... | ... | ... |
| ... | ... | ... | ... | ... | ... |

In operation 2310, transmission power may be determined to be same in PUSCH repetition transmissions. A reference PUSCH transmission occasion may be a PUSCH transmission occasion in which PUSCH repetition transmissions are started or may be a predetermined PUSCH transmission occasion. In another embodiment of the disclosure, the UE may consider PUSCHs being repetitively transmitted, as one unit for determining transmission power.

Figure 24:
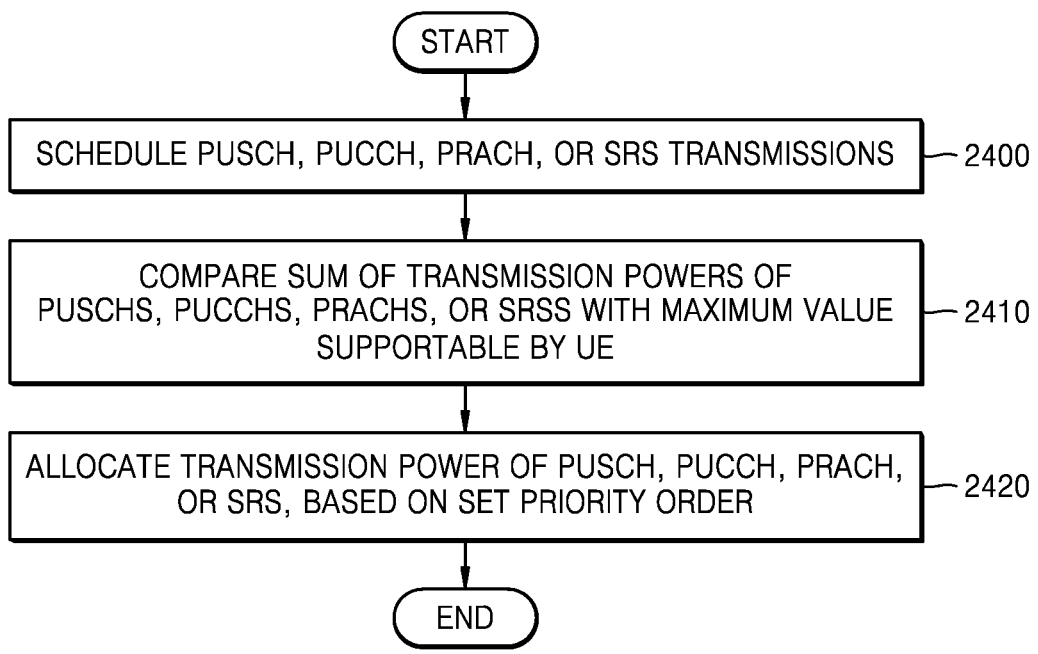
FIG. 24 illustrates a flowchart for determining a transmission power priority order of a UE in a multi-carrier situation.

FIG. 24 illustrates a flowchart for determining a transmission power priority order of a UE in a multi-carrier situation.

In operation 2400, when a carrier set is configured or two UL carriers are configured with one DL carrier, the UE may be scheduled for PUSCH, PUCCH, PRACH, or SRS transmissions with respect to a plurality of UL carriers.

In operation 2410, the UE may compare a sum of transmission powers of PUSCHs, PUCCHs, PRACHs, or SRSs with a maximum value supportable by the UE. In more detail, when a sum of transmission powers of PUSCHs, PUCCHs, PRACHs, or SRSs scheduled on each carrier with respect to a particular transmission occasion i of the UE exceeds a maximum value (Pc,max) supportable by the UE, the UE may not be able to perform all scheduled corresponding UL transmissions. Therefore, in order to prepare such a case, there is a need to set a priority order to allocation of transmission power.

In operation 2420, the UE may allocate transmission power of PUSCH, PUCCH, PRACH, or SRS, based on a set priority order. A priority order may be set as below:
PRACH transmission from a primary cell (Pcell);
PUCCH or PUSCH transmission with a high priority order index;
With respect to PUCCH or PUSCH transmissions with a same priority order;
PUCCH transmission including HARQ-ACK, SR, or LRR information, or PUSCH transmission including HARQ-ACK information;
PUCCH or PUSCH transmission including CSI information;
PUSCH transmission without HARQ-ACK or CSI, PUSCH transmission for a Type-2 random access procedure, PUSCH transmission from Pcell; and/or
SRS transmission or PRACH transmission from another serving cell other than Pcell.

As described with reference to FIG. 23, when the BS notifies the UE of DMRS time domain bundling by an upper signal or an L1 signal, the UE may consider, in a priority order condition, PUSCH or PUCCH repetition transmissions associated with the DMRS time domain bundling. When the UE drops some of PUSCH or PUCCH repetition transmissions that are DMRS time domain bundled, according to a priority order, the BS does not know a dropping situation, such that deterioration in channel estimation performance may occur. Therefore, transmission power may be allocated to the PUSCH or PUCCH repetition transmissions that are DMRS time domain bundled, in priority over at least one of followings:

single PUSCH or PUCCH transmission;

PUSCH or PUCCH repetition transmissions that are not DMRS time domain bundled;

PUCCH or PUSCH transmission including CSI information;

PUCCH transmission including HARQ-ACK, SR, or LRR information, or PUSCH transmission including HARQ-ACK information;

PUCCH or PUSCH transmission including CSI information;

PUSCH transmission without HARQ-ACK or CSI, PUSCH transmission for a Type-2 random access procedure, PUSCH transmission from Pcell; or SRS transmission or PRACH transmission from another serving cell other than Pcell.

Figure 25:
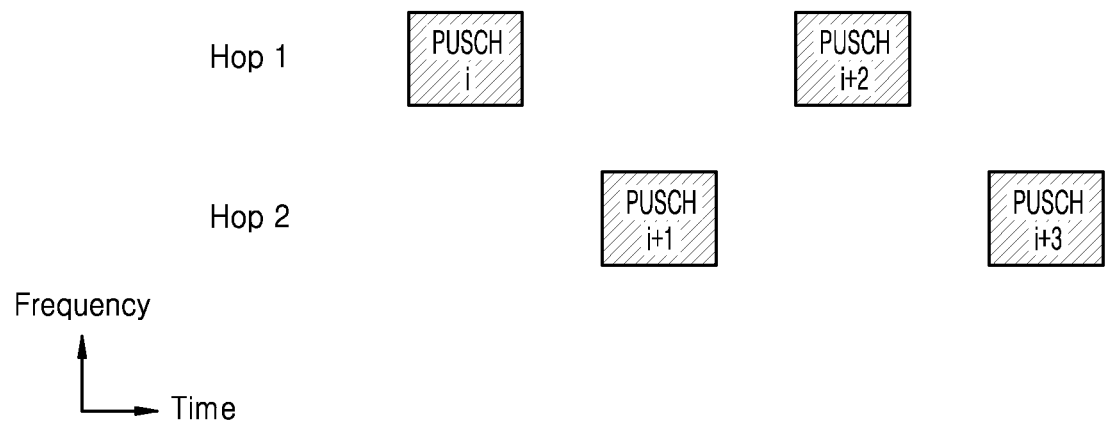
FIG. 25 illustrates a diagram for describing a method by which a UE determines PUSCH transmission power.

FIG. 25 illustrates a diagram for describing a method by which a UE determines PUSCH transmission power.

When DMRS time domain bundling is notified by an upper signal or an L1 signal, and PUSCH being repetitively transmitted performs frequency hopping, the BS may perform DMRS time domain bundling on each of PUSCHs transmitted with respect to each of hops from the UE.

Frequency hopping is a scheme of obtaining frequency diversity, and may enhance reliability of UL transmission or increase coverage. When the UE repetitively transmits PUSCHs i, i+1, i+2, and i+3 as shown in FIG. 25, and with regard to a frequency, PUSCH i and PUSCH i+2 are positioned at hop 1, and PUSCH i+1 and PUSCH i+3 are positioned at hop 2, the BS may perform time domain bundling on DMRSs respectively transmitted from PUSCH i and PUSCH i+2, and may perform time domain bundling on DMRSs respectively transmitted in PUSCH i+1 and PUSCH i+3. Therefore, in a case of frequency hopping, PUSCH repetition transmissions may be equal at hops or may determine different transmission powers for hops. Therefore, when the frequency hopping is notified by an upper signal or an L1 signal, the UE may determine transmission power of PUSCH by using [Equation 6].

$$P_{PUSCH}(i_{2k_1}, j, q_d, l) = P_{PUSCH}(i_0, j, q_d, l) \text{ [dBm]},$$ [Equation 6]

$$P_{PUSCH}(i_{2k_1+1}, j, q_d, l) = P_{PUSCH}(i_1, j, q_d, l) \text{ [dBm]}$$

where $k_1 = 0, 1, ..., \left[\frac{N}{2}\right]$.

In [Equation 6], N refers to the number of repetition transmissions. [Equation 6] may indicate that, in a case of PUSCH repetition transmission and frequency hopping for DMRS time domain bundling, transmission power determined in a transmission occasion of a PUSCH that is first transmitted in each hop may be used for another PUSCH being repetitively transmitted in each hop. [Equation 6] may be equally applied to PUCCH frequency hopping.

Figure 26:
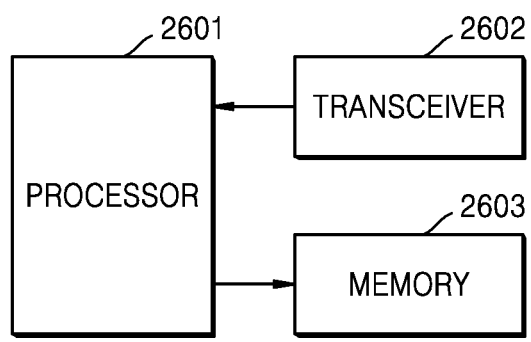
FIG. 26 illustrates a structure of a UE according to an embodiment of the disclosure.

FIG. 26 illustrates a structure of a UE according to an embodiment of the disclosure.

Referring to FIG. 26, the UE may include a processor 2601, a transceiver 2602, and a memory 2603. In the disclosure, a processor may be defined as a circuit, an application-specified integrated circuit, or at least one processor.

The processor 2601 according to an embodiment of the disclosure may control generation operations of the UE. For example, the processor 2601 may control a signal flow between blocks so as to perform operations according to flowcharts described above. Also, the processor 2601 may record data to and read data from the memory 2603. The processor 2601 may perform functions of a protocol stack which are requested by the communication rules. To do so, the processor 2601 may include at least one processor or a micro-processor. Alternatively, the processor 2601 may be a part of a multi-processor. Also, a part of the transceiver 2602 and the processor 2601 may be referred to as a communication processor (CP).

According to an embodiment of the disclosure, the processor 2601 may control operations of the UE which are described with reference to FIGS. 1 to 18.

The processor 2601 according to an embodiment of the disclosure may perform a UL transmission power control method, and thus, when the UE receives one or more DCIs from one or more cells in a system to which CA is applied, the processor 2601 may assure UL performance by accumulating values of transmission power control parameters obtained from the DCIs and may minimize interference to an adjacent cell.

The transceiver 2602 according to an embodiment of the disclosure may perform functions for transmitting and receiving signals through a wireless channel. For example, the transceiver 2602 may perform conversion between a baseband signal and a bit string based on physical layer specifications of a system. For example, for data transmission, the transceiver 2602 may generate complex symbols by encoding and modulating a transmission bit string. For data reception, the transceiver 2602 may reconstruct a reception bit string by demodulating and decoding a baseband signal. The transceiver 2602 may up-convert a baseband signal into a radio frequency (RF) band signal and then may transmit the RF band signal through an antenna, and may down-convert an RF band signal received through the antenna, into a baseband signal. For example, the transceiver 2602 may include a transmission filter, a reception filter, an amplifier, a mixer, an oscillator, a digital-to-analog convertor (DAC), an analog-to-digital convertor (ADC), or the like. Also, the transceiver 2602 may include a plurality of transmission and reception paths. Furthermore, the transceiver 2602 may include at least one antenna array including a plurality of antenna elements. In terms of hardware, the transceiver 2602 may be configured as a digital unit and an analog unit (e.g., a radio frequency integrated circuit (RFIC)). Here, the digital unit and the analog unit may be implemented as one package. Also, the transceiver 2602 may include a plurality of RF chains.

The memory 2603 according to an embodiment of the disclosure may store basic programs, application programs, and data, e.g., configuration information, for operations of the UE. The memory 2603 may be configured as a volatile memory, a non-volatile memory, or a combination of a volatile memory and a non-volatile memory. The memory 2603 may provide stored data, in response to a request by the processor 2601. The memory 2603 may store at least one of information transmitted or received via the transceiver 2602 or information generated by the processor 2601.

Figure 27:
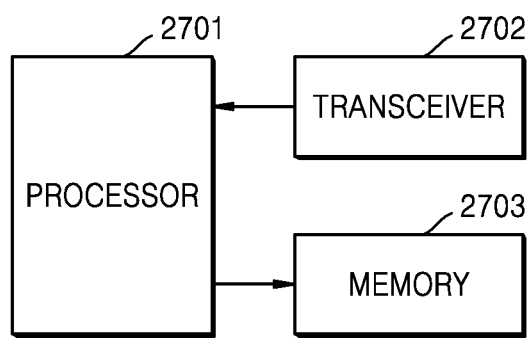
FIG. 27 illustrates a structure of a BS according to an embodiment of the disclosure.

FIG. 27 illustrates a structure of a BS according to an embodiment of the disclosure.

Referring to FIG. 27, the BS may include a processor 2701, a transceiver 2702, and a memory 2703. In the disclosure, a processor may be defined as a circuit, an application-specified integrated circuit, or at least one processor.

The processor 2701 according to an embodiment of the disclosure may control generation operations of the BS. For example, the processor 2701 may control a signal flow between blocks so as to perform operations according to flowcharts described above. Also, the processor 2701 may record data to and read data from the memory 2703. The processor 2701 may perform functions of a protocol stack which are requested by the communication rules. To do so, the processor 2701 may include at least one processor or a micro-processor. Alternatively, the processor 2701 may be a part of a multi-processor. Also, a part of the transceiver 2702 and the processor 2701 may be referred to as a CP.

According to an embodiment of the disclosure, the processor 2701 may control operations of the BS which are described with reference to FIGS. 1 to 18.

The transceiver 2702 according to an embodiment of the disclosure may perform functions for transmitting and receiving signals through a wireless channel. For example, the transceiver 2702 may perform conversion between a baseband signal and a bit string based on physical layer specifications of a system. For example, for data transmission, the transceiver 2702 may generate complex symbols by encoding and modulating a transmission bit string. For data reception, the transceiver 2702 may reconstruct a reception bit string by demodulating and decoding a baseband signal. The transceiver 2702 may up-convert a baseband signal into an RF band signal and then may transmit the RF band signal through an antenna, and may down-convert an RF band signal received through the antenna, into a baseband signal. For example, the transceiver 2702 may include a transmission filter, a reception filter, an amplifier, a mixer, an oscillator, a DAC, an ADC, or the like. Also, the transceiver 2702 may include a plurality of transmission and reception paths. Furthermore, the transceiver 2702 may include at least one antenna array including a plurality of antenna elements. In terms of hardware, the transceiver 2702 may be configured as a digital unit and an analog unit (e.g., a RFIC). Here, the digital unit and the analog unit may be implemented as one package. Also, the transceiver 2702 may include a plurality of RF chains.

The memory 2703 according to an embodiment of the disclosure may store basic programs, application programs, and data, e.g., configuration information, for operations of the UE. The memory 2703 may be configured as a volatile memory, a non-volatile memory, or a combination of a volatile memory and a non-volatile memory. The memory 2703 may provide stored data, in response to a request by the processor 2701. The memory 2703 may store at least one of information transmitted or received via the transceiver 2702 or information generated by the processor 2701.

The methods according to the embodiments of the disclosure as described in claims or specification may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a user equipment (UE), of transmitting an uplink channel, the method comprising:
   receiving, from a base station, a Radio Resource Control (RRC) signalling indicating that a Demodulation Reference Signal (DMRS) bundling is enabled and indicating a Physical Uplink Shared Channel (PUSCH) repetition type;
   identifying at least one nominal time domain window (TDW) for transmitting at least one PUSCH based on the RRC signalling;
   identifying whether a frequency hopping is performed;
   in case that the frequency hopping is not performed, determining a start symbol of a first PUSCH as a start symbol of at least one actual TDW and a last symbol of a second PUSCH as a last symbol of the at least one actual TDW; and
   in case that the frequency hopping is performed, determining a start symbol of a third PUSCH positioned at a first frequency hop as a start symbol of the at least one actual TDW and a last symbol of a fourth PUSCH positioned at the first frequency hop as a last symbol of the at least one actual TDW;
   wherein the first PUSCH is positioned ahead of the second PUSCH in a time domain,
   wherein the third PUSCH is positioned ahead of the fourth PUSCH in the time domain,;
   wherein the first PUSCH, the second PUSCH, the third PUSCH and the fourth PUSCH are included in a slot for the at least one PUSCH; and
   wherein the at least one nominal TDW comprises the at least one actual TDW.

2. The method of claim 1, further comprising:
   transmitting, to a base station, the at least one PUSCH for same actual TDW with a consistency power.

3. The method of claim 1, further comprising:
   transmitting, to a base station, a UE capability information about whether the DMRS bundling is supported.

4. The method of claim 1,
   wherein the at least one PUSCH is transmitted repeatedly; and
   wherein at least one start symbol or at least one length of the at least one PUSCH is equal or different from each other.

5. A user equipment (UE) for transmitting an uplink channel, the UE comprising:
   a memory;
   a transceiver; and
   at least one processor coupled with the memory and the transceiver, the at least one processor configured to:
   receive, from a base station, a Radio Resource Control (RRC) signalling indicating that a Demodulation Reference Signal (DMRS) bundling is enabled and indicating Physical Uplink Shared Channel (PUSCH) repetition type;
   identify at least one nominal time domain window (TDW) for transmitting at least one PUSCH based on the RRC signalling;
   identify whether a frequency hopping is performed;
   in case that the frequency hopping is not performed, determine a start symbol of a first PUSCH as a start symbol of at least one actual TDW and a last symbol of a second PUSCH as a last symbol of the at least one actual TDW; and
   in case that the frequency hopping is performed, determine a start symbol of a third PUSCH positioned at a first frequency hop as a start symbol of the at least one actual TDW and a last symbol of a fourth PUSCH positioned at the first frequency hop as a last symbol of the at least one actual TDW;
   wherein the first PUSCH is positioned ahead of the second PUSCH in a time domain,
   wherein the third PUSCH is positioned ahead of the fourth PUSCH in the time domain, wherein the first PUSCH, the second PUSCH, the third PUSCH and the fourth PUSCH are included in a slot for the at least one PUSCH; and wherein the at least one nominal TDW comprises the at least one actual TDW.

6. The UE of claim 5, wherein the at least one processor is further configured to:
transmit, to a base station, the at least one PUSCH for same actual TDW with a consistency power.

7. The UE of claim 5, wherein the at least one processor is further configured to:
transmit, to a base station, a UE capability information about whether the DMRS bundling is supported.

8. The UE of claim 5, wherein
wherein the at least one PUSCH is transmitted repeatedly; and
wherein at least one start symbol or at least one length of the at least one PUSCH is equal or different from each other.

9. A method, performed by a base station, of receiving an uplink channel, the method comprising:
transmitting, to a user equipment (UE), a Radio Resource Control (RRC) message including a Demodulation Reference Signal (DMRS) time domain bundling information; and
receiving, from the UE, at least one Physical Uplink Shared Channel (PUSCH) for at least one actual time domain window (TDW) with a consistency power, wherein, in case that a frequency hopping is not performed, a start symbol of a first PUSCH is determined as a start symbol of the at least one actual TDW and a last symbol of a second PUSCH is determined as a last symbol of the at least one actual TDW, wherein, in case that the frequency hopping is performed, a start symbol of a third PUSCH positioned at a first frequency hop is determined as a start symbol of the at least one actual TDW and a last symbol of a fourth PUSCH positioned at the first frequency hop is determined as a last symbol of the at least one actual TDW, wherein the first PUSCH is positioned ahead of the second PUSCH in time domain;

wherein the third PUSCH is positioned ahead of the fourth PUSCH in time domain; and wherein the first PUSCH, the second PUSCH, the third PUSCH and the fourth PUSCH are included in a slot for the at least one PUSCH.

10. The method of claim 9, further comprising:
receiving, from the UE, the at least one PUSCH repeatedly.

11. The method of claim 9, wherein at least one start symbol or at least length of the at least one PUSCH is equal or different from each other.

12. The method of claim 9, further comprising:
receiving, from the UE, UE capability information about whether the DMRS bundling is supported.

* * * * *